(12) United States Patent
Akaike et al.

(10) Patent No.: US 9,253,257 B2
(45) Date of Patent: Feb. 2, 2016

(54) STORAGE SUBSYSTEM

(71) Applicant: HITACHI, LTD., Tokyo (JP)

(72) Inventors: Hirotoshi Akaike, Tokyo (JP); Katsuya Tanaka, Tokyo (JP); Makio Mizuno, Tokyo (JP); Akira Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/426,318

(22) PCT Filed: Mar. 11, 2014

(86) PCT No.: PCT/JP2014/056296
§ 371 (c)(1),
(2) Date: Mar. 5, 2015

(87) PCT Pub. No.: WO2015/136619
PCT Pub. Date: Sep. 17, 2015

(65) Prior Publication Data
US 2015/0350322 A1 Dec. 3, 2015

(51) Int. Cl.
*H04L 29/08* (2006.01)
*G06F 3/06* (2006.01)

(52) U.S. Cl.
CPC .......... *H04L 67/1097* (2013.01); *G06F 3/0602* (2013.01); *G06F 3/0629* (2013.01); *G06F 3/0685* (2013.01)

(58) Field of Classification Search
CPC . H04L 67/1097; G06F 3/0602; G06F 3/0629; G06F 3/0685
See application file for complete search history.

(56) References Cited

U.S. PATENT DOCUMENTS

| | | | |
|---|---|---|---|
| 2008/0244139 A1* | 10/2008 | Nakajima | G06F 3/0613 710/300 |
| 2010/0057978 A1 | 3/2010 | Takamura et al. | |
| 2011/0072225 A1* | 3/2011 | Kawaguchi | G06F 3/0605 711/162 |
| 2011/0125943 A1 | 5/2011 | Oikawa et al. | |
| 2012/0084486 A1 | 4/2012 | Jinno et al. | |
| 2012/0311222 A1* | 12/2012 | Bowles | G06F 13/4022 710/315 |
| 2013/0086304 A1 | 4/2013 | Ogawa et al. | |
| 2013/0219144 A1 | 8/2013 | Oe et al. | |

FOREIGN PATENT DOCUMENTS

| | | |
|---|---|---|
| EP | 1975771 A2 | 10/2008 |
| JP | 2008250631 A | 10/2008 |
| JP | 201055210 A | 3/2010 |
| JP | 201273983 A | 4/2012 |
| JP | 2013171305 A | 9/2013 |
| WO | 2013/046464 A1 | 4/2013 |

* cited by examiner

*Primary Examiner* — Eric Oberly
(74) *Attorney, Agent, or Firm* — Volpe and Koenig, P.C.

(57) ABSTRACT

The present invention provides a storage subsystem capable of realizing a backend network enabling SSDs arranged in a small number of rows to be shared among controllers, and capable of having a large number of HDDs loaded thereto, according to which the performance of the storage is enhanced. In a topology of the backend network, the respective controllers 102 and 152 and the enclosure expanders are respectively connected via top expanders 110 and 160, the top expanders 110 and 160 are connected via a central expander 140, expanders 119, 120 and 121 for connecting SSDs to the top expander 110 are mutually connected in parallel, expanders 169, 170 and 171 for connecting SSDs to the top expander 160 are mutually connected in parallel, expanders 122, 123 and 124 for connecting HDDs to the top expander 110 are connected in series, and expanders 172, 173 and 174 for connecting HDDs to the top expander 160 are connected in series.

11 Claims, 43 Drawing Sheets

FIG. 4

| Exp SAS Address (701) | Exp Type (702) |
|---|---|
| Addr#C | Central Exp |
| Addr#A | Top Exp |
| Addr#B | Top Exp |
| Addr#A1 | Enc Exp |
| Addr#B1 | Enc Exp |

| Phy ID (801) | Connection Destination Device Type (802) | Connection Destination Device SAS Address (803) | Connection Destination Device Phy ID (804) |
|---|---|---|---|
| 0~3 | Initiator | Addr#A0 | Phy#0~#3 |
| 4~7 | Central Exp | Addr#C | Phy#0~#3 |
| 8~11 | Enc Exp | Addr#A1 | Phy#0~#3 |
| 12~15 | Enc Exp | Addr#A2 | Phy#0~#3 |

| Exp Type | SAS Address | Phy ID | Connection Destination SAS Address | Connection Destination Phy ID | Module Number |
|---|---|---|---|---|---|
| Central Exp | Addr#C | 4 | Addr#B | 4 | 0 |
| Central Exp | Addr#C | 5 | Addr#B | 5 | 0 |
| Central Exp | Addr#C | 6 | Addr#B | 6 | 0 |
| Central Exp | Addr#C | 7 | Addr#B | 7 | 0 |
| Top Exp | Addr#B | 4 | Addr#C | 4 | 1 |
| Top Exp | Addr#B | 5 | Addr#C | 5 | 1 |
| Top Exp | Addr#B | 6 | Addr#C | 6 | 1 |
| Top Exp | Addr#B | 7 | Addr#C | 7 | 1 |

FIG.17

| Number of Rows \ Phy ID | 8~11 | 12~15 | 16~19 | 20~23 | 24~27 |
|---|---|---|---|---|---|
| 2 | Null | SSD | SSD | HDD | HDD |
| 3 | N/A | N/A | Null | Null | HDD |
| 4 | N/A | N/A | N/A | HDD | HDD |
| ⋮ | | | | | |
| m | N/A | N/A | N/A | N/A | HDD |

| Drive SAS Address | Enc Number | Exp Row Number | Top Exp Phy ID | Drive Type | Top Exp. SAS Address | Flag |
|---|---|---|---|---|---|---|
| Addr#0 | 1 | 2 | 12~15 | SSD | Addr#A | 0 |
| ⋮ | | | | | | |
| Addr#100 | 3 | 2 | 16~19 | SSD | Addr#B | 0 |
| ⋮ | | | | | | |

2200, 2201, 2202, 2203, 2204, 2205, 2206, 2207

| Drive SAS Address (2301) | Module Number (2302) | SAS Address (2303) | Flag (2304) |
|---|---|---|---|
| Addr#0 | 1 | Addr#A | 0 |
| ⋮ | ⋮ | ⋮ | ⋮ |
| Addr#100 | 2 | Addr#B | 0 |
| ⋮ | ⋮ | ⋮ | ⋮ |

| SAS Address | Phy ID | | | | | | | | |
|---|---|---|---|---|---|---|---|---|---|
| | 0 | 1 | 2 | 3 | 4 | 5 | 6 | 7 | ... |
| Addr#0 | 1 | 1 | 1 | 1 | 0 | 0 | 0 | 0 | |
| Addr#1 | 0 | 0 | 0 | 0 | 1 | 1 | 1 | 1 | |
| Addr#2 | 1 | 1 | 1 | 1 | 0 | 0 | 0 | 0 | |
| ⋮ | | | | | | | | | |

FIG.28

| LUN | Owner Module Number |
|---|---|
| 1 | 0 |
| 2 | 1 |
| 3 | 0 |
| ⋮ | ⋮ |

FIG.33

| SAS Address | Top Exp Phy ID | Routing Attribute | Enc Exp Connection | Share Flag |
|---|---|---|---|---|
| Addr#0 | 8~11 | T | Y | 1 |
| Addr#0 | 12~15 | T | Y | 1 |
| Addr#0 | 16~19 | T | Y | 0 |
| Addr#0 | 20~23 | T | Y | 0 |
| Addr#0 | 24~27 | S | Y | 1 |
| Addr#0 | 28~31 | T | N | 0 |
| ⋮ | ⋮ | ⋮ | ⋮ | ⋮ |

4000, 4001, 4002, 4003, 4004, 4005

STORAGE SUBSYSTEM

TECHNICAL FIELD

The present invention relates to storage subsystems having various types of storage media loaded in a mixture.

BACKGROUND ART

Generally, storage subsystems are equipped with randomly accessible nonvolatile storage media. Examples of such randomly accessible nonvolatile storage media include magnetic disk drives and optical disk drives. The current main stream of storage subsystems is equipped with multiple hard disk drives (HDDs).

Along with the advancement of semiconductor technology, nonvolatile semiconductor memories that can be used as storage media in storage subsystems are being developed. One example of drives using such nonvolatile semiconductor memories as storage media is a solid state drive (SSD). The storage subsystem equipped with SSDs have superior power saving property and access time compared to storage subsystems only equipped with hard disk drives (HDDs).

Storage subsystems have controllers for controlling data transfer between a host computer connected to the storage subsystem and the storage media disposed within the storage subsystem. The controller is equipped with a frontend interface for connecting the host computer, a backend interface for connecting a large number of drives as storage media, a processor for controlling the storage subsystem, a memory connected to the processor, and so on. A SAS (Serial Attached SCSI) is known as a standard of the communication network for connecting backend interfaces and the like.

A SAS backend network includes an initiator, drives such as SSDs and HDDs, and an expander (hereinafter also abbreviated as "Exp"). The initiator is a device for outputting command requests such as read/write to the drive, and it can be included in the backend interface of the controller, for example. The expander is a switch for connecting multiple drives to the initiator. In order to connect a large number of drives, multiple expanders are mutually connected and used.

In the prior art storage subsystem, expanders are generally connected in a cascade (in series) in order to connect a large number of drives. Patent Literature 1 discloses a method for connecting expanders in a cascade.

CITATION LIST

Patent Literature

[PTL 1] US Patent Application Publication No. 2011/0125943

SUMMARY OF INVENTION

Technical Problem

When devices such as SSDs having higher performance than HDDs are loaded to a storage subsystem designed to load prior art HDDs, the performance of SSDs cannot be sufficiently utilized. The prior art cascade connection as described in Patent Literature 1 has a drawback in that the access performance between controller and drive is deteriorated when expanders are connected in multiple rows, and the performance of the SSDs cannot be sufficiently exerted.

Further, when SSDs are loaded to the storage subsystem, a processor disposed in the controller of a storage subsystem designed to load prior art HDDs may become the bottleneck of performance.

Considering such background art, the present invention has been developed with the main aim to improve the performance of a storage subsystem having high-speed storage media and low-speed storage media loaded in a mixture.

Solution to Problem

In order to solve the problems mentioned above, the present invention provides a storage subsystem composed of one or more storage controllers, and HDDs and SSDs as multiple types of storage devices with different performances, which are connected via a backend network formed of multiple expanders and transmission lines disposed between the storage controllers and storage devices, wherein control is performed to determine whether a topology of the backend network violates a rule determined in advance or not. Specifically, in an initialization process of a backend network, the present invention acquires information on storage devices connected to the respective expanders and expander information, and based on the acquired information on storage devices and expanders, determines whether the topology of the backend network is in compliance with rules set in advance.

A topology in compliance with rules is a topology of the backend network configured so that communication traffic to HDDs does not interfere with the communication (transmission and reception of commands and data) between the storage controller and SSDs. One example of such rules is a rule to restrict storage devices connected to each expander to only HDDs or only SSDs. Another example of such rules is that since access performance between the controller and SSDs is deteriorated when expanders are connected in multiple rows in a cascade connection, a rule is set so that expanders to which HDDs are connected are allowed to be connected in a cascade connection, but expanders to which SSDs are connected are not allowed to be connected in a cascade connection.

Further, in order to prevent the storage controller from being the bottleneck of performance, the storage subsystem according to the present invention has multiple storage controllers, wherein shared access of each SSD from the respective controllers is enabled via the backend network.

Advantageous Effects of Invention

According to the present invention, it becomes possible to share SSDs among controllers by a small number of rows of expanders, and to realize a backend network capable of loading a large number of HDDs, so that the storage can have enhanced performance.

BRIEF DESCRIPTION OF DRAWINGS

FIG. 4 is a view illustrating an expander type management table according to Embodiment 1.

FIG. 5 is a view illustrating a device connection table of a top expander according to Embodiment 1.

FIG. 12 is a view illustrating an inter-module connection table according to Embodiment 1.

FIG. 17 is a view illustrating an enclosure management table according to Embodiment 1.

FIG. 18 is a view illustrating a drive address table according to Embodiment 1.

FIG. 21 is a view illustrating a route table according to Embodiment 1.

FIG. 28 is a view illustrating a LUN mapping table according to Embodiment 1.

FIG. 33 is a view illustrating a share setting table of a top expander Phy according to Embodiment 2.

DESCRIPTION OF EMBODIMENTS

Embodiment 1

Now, a storage subsystem according to Embodiment 1 of the present invention will be described with reference to FIGS. 1 through 29. The present embodiment will be described in the following manner. At first, a configuration of the storage subsystem according to Embodiment 1 of the invention will be described with reference to FIGS. 1 and 2. Next, a preprocess before setting a backend network according to the storage subsystem of Embodiment 1 of the present invention will be described with reference to FIGS. 3 through 6. Thereafter, a backend network setting process of the storage subsystem according to Embodiment 1 will be described with reference to FIGS. 7 through 22. The object of this backend network setting process is to create a route table for an expander in a backend network including a Table-to-Table connection. Next, with reference to FIGS. 23 through 26, an addition process of the storage subsystem according to Embodiment 1 will be described. Lastly, a load distribution process of a storage subsystem according to Embodiment 1 of the invention will be described with reference to FIGS. 27 through 29.

Figure 1:
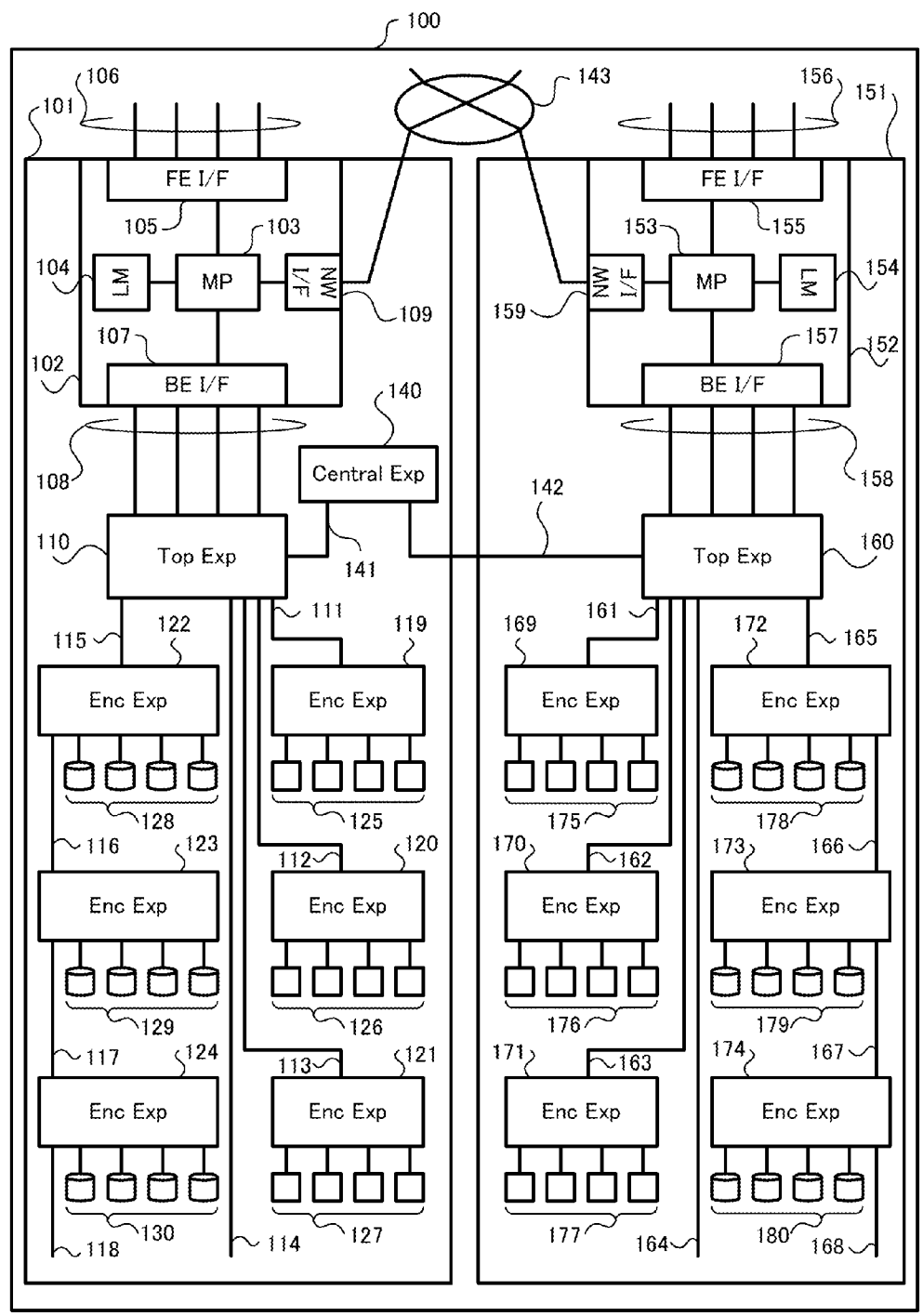
FIG. 1 is a block diagram of a storage subsystem according to Embodiment 1.

At first, the configuration of a storage subsystem according to Embodiment 1 of the present invention will be described. FIG. 1 is a block diagram of a storage subsystem 100 according to Embodiment 1.

The storage subsystem 100 is composed of one or more modules (modules 101 and 151 according to the configuration example of FIG. 1). The storage subsystem 100 according to Embodiment 1 of the present invention characterizes in enabling an SSD connected to the storage subsystem 100 to be shared among modules through a backend network. In the present specification, a "backend network" refers to a network for connecting end devices such as SSDs and HDDs to a controller of the storage subsystem 100, and the network is composed of a transmission line (SAS link) and a switch (expander).

Further, the definition of "share" in the present specification is as follows. What is meant by a certain device (such as the SSD) being "sharable" is that (processors of controllers of) multiple modules in the storage subsystem 100 are in a state capable of accessing a target device through the backend network. In contrast, what is meant by a "certain device being not shared" is that only one of the (processors of controllers of) modules within the storage subsystem 100 is in a state capable of accessing the target device through the backend network.

Before describing the configuration of the storage subsystem 100 of FIG. 1 in detail, we will describe the types and functions of the expander according to Embodiment 1. In the preferred embodiment of the present invention, the expanders which are switch devices used in the backend network of the storage subsystem 100 are classified into three types according to functions, and are called by different names. The first type of expanders is an expander disposed within a drive enclosure, which is used to connect drives. In the embodiments of the present invention, this type of expander is called an enclosure expander. The second type of expanders is an expander with a function to isolate a topology connecting SSDs and a topology connecting HDDs, which is installed between an initiator disposed in a backend interface 107 (157) and the enclosure expander, and is directly connected to the initiator. In the embodiments of the present invention, this expander is called a top expander. What is meant by isolating a topology connecting SSDs and a topology connecting HDDs is that, when stated differently, each Phy (an interface for connecting a SAS device to one physical link) of the expander other than the Phy Directly connected to the initiator has only one type of drive within the module determined to be connected thereto (for example, only the SSD is set as a drive connected beyond a certain Phy, and only the HDD is set as a drive connected beyond a different Phy). The third type of expander is an expander functioning to mutually connect modules, and is connected to a top expander of each module. In the embodiments of the present invention, this expander is called a central expander. The top expander is stored in an enclosure (hereafter, this enclosure is called a top expander enclosure), together with a power supply, a fan and the like. Similarly, the central expander is also stored in an enclosure (hereafter, this enclosure is called a central expander enclosure), together with a power supply, a fan and the like.

We will now return to the description of FIG. 1. In the example of Embodiment 1, the storage subsystem 100 is composed of two modules 101 and 151. Each module includes a controller, a top expander to which the controller is directly connected, and enclosure expanders and drives in areas accessible from the top expander without passing the central expander. Modules 101 and 151 adopt the same configuration, except for the existence of a central expander 140. In the present embodiment, as an example, the central expander 140 is stored within the module 101. However, the central expander 140 can be stored in either module 101 or module 151, or can be stored in a different module other than modules 101 and 151.

The module 101 (151) is composed of a controller 102 (152), a top expander 110 (160), enclosure expanders 119-124 (169-174), SSDs 125-127 (175-177), and HDDs 128-130 (178-180). The communication from/to the controller 102 (152) to/from the SSDs 125-127 (175-177) and the HDDs 128-130 (178-180) is done in compliance with SAS (Serial Attached SCSI) standard. Although not shown in FIG. 1, the module 101 (151) has an NIC (Network Interface Controller) disposed therein, which enables to connect a management terminal used by an administrator of the storage subsystem 100 to perform various settings of the storage subsystem 100.

The controller 102 (152) comprises a processor (MP) 103 (153), a frontend interface 105 (155), a local memory (also abbreviated as "LM" or "memory") 104 (154), a backend interface 107 (157), and a network interface 109 (159).

The frontend interface 105 (155) connects to a host computer (not shown) via a channel 106 (156). Further, the frontend interface 105 (155) converts a data transfer protocol between the host computer and the controller 102 (152) and a data transfer protocol within the controller 102 (152).

The backend interface 107 (157) connects the controller 102 (152) and the top expander 110 (160) via SAS links 108 (158). Further, the backend interface 107 (157) converts the data transfer protocol within the controller 102 (152) and the data transfer protocol between the controller 102 (152) and the top expander 110 (160). Further, the backend interface 107 (157) includes multiple SAS initiators.

The network interface 109 (159) connects to an inter-module network 143, and sends or receives control information and various tables of the storage subsystem 100 between modules.

A memory 104 (154) is a main memory of a processor 103 (153), and stores programs (storage control programs and the like) executed by the processor 103 (153), management tables referred to by the processor 103 (153), and so on. Further, the memory 104 (154) is also used as a disk cache (cache memory) of the storage subsystem 101.

The processor 103 (153) controls data transfer between a host computer (not shown) connected via the frontend interface 105 (155) and HDDs 128-130 (178-180) or SSDs 125-127 (175-177) connected via the backend interface 107 (157).

The SSDs 125-127 (175-177) and HDDs 128-130 (178-180) are storage devices for storing write data from the host computer. According to the storage subsystem 100 taught in the embodiments of the present invention, magnetic disk drives are used as HDDs 128-130 (178-180). On the other hand, SSDs 125-127 (175-177) are devices having higher access performance than HDDs 128-130 (178-180), and in the storage subsystem 100 according to the embodiments of the present invention, storage devices such as SSDs (Solid State Drives) using flash memories as storage media are adopted. However, the present invention is not restricted to using such magnetic disk drives and SSDs, and the present invention is also effective when storage media other than magnetic disk drives and SSDs are adopted.

The top expander 110 (160) is connected to a central expander 140 via a SAS link 141 (142). Moreover, the top expander 110 (160) is connected to an enclosure expander 122 (172) via a SAS link 115. The enclosure expander 122 (172) is connected to an enclosure expander 123 (173) via a SAS link 116 (166). Similarly, the enclosure expander 123 (173) is connected to an enclosure expander 124 (174) via a SAS link 117. The enclosure expanders 122-124 (172-174) respectively connect one or more HDDs 128-130 (178-180). When an enclosure expander is added in order to provide additional HDDs to the module 101 (151), the enclosure expander to be added is connected to the SAS link 118 (168). As described, the expander for connecting the HDD is connected in series from the top expander 110 (160).

The top expander 110 (160) is further connected to an enclosure expander 119 (169) via a SAS link 111 (161). Further, the top expander 110 (160) is connected to an enclosure expander 120 (170) via a SAS link 112 (162). Similarly, the top expander 110 (160) is connected to an enclosure expander 121 (171) via a SAS link 113 (163). The enclosure expanders 119-121 respectively connect one or more SSDs 125-137 (175-177). If an enclosure expander is added to the module 101 (151) for providing additional SSDs, the enclosure expander to be added is connected to the SAS link 114 (164). As described, the expander connecting the SSD is connected in parallel with the expander connecting other SSDs.

Next, we will describe the routing attribute of an expander Phy compliant to SAS standards.

There are three types of routing attributes of an expander Phy, which are a Direct routing attribute, a Table routing attribute and a Subtractive routing attribute. These three routing attributes are respectively abbreviated as Direct, Table, and Subtractive. Normally, when an end device is to be directly connected to an expander Phy, it is connected to a Phy where the Phy routing attribute is Direct. When another expander is to be connected to an expander Phy, it is connected to a Phy where the Phy routing attribute is Table. The routing attribute of an expander Phy which is neither Direct nor Table is Subtractive. The setting of the routing attribute of each Phy within the expander can be arbitrarily changed by the administrator, but according to SAS standards, it is determined that Subtractive routing attribute can be set only to a Phy belonging to one port per expander. A port is an interface for connecting two SAS devices, and it includes a single Phy, or multiple Phys.

When the expander receives a connection request, at first, it checks whether a SAS address which is an address information for specifying the connection destination device is a SAS address of the connection destination device of the Direct Phy or not. If the connection destination SAS address of the connection request corresponds to the SAS address of the connection destination device of the Direct Phy, the expander establishes a connection to the Phy connecting to another end of a SAS link connected to that Phy. If the addresses do not correspond, the expander checks whether the connection destination SAS address of the connection request is a connection destination SAS address of the Table Phy or not. The connection destination SAS address of the Table Phy is stored in a route table within the expander. When the connection destination SAS address is found in the route table, the expander establishes a connection to the Phy connecting to another end of a SAS link connected to that Phy. If the connection destination SAS address of the connection request is not found in the connection destination SAS address of the Direct and Table Phys, the expander establishes a connection to the Phy connecting to another end of a SAS link connected to the Subtractive Phy. Since the expander operates based on such rule, if the routing attribute of the Phy is Subtractive, there is no need to register the address of the SAS devices connected to and beyond that Phy in the route table for an expander. Thus, the route table size can be reduced. Especially when the connection between expanders is Subtractive-to-Subtractive, there is an advantage that the route table size can be reduced in both expanders. The one or more Phys having a Subtractive attribute of the expander are included in one port. In the Phys of the expander, the one or more Phys having a Direct attribute and having the same SAS device as the connection destination are included in the same port. The one or more Phys of the expander having a Table attribute and having the same contents of route tables are included in the same port.

Figure 2:
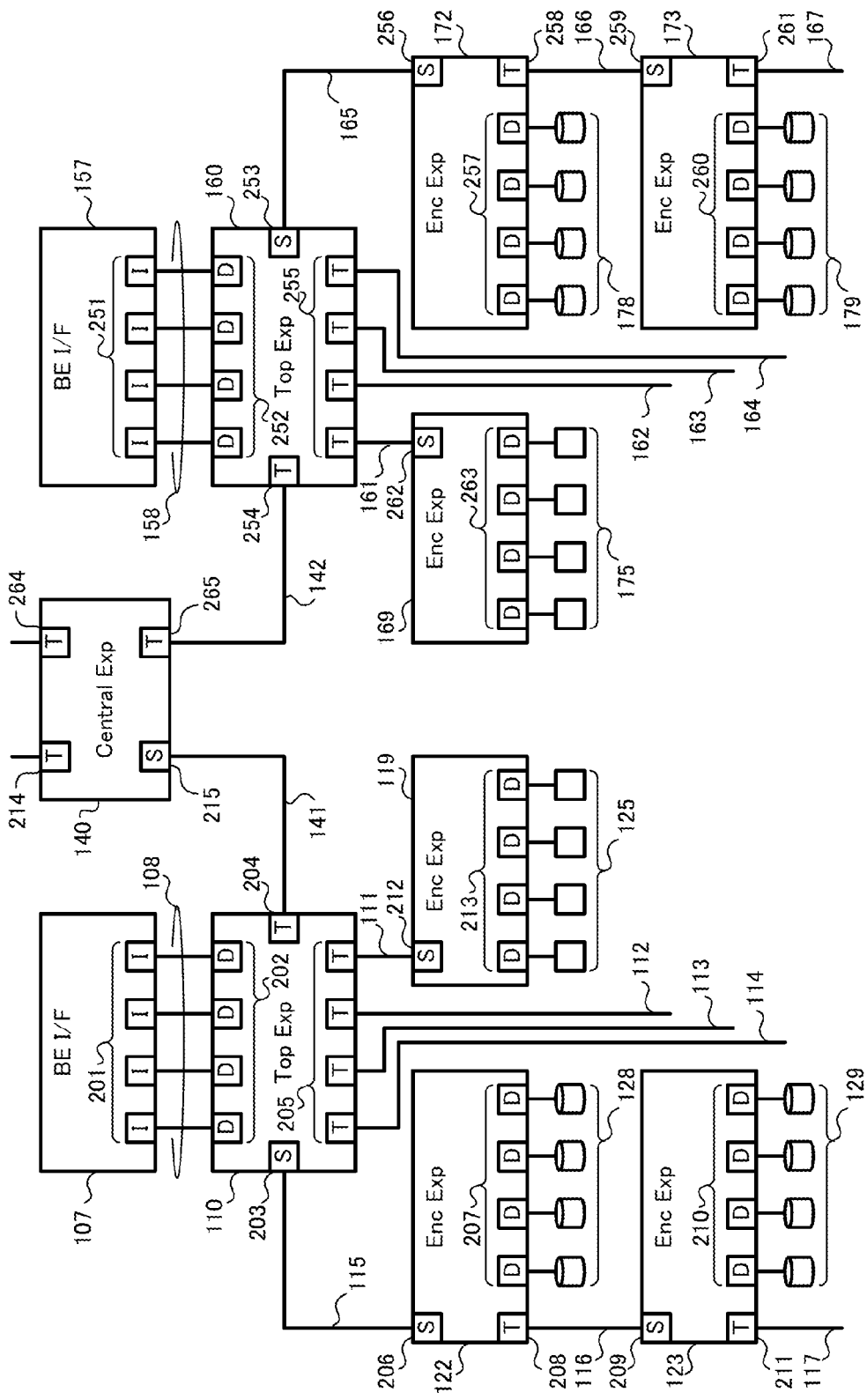
FIG. 2 is a view illustrating a routing attribute of an expander Phy of a storage subsystem according to Embodiment 1.

FIG. 2 is a view illustrating a routing attribute of Phys of the respective expanders connected to the storage subsystem 100 according to Embodiment 1.

The routing attribute of Phys 202 (252) of the top expander 110 (160) connecting to multiple initiators 201 (251) of the backend interface 107 (157) is Direct. The routing attribute of a Phy 203 (253) of the top expander 110 (160) connecting the enclosure expander 122 (172) to which HDDs are connected is Subtractive. The routing attribute of a Phy 204 (254) of the top expander 110 (160) connecting to the central expander 140 is Table. The SAS link 142 connecting Phy 254 and Phy 265 is a Table-to-Table connection. The routing attribute of a Phys 205 (255) of the top expander 110 (160) connecting the enclosure expanders 119-121 (169-171) connecting the SSDs is Table.

In the central expander 140, the routing attribute of Phy 215 connecting to the top expander 110 of the module 101 is Subtractive. The routing attribute of a Phy 265 connecting a module 151 is Table. Phys 214 and 264 are Phys for connecting additional modules to realize a three or four-module configuration of the storage subsystem 100, and the routing attribute of these Phys is Table. The SAS link 142 connecting the central expander 140 and the top expander 160 is a Table-to-Table connection.

According to SAS standards, there are two types of expanders, an externally configurable expander and a self-configuring expander. A prior-art cascade connection backend network was capable of using both types of expanders. However, in the backend network used in the system required to have high reliability and high performance as the storage system illustrated in the embodiments of the present invention, the self-configuring expander cannot be used due to the following three reasons, and the expander used in such backend network is restricted to the externally configurable expander.

As the first reason, the self-configuring expander has a drawback in that it does not consider the topology violation of a storage backend network designated by the system administrator, and recognizes (discovers) all devices searched by the initialization process (discover process) of the backend network. In a storage subsystem using only HDDs as the storage device, it is not necessary to detect violation of the topology (state of connection of the respective SAS devices in the backend network), but in a storage subsystem where SSDs and HDDs, which are different types of devices having different access performances, are used in a mixture, the communication traffic between the storage system controller and the HDDs may interfere with the communication between the controller and the SSDs, depending on the form of connection (topology) of the respective devices to the backend network, making it impossible to appropriately exert the performances of the SSDs. Therefore, it becomes necessary to perform a process during setting of the backend network or during addition of drives, for example, to confirm whether the topology of the backend network is set to a topology where the access performance of the SSDs cannot be exerted appropriately (in the present specification, such state of topology is called "topology violation"), and so the self-configuring expander cannot be applied to inter-module backend expanders.

As a second reason, the self-configuring expander has a drawback in that it executes the discover process at a link reset timing of resetting the link between devices, when the device is connected to or disconnected from the backend network or when failure occurs to the device. In connecting a device to a backend network or disconnecting the same, the discover process is executed at a timing planned in advance by a system administrator, according to which the storage system minimizes the influence of deterioration of performance of the backend network on the host computer. However, a self-configuring expander may execute the discover process at a timing unexpected by the system administrator, and the deterioration of performance of the backend network may influence the host computer greatly, so that it is not possible to adopt the self-configuring expander as the expander of the backend network between modules.

Lastly, as the third reason, since the storage subsystem is required to have high reliability, the microprogram operating in the storage controller executes an initialization process of the backend network. On the other hand, a self-configuring expander has a drawback in that the firmware of the expander executes the initialization process, and high reliability of the storage subsystem cannot be realized.

The above-described Table-to-Table connection has a drawback in that when an externally configurable expander is adopted, initialization cannot be performed via a conventional backend initialization process.

In the enclosure expander 119 (169) connecting SSDs, the routing attribute of a Phy 212 (262) connecting to the top expander 110 (160) is Subtractive. The routing attribute of Phys 213 (263) connecting SSDs is Direct. The enclosure expanders 120 and 121 (170 and 171) are configured similarly.

In the enclosure expanders 122 and 123 (172 and 173) connecting HDDs, the routing attribute of Phys 206 and 209 (256 and 259) connected to the direction of the top expander 110 (160) is Subtractive. The routing attribute of Phys 207 and 210 (257 and 260) connecting HDDs is Direct. Further, the routing attribute of Phys 208 and 211 (258 and 261) connecting the enclosure expander for connecting HDDs is Table. The enclosure expander 124 (174) is configured similarly.

The SAS link 115 (165) connecting the top expander 110 (160) and the enclosure expander 122 (172) adopts a Subtractive-to-Subtractive connection. The storage subsystem 100 according to Embodiment 1 enables the drives (HDDs) connected to and beyond the Subtractive-to-Subtractive connection to be shared among modules, but according to the present embodiment, a setting is adopted so as not to share the drives. Therefore, the SAS address of HDDs is not registered in the route table of the top expander 110 (160) and the central expander 140. As a result, even when installing a large number of HDDs to the storage subsystem 100, the route table size of the top expander 110 (160) and the central expander 140 can be reduced.

In FIG. 2, in order to simplify the description, the SAS link connecting expanders or connecting the initiator and the expander is shown by a single line. The Phys on both ends of the SAS link are also drawn by a single line. Actually, the SAS link is a wide link, and both ends of the SAS link are wide ports composed of multiple Phys. For example, the four ports having initiators 201 (251) are wide ports, and the four ports having Phys 202 (252) are also wide ports. Further, the four SAS links of the SAS link 108 are wide ports. The SAS link connecting the enclosure expander and the drives can be a narrow link or a wide link. The same applies for FIGS. 7, 11, 30, 38 and the like described later.

Next, we will describe the rule of correspondence of the Phy ID of a central expander and the routing attribute according to Embodiment 1 of the present invention.

As mentioned earlier, there is only one port to which the Phy having the routing attribute set to Subtractive in each expander belongs. In the central expander according to the storage subsystem 100 of Embodiment 1 of the present invention, the routing attribute of Phy in which the Phy ID is 0 is set to Subtractive. When the Phy having a Phy ID 0 constitutes a wide port, the routing attribute of Phy belonging to the same port as the Phy having a Phy ID 0 is also set to Subtractive. Further, the routing attribute of the Phy belonging to a different port as the port whose connection destination is the expander and to which the Phy having a Phy ID 0 belongs is set to Table. Moreover, the routing attribute of Phy to which a drive is directly connected is set to Direct.

The above-described configuration is adopted in the storage subsystem 100 according to Embodiment 1 of the present invention.

Next, an initialization process of a backend network will be described. According to the initialization process of a backend network, a preprocess before setting a backend network is performed at first, and then a backend network setting process is performed.

First, the preprocess before setting a backend network will be described. In this preprocess, a process to create a device connection table 800 of the top expander, and a process to determine a master processor will be performed. The preprocess before setting a backend network is a process performed before the backend network setting process (FIGS. 11 and 12) described later, which is executed by a processor (103, 153) provided in a controller (102, 152) of the respective modules (101, 151) constituting the storage subsystem 100.

At first, we will describe a table that the storage subsystem 100 uses in the preprocess before setting a backend network. FIG. 4 is a view illustrating an expander type management table according to Embodiment 1.

An expander type management table 700 is a table storing the correspondence between a SAS address 701 of an expander connected to the storage subsystem 100 and a type 702 of the expander. The type of the expander includes, as mentioned earlier, an enclosure expander (Enc Exp), a top expander (Top Exp) and a central expander (Central Exp), so that one of these information is stored in the field of expander type 702. The expander type management table 700 is stored in the memory 104 (154) within the controller 102 (152), and the processor 103 (153) can recognize the type of the expander connected to the backend network of the storage subsystem 100 by referring to the expander type management table 700. The contents of the expander type management table 700 are set in advance (prior to starting the storage subsystem 100) by the administrator, and when the storage subsystem 100 has multiple controllers (102, 152 and the like), the contents of the setting are stored in the respective memories (104, 154) in the controllers (102, 152). Further, when an expander is to be added at a later timing after starting the storage subsystem 100, the administrator should register the SAS address and the role (expander type) of the expander to be added in the expander type management table 700 in advance, or should add the same during the addition process.

FIG. 5 is a drawing illustrating a device connection table of a top expander according to Embodiment 1. A device connection table is a table having gathered the connection information between the expander and the device connected to the expander, which is used for creating an inter-module connection table described later.

The device connection table 800 stores the correspondence between a Phy ID 801 of the top expander Phy, a device type 802 connected to the top expander, a SAS address 803 of the device connected to the top expander, and a Phy ID 804 of a connection destination device. For example, it can be seen that Phy IDs 4-7 of the top expander Phy is connected to Phy IDs 0-3 of the central expander Phy. In the storage subsystem 100, the top expander is only connected to an initiator or other expanders. If the connection destination device is an expander, the processor 103 (153) determines the type thereof using the expander type management table 700. Moreover, the processor 103 (153) determines whether the connection destination device is an initiator or not using the SAS address directly acquired from the initiator. This determination is performed to determine whether the type of the connection destination device of the top expander is a central expander, a top expander, an enclosure expander, or an initiator.

The device connection table 800 is generated for each top expander. Therefore, if there are multiple (such as n) top expanders exist within one module, the processor in the module creates n numbers of device connection tables 800.

Figure 3:
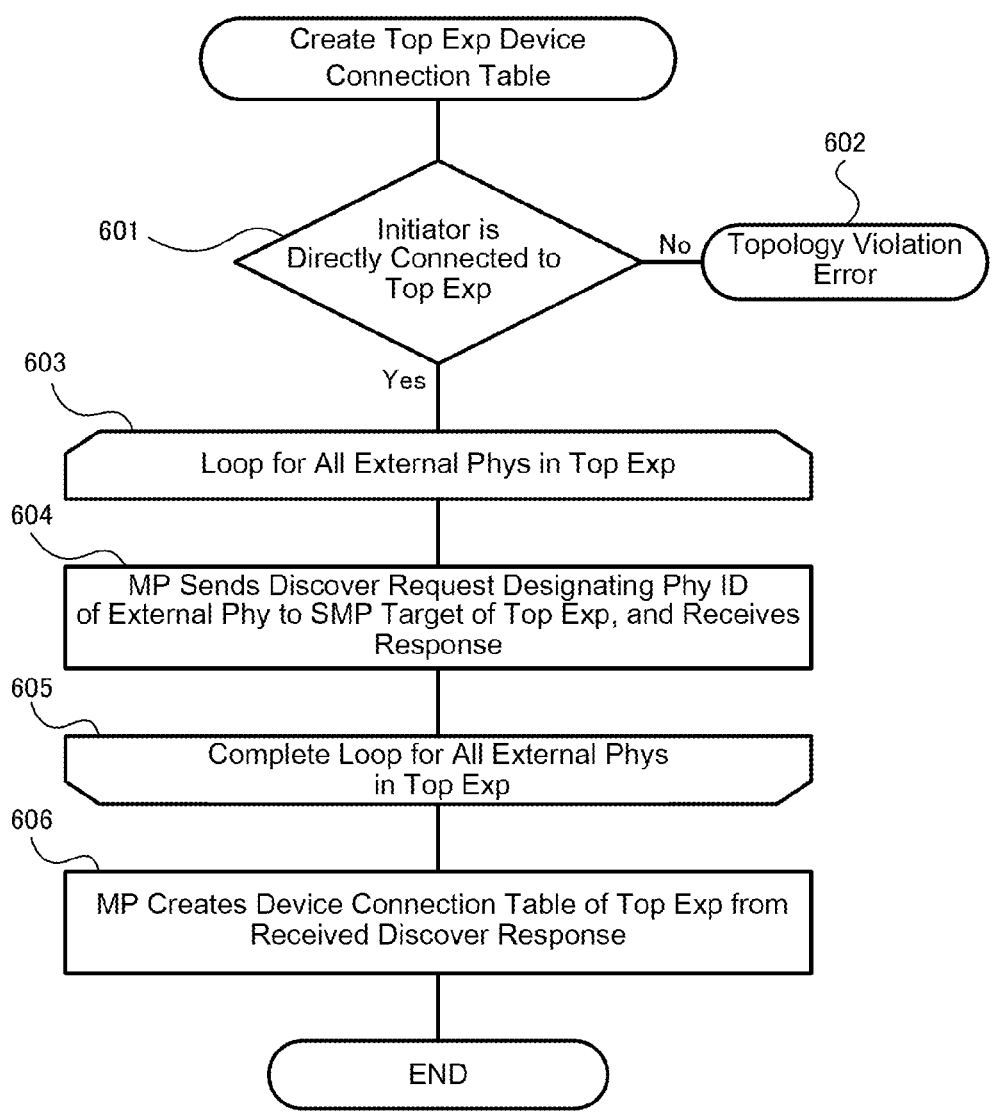
FIG. 3 is a flowchart for creating a device connection table in a top expander according to Embodiment 1.

FIG. 3 is a flowchart for creating a device connection table of the top expander, which is one of the preprocesses before setting a backend network.

Figure 8:
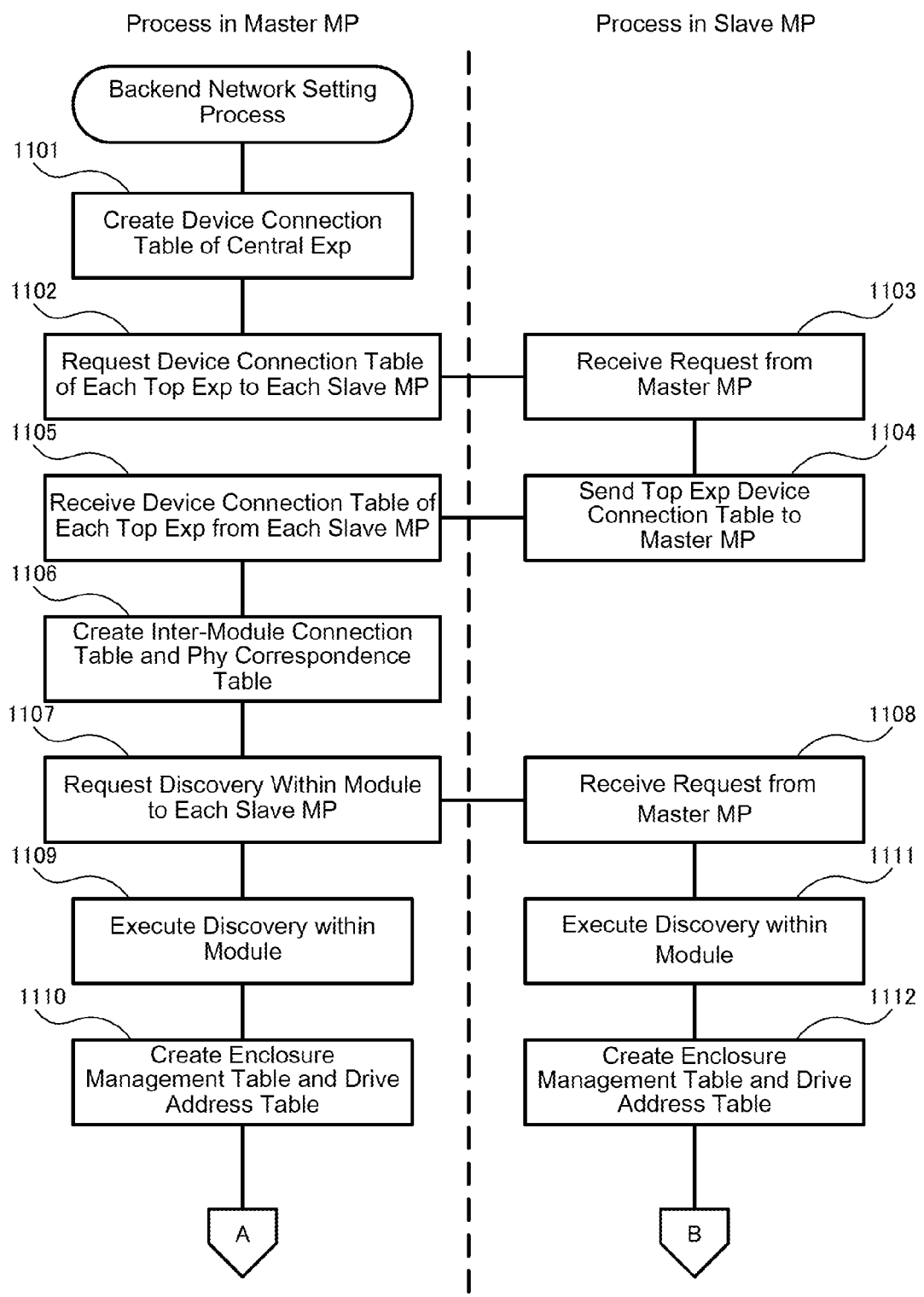
FIG. 8 is a flowchart of a backend network setting process according to Embodiment 1.
Figure 9:
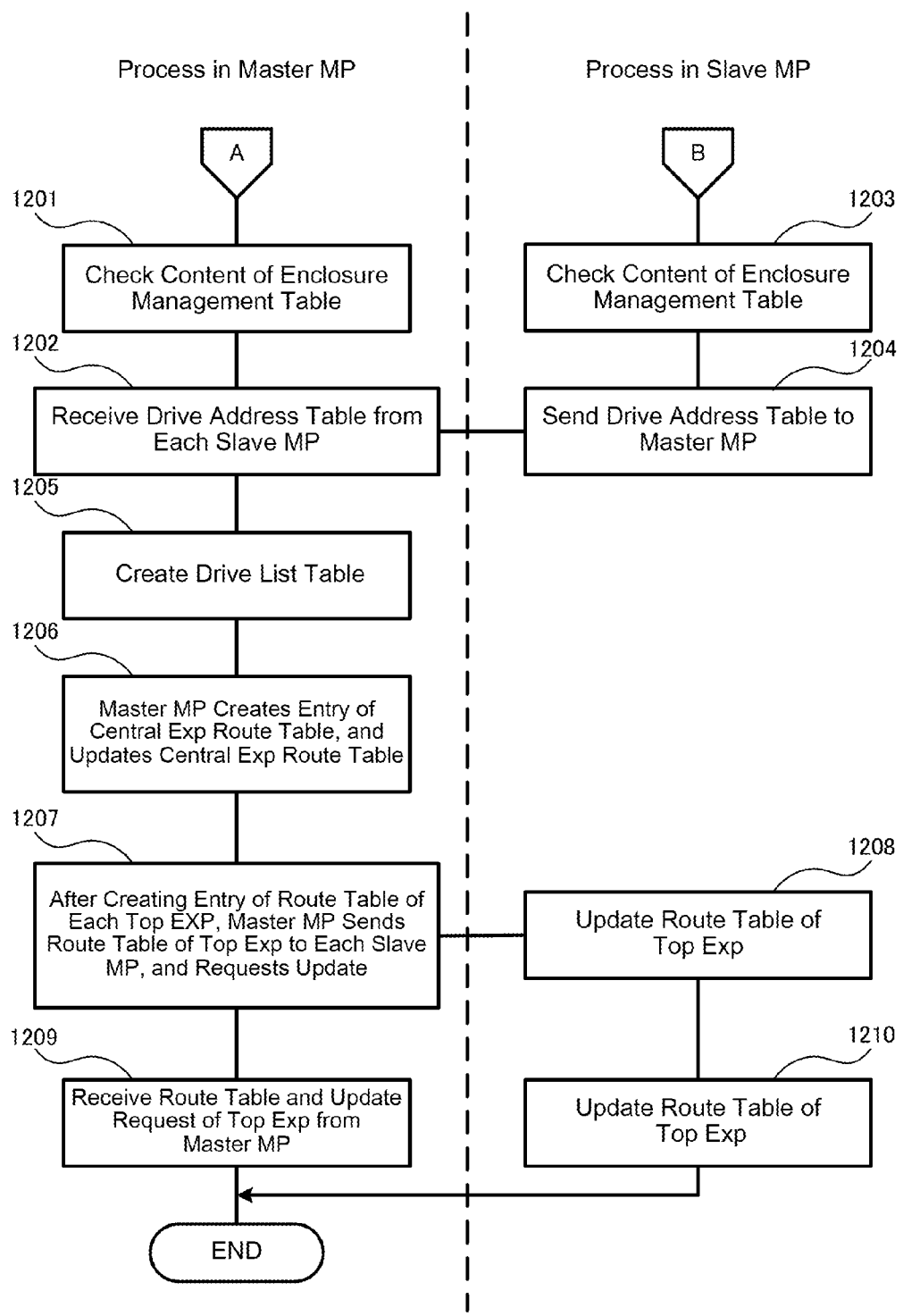
FIG. 9 is a flowchart of a backend network setting process according to Embodiment 1.
Figure 10:
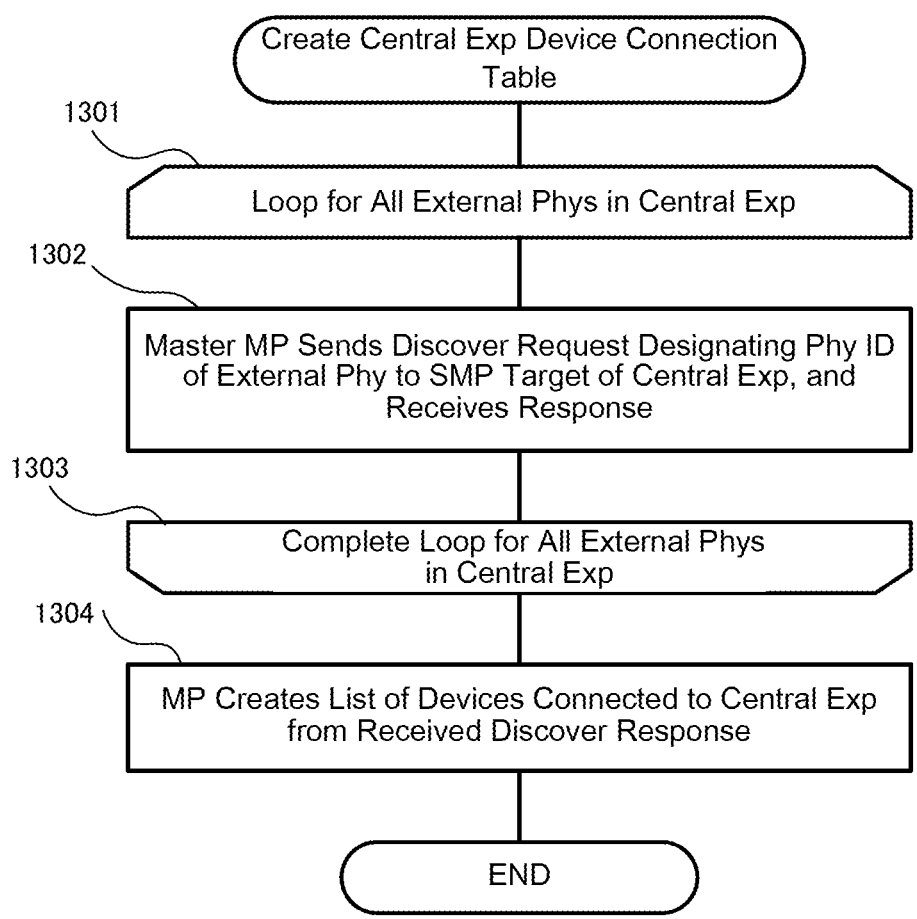
FIG. 10 is a flowchart of creating a device connection table of a central expander according to Embodiment 1.

The processor within each module constituting the storage subsystem 100 executes the flow of FIG. 3, prior to performing the backend network setting process (FIGS. 8 and 9). As an example, the flow of creating the device connection table of the top expander 110 in module 101 will be described.

The processor 103 checks whether the initiator within the backend interface 107 is directly connected to the top expander 110 or not (601). This is made possible by the processor checking the result of the identification sequence executed by the initiator and the expander type management table 700. As a result, if there is even one initiator that is not directly connected to the top expander, it stops the flow due to topology violation error, and notifies the same to the administrator of the storage subsystem 100 (602). For example, notification to the administrator is performed via methods such as by having a processor 103 display an error message notifying that topology violation exists on the screen on the management terminal. When all the initiators are connected to the top expander 110, the procedure advances to 603.

Next, the processor 103 executes a loop process for all the External phys within the top expander 110 (603-605). If multiple top expanders 110 exist within a module, loop process (603-605) is executed for all External Phys of all the top expanders 110 within the module.

The processor 103 transmits a Discover request, in which the Phy ID of the External Phy is set, to an SMP target within the top expander 110, and receives a response thereto (604). The received response includes a SAS address and a Phy ID of the connection destination of the top expander Phy corresponding to the Phy ID designated in the Discover request.

The processor 103 repeats transmission of the Discover request and reception of response for all External Phys within the top expander 110 (605).

Then, the processor 103 creates a device connection table 800 of the top expander 110 from the received response (606). In a configuration where multiple top expanders 110 exist within a module, the device connection table 800 is created for each top expander 110.

Figure 6:
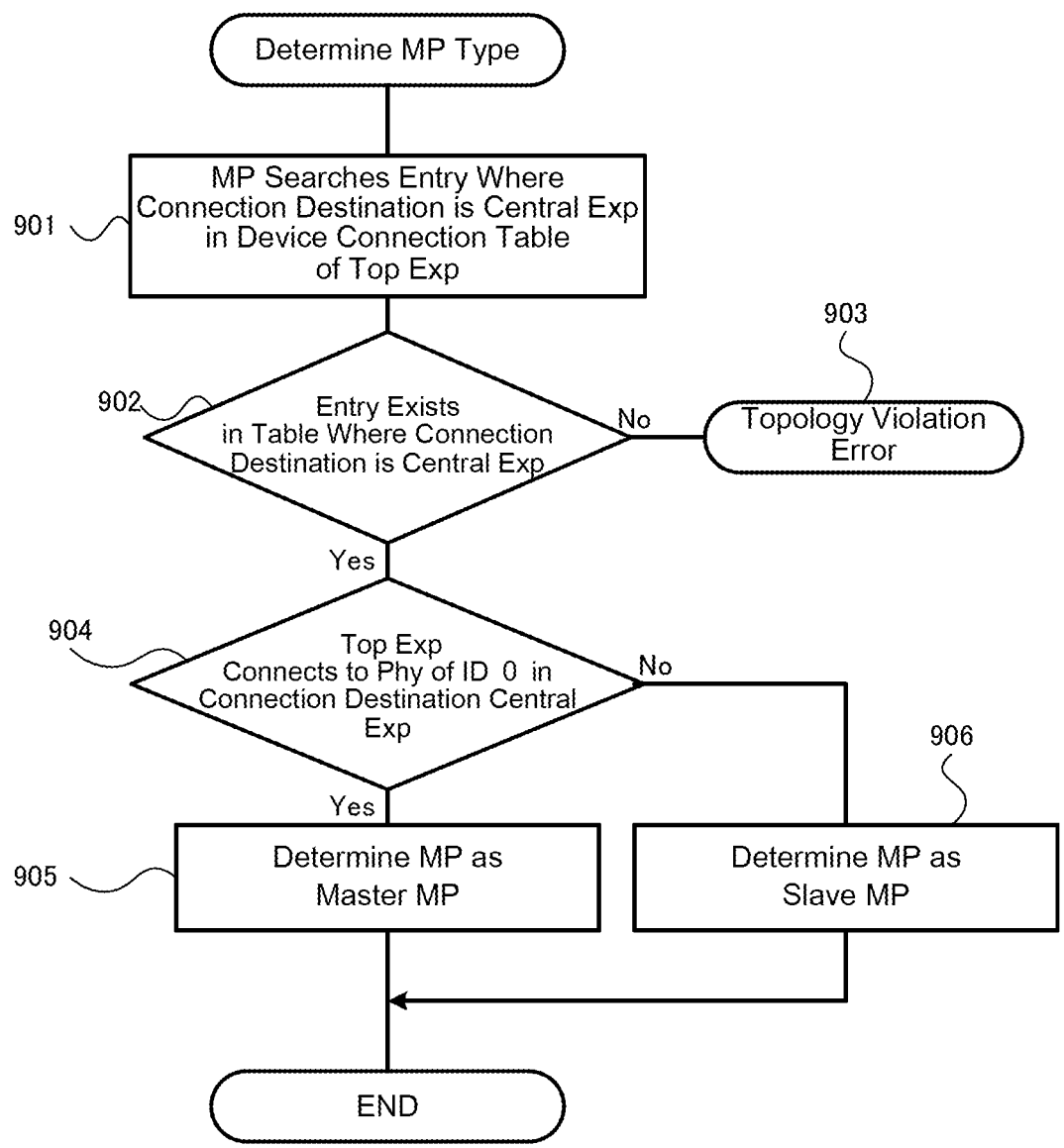
FIG. 6 is a flowchart for determining a processor type according to Embodiment 1.

FIG. 6 is a flowchart of determining a processor type (master processor) which is another process performed as a preprocess before setting a backend network. This process is executed after the device connection table creation process described with reference to FIG. 3.

At first, the processor 103 searches the device connection table 800 of the top expander 110 (901) for an entry where the connection destination device type is a central expander.

Then, the processor 103 determines whether or not there is an entry in the device connection table 800 where the connection destination device is a central expander (902).

If not (902: No), the process is stopped due to topology violation error, and a notice is sent to the administrator of the storage subsystem 100 (903). In a configuration where multiple top expanders exist within a module, the processor searches the device connection table 800 of all the top expanders to check whether or not there is an entry where the connection destination device type is a central expander. If there is even one device connection table 800 having no entry where the connection destination device type is a central expander, then it ends the process due to topology violation error, and sends a notice to the administrator of the storage subsystem 100.

If there is a corresponding entry (902: Yes), the processor checks the Phy ID of the connection destination device (904). If the top expander 110 is connected to a central expander Phy having Phy ID 0, the processor 103 determines itself as a master processor (905).

In contrast, if the top expander 110 is not connected to the central expander Phy having Phy ID 0, the processor 103 determines itself as a slave processor (906). In a configuration where multiple top expanders exist within a module, if any of the top expanders 110 within the module is connected to the central expander Phy having a Phy ID 0, the processor 103 is determined as a master processor, but if no top expander 110 is connected to the central expander Phy having a Phy ID 0, the processor 103 is determined as a slave processor.

The routing attribute of the central expander Phy whose Phy ID is 0 is Subtractive. According to the storage subsystem of the present invention, the module having the top expander connecting to the central expander Phy whose routing attribute is Subtractive is set as the master module. The processor within the master module is defined as the master processor. Further, the module other than the master module is defined as a slave module, and the processor within the slave module is defined as a slave processor. That is, if the routing attribute of each expander Phy of the storage subsystem 100 is as shown in FIG. 2, the processor 103 will be the master processor, the module 101 will be the master module, the processor 153 will be the slave processor, and the module 151 will be the slave module. In the following description of the processes, we will assume that the processor 103 is the master processor, the module 101 is the master module, the processor 153 is the slave processor, and the module 151 is the slave module.

Figure 7:
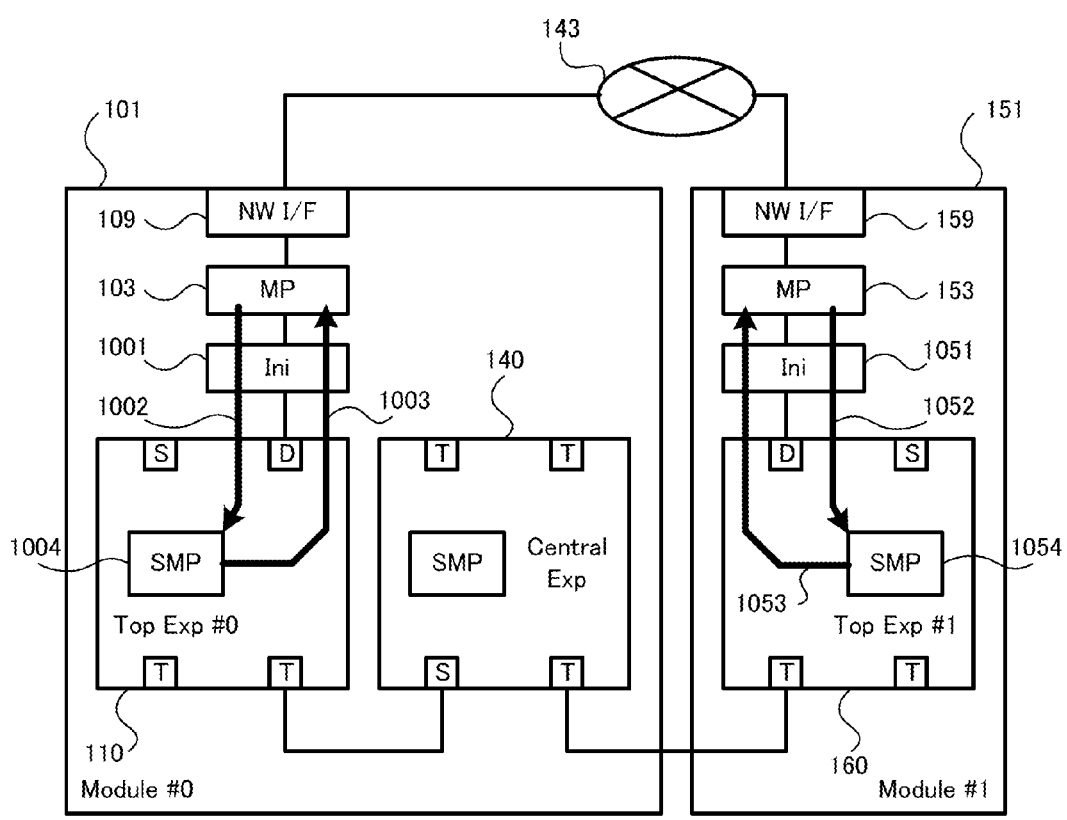
FIG. 7 is a view illustrating a path through which a processor communicates with a top expander according to Embodiment 1.

FIG. 7 is a drawing illustrating a route through which the processor 103 (153) according to Embodiment 1 transmits a Discover request to the top expander, and a route through which the response thereto is received.

In the module 101, the processor 103 transmits a Discover request to an SMP (Serial Management Protocol) target (target device receiving the Serial Management Protocol) 1004 within the top expander 110 through an initiator 1001 within the backend interface 107 (1002). In response, the SMP target 1004 returns a response via the same route through which the Discover request has been received (1003).

Similarly, in the module 151, the processor 153 transmits a Discover request to an SMP target 1054 within the top expander 160 through an initiator 1051 within the backend interface 157 (1052). In response, the SMP target 1054 returns a response via the same route as the route through which the Discover request has been received (1053).

The preprocess before setting a backend network according to the storage subsystem of Embodiment 1 has been described.

Next, we will describe a backend network setting process of a storage subsystem according to Embodiment 1. FIGS. 8 and 9 are flowcharts illustrating the backend network setting process according to Embodiment 1.

It is assumed that prior to executing this flow, the preprocess before setting a backend network described previously (the device connection table creating process of the top expander illustrated in FIG. 3 and the processor type determination process illustrated in FIG. 6) has been completed in the respective modules.

At first, the master processor creates a device connection table of the central expander (1101). The device connection table of the central expander 140 adopts a same format as the device connection table 800 of FIG. 5.

Next, the master processor requests the slave processor to transmit the device connection table 800 of the top expander within each module (1102). If the storage subsystem 100 includes multiple slave modules, the master processor requests all slave processors to transmit the device connection table 800 of the top expander.

In contrast, the slave processor receives the transmission request of the device connection table 800 of the top expander from the master processor (1103). In response, the slave processor transmits a device connection table 800 of the top expander to the master processor (1104).

The master processor receives the device connection table 800 of the top expander from the slave processor (1105). Next, the master processor creates an inter-module connection table 1600 and a Phy correspondence table 1800 based on the received device connection table 800 of the top expander within each module, and stores the same in the memory 104 (1106).

Next, the master processor requests each slave processor to execute a Discover process in each module (1107). Then, the processing of the master processor (1109 through 1202) and the processing of the slave processor (1108 through 1204) are executed in parallel.

The master processor executes the Discover process within the master module (1109). The Discover process performed here is similar to the Discover process executed by a prior art storage subsystem, and by executing this process, the SAS addresses of the devices (SSD, HDD and expander) connected to and beyond each expander are registered to the route table of each expander (110, 119-124) within the module so as to enable routing of access requests to the devices connected beyond the respective expanders. A device connection table as the one illustrated in FIG. 5 is created for each enclosure expander in the memory 104 within the module, and SAS addresses of the devices (HDD, SSD and expander) connected to the respective enclosure expander Phys are stored therein. For example, according to the configuration example of FIG. 1, SAS addresses of HDDs 129 and 130 connected to the enclosure expanders 123 and 124 connected via cascade connection to the relevant enclosure expander 122 are stored in the route table of the enclosure expander 122.

However, since the SAS link 142 connecting the Phy 265 of the central expander 140 and the Phy 254 of the top expander 160 is a Table-to-Table connection in the present Discover process, the master processor cannot perform discovery of devices subsequent to the top expander 160 connected to the central expander 140.

Next, the master processor creates an enclosure management table 2100 and a drive address table 2200 based on the Discover result (1110).

Next, the master processor checks the content of the enclosure management table 2100. Specifically, it checks whether there is topology violation or not (1201).

Then, the master processor receives a drive address table 2200 of the respective slave modules from the respective slave processors (1202).

On the other hand, the slave processor receives an execution request of the Discover process within the slave module from the master processor (1108).

The slave processor executes a Discover process within the slave module (1111). The Discover process performed here is similar to 1109, which is similar to the Discover process executed by a prior art storage subsystem, and by executing this process, the SAS addresses of the devices connected to and beyond the respective expanders are registered in the route table of the respective expanders (160, 169-174). Further, a device connection table as illustrated in FIG. 5 is created for each enclosure expander in the memory 104 within the module, and the SAS addresses of the devices (HDD, SSD and expander) connected to the respective enclosure expander Phy are stored therein.

However, since the SAS link 142 connecting the Phy 265 of the central expander 140 and the Phy 254 of the top expander 160 is a Table-to-Table connection according to the Discover process performed here, the slave processor cannot perform discovery of devices subsequent to the central expander 140 connected to the top expander 160.

Next, the slave processor creates an enclosure management table 2100 and a drive address table 2200 based on the Discover result (1112).

Thereafter, the slave processor checks the contents of the enclosure management table 2100. Specifically, it checks whether there is a topology violation or not (1203).

Then, the slave processor transmits the drive address table 2200 of the slave module to the master processor (1204). The drive address table 2200 contains entries of all the drives including shared/non-shared drives within the modules. The process for extracting only shared drives will be performed in the following step 1205.

The master processor creates a drive list table 2300 from the drive address table 2200 of the master module and the slave module (1205). At this time, the master processor extracts the drives where the drive type 2205 is SSD from the drive address table 2200 of each module, and stores the same in the drive list table 2300.

Next, the master processor creates entries of a route table for central expander 2500 based on the drive list table 2300 and the Phy correspondence table 1800, and updates the central route table for an expander (1206).

After creating the entries of the route table for the master module and the slave module, the master processor transmits the route table for the top expander within the slave module to each slave processor, and requests update of the route table (1207).

Then, the master processor updates the route table for a top expander within the master module (1209).

The slave processor having received the route table for the top expander within the slave module and the update request of the route table from the master processor (1208) updates the top route table for expander within the slave module (1210).

The master processor saves the device connection table of the top expander (800), the device connection table of the central expander, the inter-module connection table (1600), the Phy correspondence table (1800), the enclosure management table (2100), the drive address table (2200) and the drive list table (2300), for example, in the local memory (104). Further, the slave MP saves the device connection table (800), the enclosure management table (2100) and the drive address table (2200) of the top expander, for example, in the local memory (154). Thereby, during addition of module, addition of enclosure or addition of drive, a portion of the table where information should be added or changed by addition is updated based on difference, according to which the amount of processing performed during addition can be cut down, and the process can be completed in a short time.

Next, the details of the process performed in each step illustrated in FIGS. 8 and 9 will be described. At first, with reference to FIG. 10, the process for creating a device connection table of the central expander, which is a process corresponding to step 1101 of FIG. 8, will be described.

The master processor (103) executes a loop process (1301 through 1303) for all External Phys within the central expander 140.

The master processor (103) transmits a Discover request, in which the Phy ID of the External Phy of the central expander 140 is set, to the SMP target within the central expander 140, and receives a response thereto (1302). The received response includes the SAS address and the Phy ID of the connection destination of the Phy of the central expander 140 corresponding to the Phy ID designated by the Discover request.

The processor 103 repeats transmission of the Discover request and reception of a response thereto for all External Phys within the central expander 140 (1303).

Then, the master processor (103) creates a device connection table of the central expander 140 based on the received response, and stores the same in the memory 104. As mentioned earlier, the format of the device connection table created here is the same as the format of the device connection table 800 in FIG. 5, storing the correspondence between the Phy ID of the central expander Phy, the types of devices connected to the central expander, the SAS address of the device connected to the central expander, and the Phy ID of the connection destination device, so that the drawing thereof will be omitted.

Figure 11:
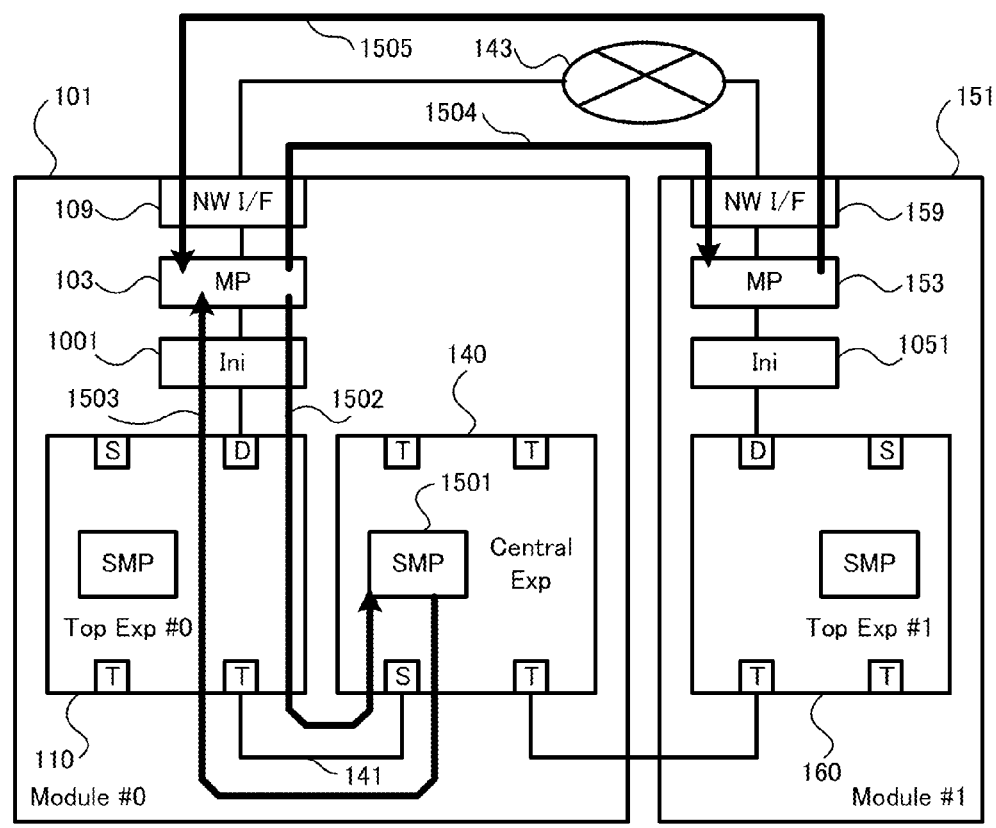
FIG. 11 is a view illustrating a path through which a master process communicates with a slave processor and a central expander according to Embodiment 1.

FIG. 11 is a drawing illustrating a route through which the master processor acquires the device connection table 800 of the top expander from the slave processor in steps 1102 through 1105 of FIG. 8, a route through which the master processor transmits the Discover request to the central expander executed in step 1101 (FIG. 13) of FIG. 8, and a route through which the response thereto is received.

The master processor 103 transmits a Discover request to the SMP target 1501 of the central expander 140 via a route 1502 passing through an initiator (referred to as "Ini" in the drawing) 1001 within the backend interface 107, the top expander 110 and the SAS link 141. In response thereto, the SMP target 1501 of the central expander 140 sends a response to the master processor 103 via an opposite route 1503 as the router 1502. Since the routing attribute of the central expander Phy connected to the top expander 110 is Subtractive, the central expander can return a response even if the central route table for an expander is not set. This is the reason why the module to which the top expander connected to the central expander Phy whose routing attribute is Subtractive is set as the master module.

The master processor 103 transmits a device connection table transmission request of the top expander 160 to the slave processor 153 via a route 1504 passing the network interface 109, the inter-module network 143, and the network interface 159 of the module 151. In response, the slave processor 153 transmits the device connection table 800 of the top expander 160 via an opposite route 1505 as the route 1504.

The transmission and reception of various tables (such as the route table and the drive address table) between the master processor and the slave processor illustrated later is also performed via the inter-module network 143, similar to the device connection table.

FIG. 12 is a drawing illustrating the inter-module connection table created in step 1106 of FIG. 8.

The inter-module connection table 1600 is a table used for creating a Phy correspondence table described later, which stores the connection information between the central expander and the respective top expanders. However, when the master processor creates an inter-module connection table 1600, the connection information between the central expander and the top expander connected to the Phy whose routing attribute of the Phy of the central expander is Subtractive is not stored in the inter-module connection table 1600.

In the inter-module connection table 1600, the expander type of the connection source is stored in field 1601. If the connection source expander type 1601 is a central expander, the SAS address 1602 of the connection source central expander, the Phy ID 1603 of the connection source central expander Phy, the SAS address 1604 of the connection destination top expander, and the Phy ID 1605 of the connection destination top expander Phy are stored in the table. As for the module number 1606, the module number of the master module is stored.

On the other hand, if the connection source expander type 1601 is a top expander, the inter-module connection table 1600 stores the SAS address 1602 of the connection source top expander, the Phy ID 1603 of the connection source top expander Phy, the SAS address 1604 of the connection destination central expander, the Phy ID 1605 of the connection destination central expander Phy, and the module number of the module to which the top expander (top expander specified by the connection source expander type 1601 and SAS address 1602) belongs as the module number 1606.

Figure 14:
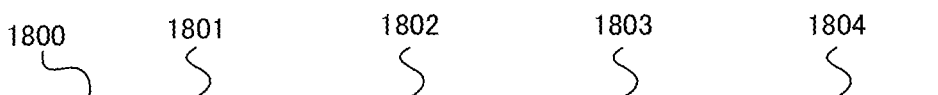
FIG. 14 is a view illustrating a Phy correspondence table according to Embodiment 1.

FIG. 14 is a view illustrating a Phy correspondence table created in step 1106 of FIG. 8.

A Phy correspondence table 1800 is a table collecting the connection information of the central expander and the top expander used for creating a route table for a central expander and a route table for a top expander mentioned later. The Phy correspondence table 1800 stores the correspondence of a Phy ID 1801 of the top expander Phy, a Phy ID 1802 of the central expander Phy connecting to the top expander Phy, a module number 1803 to which the top expander belongs, and a SAS address 1804 of the top expander.

Figure 13:
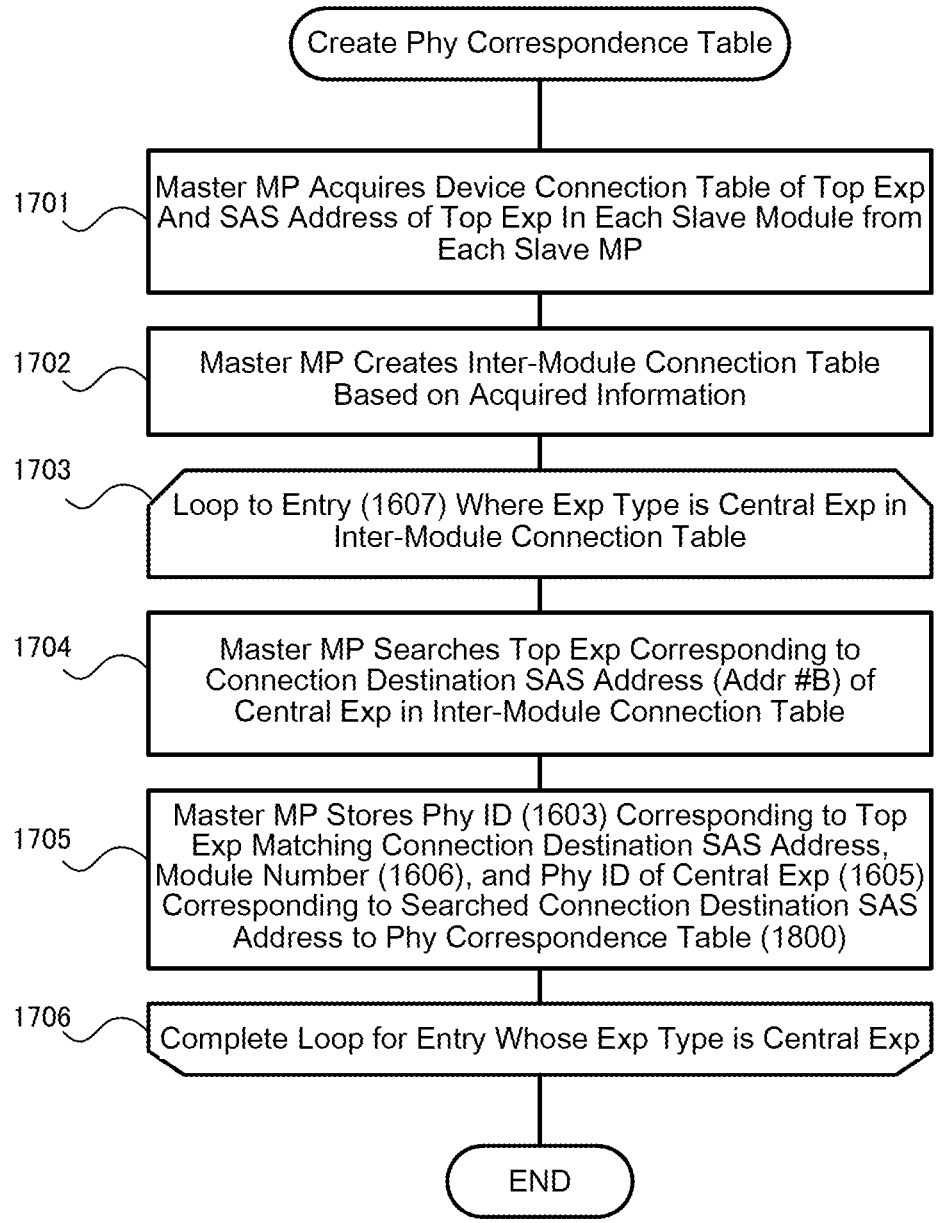
FIG. 13 is a flowchart for creating a Phy correspondence table according to Embodiment 1.

Next, the flow of a process for creating an inter-module connection table and a Phy correspondence table, which are processes corresponding to steps 115 and 1106, will be described with reference to FIG. 13.

The master processor acquires the device connection table 800 of the respective top expanders within each slave module, and a SAS address of each top expander from the respective slave processors (1701). This process corresponds to the process of step 1105 of FIG. 8.

Next, the master processor stores, for each Phy of the central expander, based on the contents of the device connection table of the central expander 140, a SAS address 1602 of the central expander, a Phy ID 1603 of the connection source central expander Phy, a SAS address 1604 of the connection destination top expander, and a Phy ID 1605 of the connection destination top expander Phy in the inter-module connection table 1600 (the example storing this information is area 1607 of FIG. 12). Further, the master processor extracts entries related to the central expander from the device connection table 800 of each top expander within the master module and the device connection table 800 of each top expander of the respective slave modules acquired in step 1701, creates the contents to be stored in the inter-module connection table 1600, and stores the created contents (the area 1608 of FIG. 12 illustrates the example of the created contents) in the inter-module connection table 1600 (1702). As mentioned earlier, the master processor will not create and store the connection information between the central expander and the top expander connected to the Phy of the central expander whose routing attribute is Subtractive.

The next loop process (1703-1706) illustrates a process (1704-1705) executed for the respective entries (entries of the area of 1607 of FIG. 12) where the expander type is a central expander out of all entries of the inter-module connection table 1600.

In step 1704, the master processor searches for entries regarding the top expander corresponding to the connection destination SAS address 1604 of the central expander (Addr # B) in the inter-module connection table 1600 (in other words, it searches for entries stored in the SAS address 1602 having an address equal to the connection destination SAS address 1604 of the central expander (Addr # B)).

Next, the master processor stores the Phy ID 1603, the module number 1606 and the Phy ID 1605 included in the entries regarding the top expander corresponding to the connection destination SAS address (Addr # B) into the Phy correspondence table (1705). The Phy ID 1603 of the top expander is stored in entry 1801 of the Phy correspondence table, the central expander Phy ID 1605 in entry 1802 of the Phy correspondence table, and the module number 1606 in entry 1803 of the Phy correspondence table. When the processes of steps 1704 and 1705 are executed for all entries where the expander type is a central expander out of the entries within the inter-module connection table 1600, the process is ended.

Figure 15:
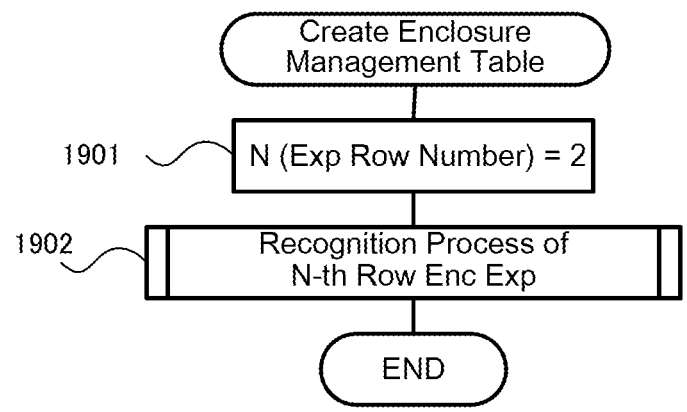
FIG. 15 is a flowchart for creating an enclosure management table according to Embodiment 1.

FIG. 15 is a flowchart for creating an enclosure management table. This process corresponds to the processes of 1110-1201 or 1112-1203 of FIGS. 8 and 9.

In the process for creating an enclosure management table, a variable N is prepared for specifying the number of rows of the expander (number of rows of Exp) being the processing target of the present process. The enclosure management table 2100 manages the information of the expander where the number of rows of the expander from the initiator is the second row or greater (the top expanders 110 and 160 are the expanders on the first row from the initiator, and the expanders connected to and beyond the top expander (enclosure expander) are the expanders of the second row or greater). At the beginning of the process, the processor 103 (153) sets the initial value of variable N (number of rows of the expander) to 2 (1901). Next, the processor 103 (153) executes the recognition process (1902) of each expander (enclosure expander) on the N-th row. In creating the enclosure management table, the processor of each module refers to the device connection table 800, and processes the respective Phys connected from the top expander to the enclosure expander within the module out of the Phys of the top expander. The contents of the process of 1902 will be described with reference to FIG. 16.

Figure 16:
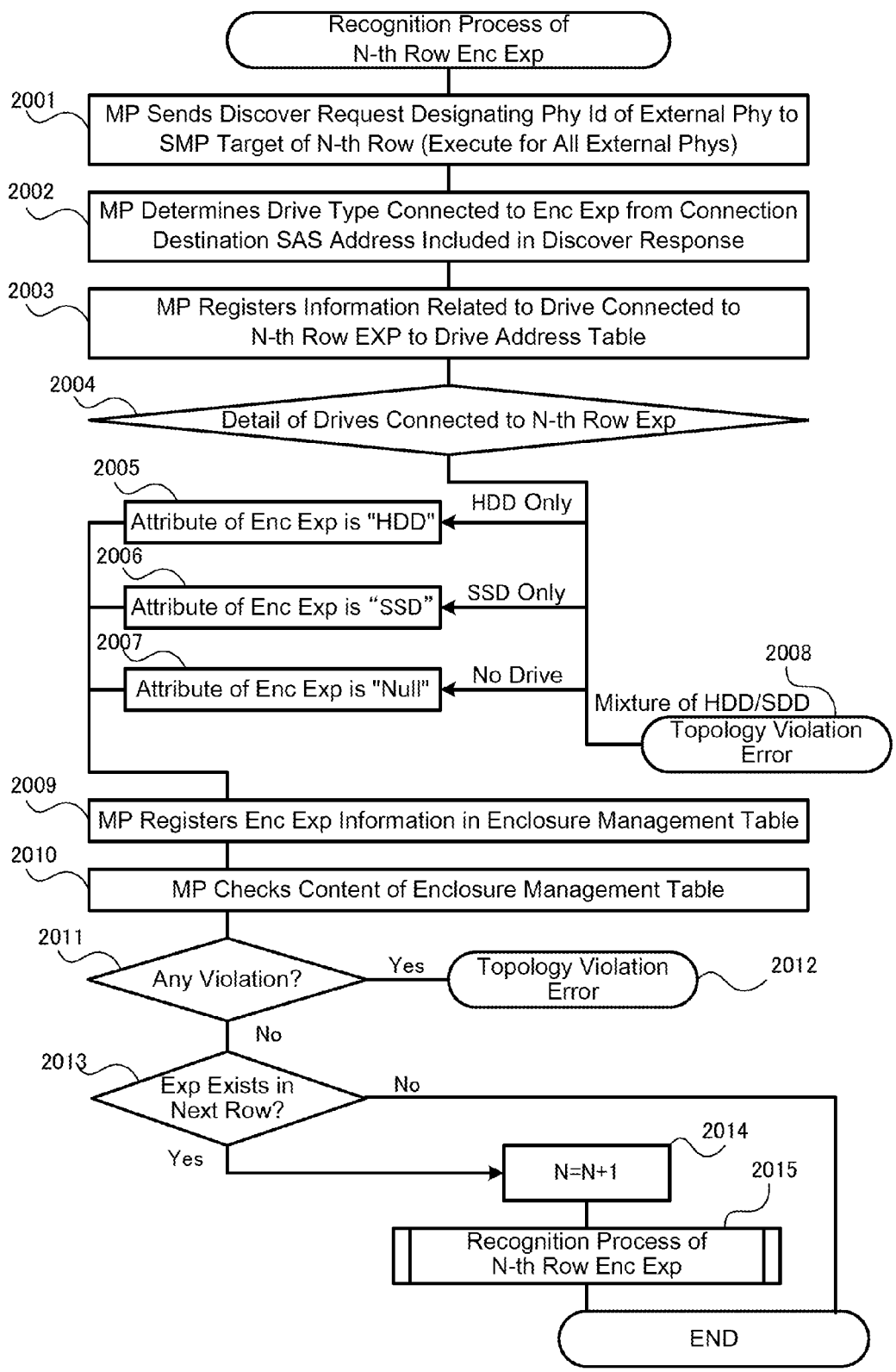
FIG. 16 is a flowchart for creating an enclosure management table according to Embodiment 1.

FIG. 16 is a flowchart of a subroutine (1902 of FIG. 15) in the process for creating the enclosure management table according to Embodiment 1.

At first, the processor (103, 153) transmits a Discover request to the SMP target of each enclosure expander on the N-th row, designating the Phy ID of the External Phy (2001). This transmission of the Discover request is performed for all External Phys of the respective enclosure expanders.

Next, the processor (103, 153) determines the type of the drive connected to the enclosure expander based on the connection destination SAS address included in the response received from the SMP target of the enclosure expander (2002). The drive type can be determined based on a specific information of a drive vender included in the SAS address.

Next, the processor (103, 153) registers the determined drive information in the drive address table 2200 (2003). The contents of the drive address table 2200 will be described in detail later.

Next, the processor checks the details of the drives connected to the enclosure expander (2004).

As a result of checking the details of the drive in 2004, when only HDDs are connected to the enclosure expander, the attribute of the enclosure expander to be stored in the enclosure management table 2100 is determined to be "HDD" (2005). When only SSDs are connected to the enclosure expander, the attribute of the enclosure expander to be stored in the enclosure management table 2100 is determined to be "SSD" (2006). Further, if there is no drive connected to the enclosure expander, the attribute of the enclosure expander to be registered in the enclosure management table 2100 is determined to be "null" (2007). When HDDs and SSDs are connected to the enclosure expander, the backend network setting process is stopped due to topology violation error, and an error (notice that topology violation exists) is notified to the administrator of the storage subsystem 100 via the management terminal (2008).

Next, the processor registers the attribute of the enclosure expander determined via the process of 2005 through 2007 in the enclosure management table 2100 (2009).

Next, whether topology violation exists or not is checked in the processor and the contents of the enclosure management table 2100 (2010). In the backend network setting process of the storage subsystem 100 of Embodiment 1, a check is performed whether the topology of the backend network violates the rules determined in advance (four rules described hereafter) or not. The check to be performed here should confirm that the backend network topology is a topology that will not interfere with the communication between the initiator and the SSD (transmission and reception of commands and data). Therefore, the check is not restricted to the process for checking the four rules described later. Any arbitrary check processing can be executed other than the four check items mentioned later, as long as the process confirms that the network topology does not interfere with the communication between the initiator and the SSD (transmission and reception of commands and data).

The first rule is that the number of rows of connection of the enclosure expander connecting the SSDs from the top expander must be equal to or smaller than a given value. This rule is provided since if the expander is connected in many rows, the access performance between the controller and the storage device is deteriorated. Especially while the SSD has a high access performance, the access performance between the controller and the SSD is deteriorated greatly when the row of the expander is increased. Therefore, providing a restriction on the number of rows of connection of the enclosure expander is an effective method for preventing the deterioration of access performance between the controller and the SSD, and utilizing the high access performance of the SSD. As an example of the above rule, according to the storage subsystem of Embodiment 1, as illustrated in FIG. 1, the number of rows of connection of the enclosure expander connecting the SSD from the top expander is limited to one row, and to two rows counting from the initiator within the same module. That is, the rule is adopted where a configuration is not allowed where the enclosure expander connecting SSDs (or HDDs) is further connected in a cascade connection to the enclosure expander connecting SSDs (when such connection (topology) is detected, an error is determined). The number of rows of connection from the initiator within other modules will be four. However, the number of rows from the top expander of the enclosure expander connecting the SSDs can be more than two rows, if performance allows, as long as it is below the number of rows determined in advance under the condition satisfying the performance requirements.

The second rule is that the enclosure expander connecting the SSDs and the enclosure expander connecting the HDDs must not be connected via cascade connection. Since the HDD has a lower performance than the SSD, if a configuration is adopted where the HDDs and the SSDs are connected via cascade connection (a configuration where the data transfer paths are shared), the communication between the controller and the SSD may be interfered by the communication traffic of a low-performance HDD, and the advantage of the SSD having a high access performance cannot be exerted. In the present embodiment, the connection topology is separated between the HDD and the SSD beyond the top expander, so that the SSD is not easily influenced by the HDD.

The third rule is that SSDs and HDDs must not coexist in the same enclosure expander. The reason is the same as that of the second rule. The third rule is a rule that is checked in steps 2004 through 2008.

The fourth rule is that the number of Phys (or ports) of the top expander capable of connecting the enclosure expander to which HDDs are connected is restricted to a predetermined number or smaller. Since the HDD has a lower performance than the SSD, when the enclosure expander connecting HDDs is connected to multiple Phys of the top expander, the enclosure expander connecting SSDs can only be connected to a small number of Phys of the top expander, and the performance of the SSDs cannot be exerted. Therefore, the type of the enclosure expander that can be connected to the top expander and the number of Phys (or ports) that can be connected to that enclosure expander are set in advance, and whether the number exceeds the set Phy (or port) number or not is checked. The number of Phys (or ports) to which the enclosure expander can connect should preferably set as follows: "number of Phys (or ports) of the top expander capable of connecting the enclosure expander connecting SSDs>number of Phys (or ports) of the top expander capable of connecting the enclosure expander connecting HDDs". (There is no need to restrict the number of Phys (or ports) of the top expander capable of connecting the enclosure expander connecting SSDs, and it is possible to only limit the number of Phys (or ports) of the top expander capable of connecting the enclosure expander connecting HDDs. For example, a rule can be adopted to set the number of Phys (or ports) of the top expander capable of connecting the enclosure expander connecting HDDs to half the number or smaller of the number of all Phys (or ports) of the top expander.) The information required to check the fourth rule is all included in the enclosure management table of FIG. 17.

Another method for setting the number of Phys (or ports) of the top expander capable of connecting the enclosure expander connecting HDDs can set in advance the type of the enclosure expander connectable to each Phy (or port) of the top expander, that is, either the enclosure expander connecting HDDs or the enclosure expander connecting SSDs, and restrict only the set type of enclosure expander to be connected thereto.

It is possible to further restrict the fourth rule, and to set a rule so that the routing attribute of the Phy (or port) of the top expander connecting the enclosure expander connecting HDDs must be a Subtractive attribute. As mentioned earlier, there is only one port having a Phy with a Subtractive routing attribute in an expander, so that by applying this rule, it is possible to suppress the number of Phys (or ports) of the top expander capable of connecting the enclosure expander having HDDs connected thereto to a very small value, and the performance of the SSDs can be exerted easily. Further, when the routing attribute of the Phy constituting a port is Subtractive, it is not necessary to register the address of the SAS device connected via the port to the route table for an expander. By adopting this rule, the number of device addresses that should be registered in the route table for the top expander can be suppressed, and the initialization process and the addition process of the backend network can be increased in speed. When this rule is adopted, similar to the central expander, the routing attribute of the Phy having a Phy ID 0 in the top expander (and the Phy belonging to the same port as the Phy having a Phy ID 0) is set to Subtractive attribute, and whether the enclosure expander to which HDDs are connected is connected to the Phy having a Phy ID 0 in the top expander (and the Phy belonging to the same port as the Phy having a Phy ID 0) should only be confirmed.

The number of rows of connection of the enclosure expander having HDDs connected from the top expander is determined not by performance but by the size of the rack storing the enclosure. For example, the number of rows can be restricted to the twelfth row counting from the initiator within the same module. The limitation value of the number of rows of the enclosure expander connecting the SSDs beyond the top expander should be set smaller than the limitation value of the number of rows of the enclosure connecting the HDDs beyond the top expander, so that the limitation values of the number of rows should be set differently.

The processor checks whether topology violation exists or not (2011), and if there is no violation of the four rules (first to fourth rules) mentioned above found, it advances the flow to 2013. When a topology violating at least one of the four rules is found, the processor stops the flow due to topology violation error, and notifies the same to the administrator of the storage subsystem 100 (2012).

Next, the processor checks whether the enclosure expander of the (N+1)-th row is connected to the enclosure expander of the N-th row or not (2013). This can be confirmed based on the device connection table for each enclosure expander created in steps 1109 or 1111.

If the enclosure expander of the (N+1)-th row is not connect, the processor ends the flow. If the enclosure expander of the (N+1)-th row is connected, the processor increments the variable N (number of rows of the expander) (2014), and executes the present flow in a recursive manner (2015).

FIG. 17 is a view illustrating the contents of the enclosure management table created by the enclosure management table creating process described with reference to FIGS. 15 and 16.

The enclosure management table 2100 is a table gathering information related to the enclosure expander connected to the top expander, used for checking a connection topology of the enclosure and for creating a drive address table described later. The enclosure management table 2100 stores the corresponding relationship between a Phy ID 2101 of the top expander Phy and an enclosre expander information connected to that Phy (either directly or in a cascade). The enclosure expander information includes the number of rows of expander 2107 showing the number of rows counting from the initiator within the same module the relevant enclosure expander is connected, and the information of drives installed in the enclosure (attribute of the enclosure expander determined in steps 2004 through 2007 of FIG. 16). If the content of a certain entry in the enclosure management table 2100 is "HDD", it means that only HDDs are installed in that enclosure, and if the content is "SSD", it means that only SSDs are installed in that enclosure. If the content of a certain entry in the enclosure management table 2100 is "null", it means that no drive is mounted in that enclosure, and if the content is "N/A", it means that there is no enclosure connected to that position in that number of rows. As an example, "HDD" is stored in the entry where the number of rows 2107 is "3" in the row (2106) where the Phy ID i2101 is "24 through 27". Therefore, it means that this entry is an enclosure expander cascade-connected to the Phy (Phy ID is 24 through 27) of the top expander, and that the attribute of the enclosure expander connected to the third row counting from the initiator is "HDD", that is, that it is an enclosure expander having only HDDs loaded thereto. Further, if there are multiple top expanders, the enclosure management table 2100 is created for each top expander.

FIG. 18 is a view illustrating the contents of a drive address table created via step 2003 of FIG. 16. The drive address table 2200 is a table having gathered the drive information mounted to the respective modules used for creating a drive list table described later.

The drive address table 2200 includes a SAS address 2201 of the drive mounted within each module, an enclosure number 2202 storing the drive, a number of rows of expander 2203 showing the number of rows counting from the initiator within the same module the enclosure (the enclosure expander thereof) is connected, and a Phy ID 2204 of the top expander to which the enclosure expander is directly or indirectly connected. If the number of rows of expander 2203 of the enclosure expander to which the drive is connected is three or greater, the Phy ID of the top expander Phy to which the enclosure expander of the second row is connected is stored in 2204. Further, a drive type 2205 showing whether the drives are HDDs or SSDs is stored in the drive address table 2200.

Further, a SAS address 2206 of the top expander (top expander existing in the path from the initiator within the module to the drive) to which the drives are directly or indirectly connected is stored in the drive address table 2200.

Further according to FIG. 18, a flag field 2207 exists in the drive address table 2200, but this field is not used in the storage subsystem 100 according to Embodiment 1. Therefore, the field of the flag 2207 can be omitted from the drive address table 2200 of the storage subsystem 100 according to Embodiment 1. The flag 2207 is information used in the storage subsystem according to Embodiment 4 described later, so it will be described with reference to Embodiment 4.

Figures 19, 20:
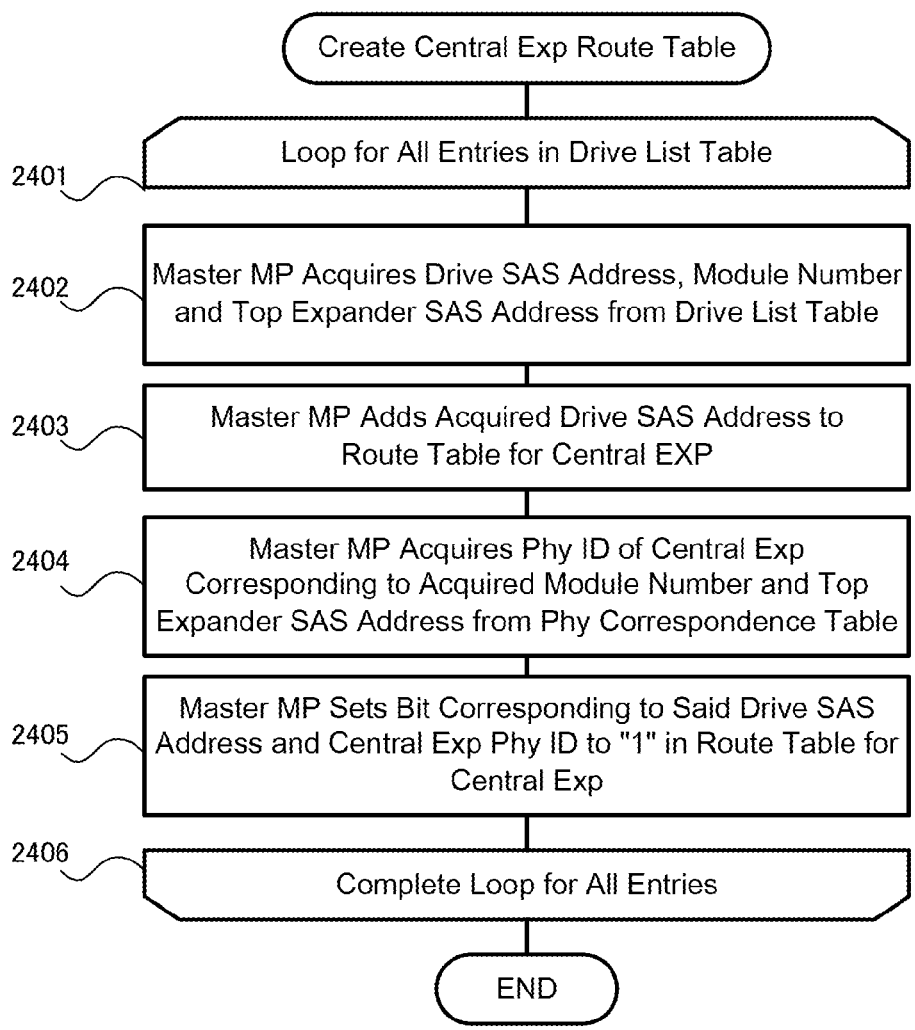
FIG. 19 is a view illustrating a drive list table according to Embodiment 1.
FIG. 20 is a flowchart for creating a route table for a central expander according to Embodiment 1.

FIG. 19 is a view describing a drive list table created in step 1205 of FIG. 9.

The drive list table 2300 is a table having gathered information of the shared drives from the respective modules used for creating a route table for a central expander and a route table for a top expander described later. Information on the corresponding relationship between a SAS address 2301 of the drive (SSD or HDD) shared among modules (101, 151) of the storage subsystem 100, a module number 2302 of the module (101, 151) to which the drive belongs, and a SAS address 2303 of the top expander existing in the route from the initiator to the drive of the module in which the drive belongs are stored in the drive list table 2300. The drive address table 2200 of FIG. 18 is created for each module, and the drive list table 2300 is a table having gathered the SAS addresses and the module numbers of the drives shared among all modules in a table, which is created by the master module. According to the storage subsystem 100 of Embodiment 1, all SSDs are shared among modules, so that in step 1205 of FIG. 9, the master processor extracts entries where the drive type 2205 is SSD in the drive address tables 2200 of the master module and the slave module, and stores, in each entry, the information on a drive SAS address 2201 and a SAS address 2206 of the top expander in the drive SAS address 2301 and the SAS address 2303 of the top expander in the drive list table 2300, and stores the module number to which the drive belongs in the module number 2303 (this information is equal to the module number of the module having owned the drive address table 2200 to which the extracted entry belonged), by which the drive list table 2300 is created. In FIG. 19, a flag field 2304 exists in the drive list table 2300, but flag 2304 is information used in Embodiment 4 described later, and it is not used in the storage subsystem 100 according to Embodiment 1. Therefore, there is no need to provide a flag field 2304 to the drive list table 2300 of the storage subsystem 100 according to Embodiment 1.

FIG. 20 is a flowchart of the process for creating a central route table for an expander according to Embodiment 1. This process corresponds to process 1206 of FIG. 9.

The master processor refers to the drive list table 2300, and executes the process of 2402 through 2405 to all entries within the drive list table 2300.

The master processor acquires, from the drive list table 2300, the drive SAS address 2301, the module number 2302 to which the drive belongs, and the SAS address 2303 (SAS address of the top expander existing in the route from the initiator to the drive of the module to which the drive belongs) (2402).

Next, the master processor adds the drive SAS address (2301) acquired in step 2402 to the route table for central expander 2500 (2403).

Next, the master processor acquires a Phy ID (1802) of a central expander Phy of the row where the value equivalent to the module number acquired in step 2402 is stored in module number (1803) and the value equivalent to the SAS address (2303) acquired in step 2402 is stored in the SAS address (1804) field from the Phy correspondence table 1800 (2404). If the top expander and the central expander are connected via a wide link, multiple Phy IDs are acquired. In this process, it may be possible that there is no corresponding row (row where a value equivalent to the module number acquired in step 2402 is stored in module number (1803) and a value equivalent to the SAS address (2303) of the top expander acquired in step 2402 is stored in the field of SAS address (1804)) found in the Phy correspondence table 1800. Such case occurs when a storage device (SSD) corresponding to the drive SAS address 2301 acquired in step 2402 is connected beyond the top expander connected to the Phy whose routing attribute of the central expander Phy is Subtractive. However, as for the device connected beyond the top expander connected to the Phy whose routing attribute is Subtractive in the Phy of the central expander, the device can be accessed even if the SAS address of that device is not registered in the route table for a central expander, so that there is no problem. In this case, the drive SAS address registered in the route table 2500 is deleted in step 2403. Then, the process is returned to step 2402 without performing the process of step 2405, and a process is performed to the next entry in the drive list table 2300.

Next, the master processor sets the bit corresponding to the drive SAS address and the Phy ID of the central expander to "1" in the route table for a central expander (2405). When the top expander and the central expander are connected via a wide link, bits corresponding to multiple Phy IDs are set to "1". In other words, if there are multiple SAS links found between the top expander and the central expander, the bits corresponding to the Phy IDs of the respective Phys connecting to the SAS link of the route table are set to "1". When the process of steps 2402 through 2405 has been performed for all entries within the drive list table 2300, the process of creating a route table for a central expander is ended.

Figure 22:
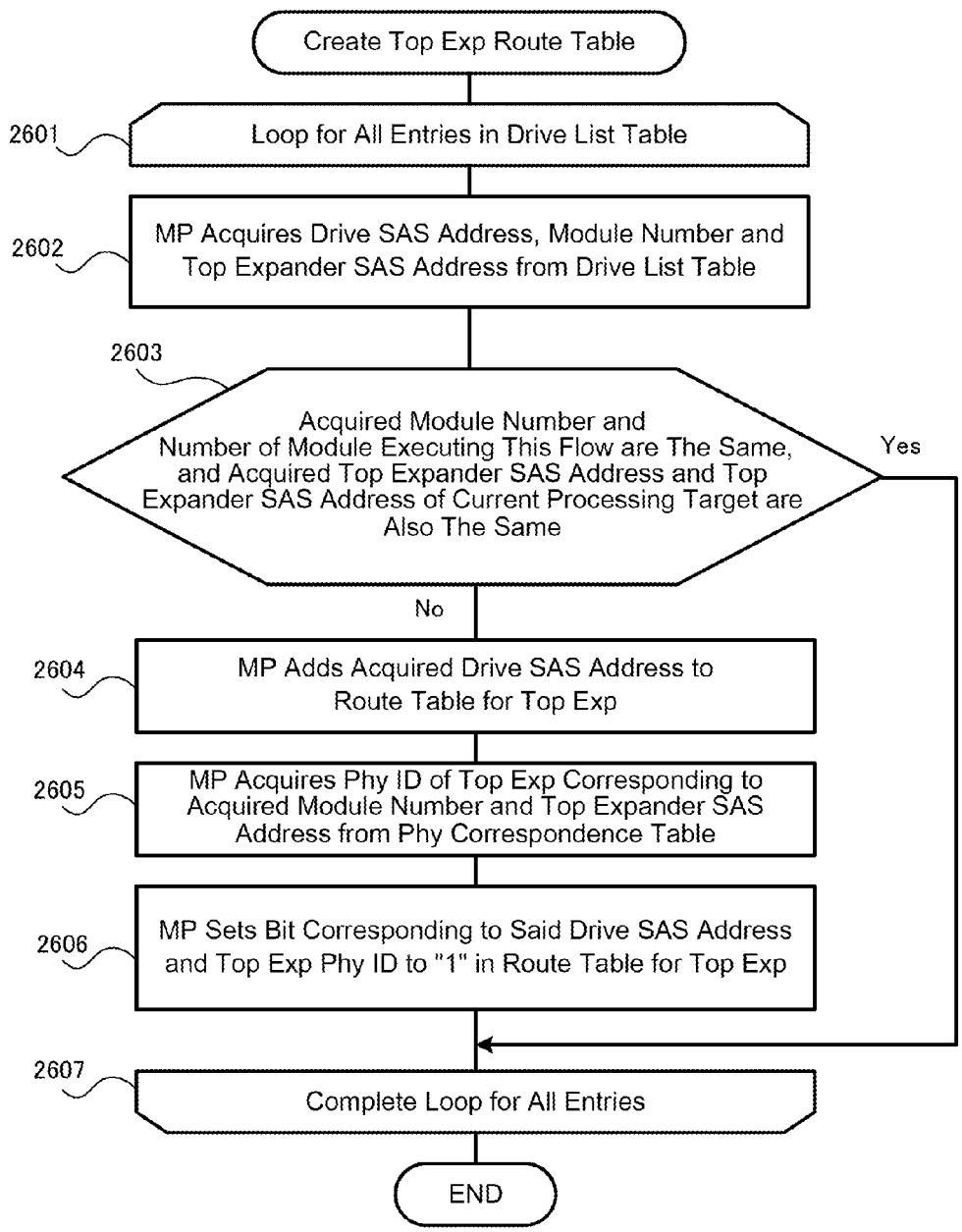
FIG. 22 is a flowchart for creating a route table for a top expander according to Embodiment 1.

FIG. 21 is a view illustrating the contents of a route table created by the route table creating process of FIGS. 20 and 22.

A route table 2500 shows the correspondence between a SAS address 2501 and a Phy ID 2502 of the expander Phy. When the expander receives a connection request, it searches for a connection destination SAS address of the connection request from the SAS address 2501 of the route table 2500. When the connection destination SAS address of the connection request matches the SAS address 2501, the expander establishes a connection to the Phy connecting to a different end of the SAS link connected to the Phy whose entry of the corresponding Phy ID in the route table 2500 is "1". When there are multiple entries where "1" is stored corresponding to the connection destination SAS address of the connection request, the expander selects any Phy, especially a Phys where communication is not currently performed, and a connection is established to the Phy connected to another end of the SAS link connecting to the selected Phy.

FIG. 22 is a flowchart for creating a route table for top expander according to Embodiment 1. This flow is a process corresponding to process 1207 of FIG. 19, wherein the processor of the master module creates a route table for a top expander 2500 connected to each module. One route table for a top expander 2500 is created by executing the process of FIG. 22 once. Therefore, if there is a storage subsystem where n numbers of top expanders exist, the process of master module of FIG. 22 is executed for n times.

The processor refers to the drive list table 2300, and the processes of 2602 through 2606 described hereafter are executed in a loop for all entries (2601-2607).

The processor selects one entry from the drive list table 2300, and acquires the drive SAS address 2301, the module number 2302 to which the drive belongs, and the SAS address 2303 of the top expander from the selected entry (2602).

Next, the processor determines whether the module number acquired in step 2602 and the module number of the module to which the processor executing this flow belongs are the same or not, and whether the acquired SAS address 2303 of the top expander and the SAS address of the top expander being the current processing target are the same or not (2603). When this determination is No, the procedure advances to 2604, and if Yes, the procedure advances to 2607.

Next, the processor adds the drive SAS address acquired in step 2602 to the route table for a top expander (2604).

Next, the processor acquires a Phy ID (1801) of a top expander Phy in the row where a value equal to the value of the module number acquired in step 2602 is stored in the module number (1803) and the value equivalent to the SAS address acquired in step 2602 is stored in the field of the SAS address (1804) from the Phy correspondence table 1800 (2605). When the top expander and the central expander are connected via a wide link, multiple Phy IDs are acquired.

Next, the processor sets a bit corresponding to the drive SAS address and the Phy ID of the top expander Phy acquired in step 2605 to "1" in the route table for a top expander (2606). When the top expander and the central expander are connected via a wide link, bits corresponding to multiple Phy IDs are set to "1". In other words, if there are multiple SAS links found between the top expander and the central expander, the bits corresponding to the Phy IDs of the respective Phys connected to the SAS link in the route table are set to "1".

When processes up to 2606 have been completed for all entries, the creation of the route table is completed. When the creation of all route tables for top expanders 2500 have been completed, the respective created route tables for top expanders 2500 are transmitted to the processors of the respective slave modules via the inter-module network 143, and the processors of the respective slave modules perform setting or update of the route table for a top expander connected to their own modules, as described in steps 1208 and 1210 of FIG. 12.

The above described the backend network setting process of the storage subsystem according to Embodiment 1.

Further, since the HDDs have a lower performance than SSDs, when a connection is established from a large number of initiators of the backend interface of the controller to the HDDs, only a small number of initiators can establish a connection to SSDs, and the high performance of the SSDs cannot be exerted. Therefore, it is possible to provide a function enabling the administrator to set up the type of the drive to which connection can be established for each initiator of the backend interface to the storage subsystem according to the embodiment of the present invention. In that case, the processor (104, 154) of the controller operates to establish a connection with a command transmission destination drive based on the information of the type of the drive set to the initiator.

For example, in a storage system having four initiators (which are temporarily referred to as initiators 0, 1, 2 and 3) in the backend interface, we will assume a case where the administrator sets the storage subsystem so that initiator 0 can only establish a connection to HDDs, and other initiators (initiators 1 through 3) can only establish a connection to SSDs. In that case, when the storage controller accesses the HDD, the controller refers to the set information, and recognizes that the only initiator capable of establishing a connection to the HDD is initiator 0. Thus, the storage controller performs transmission and reception of a command to the HDD via the initiator 0 (transmission and reception of a command can only be performed via initiator 0). In contrast, initiators 1 through 3 can be used for accessing SSDs, so that the deterioration of access performance to the SSDs can be suppressed.

Next, the flow of an addition process according to a storage subsystem of Embodiment 1 will be described with reference to FIGS. 23 through 26.

Figure 23:
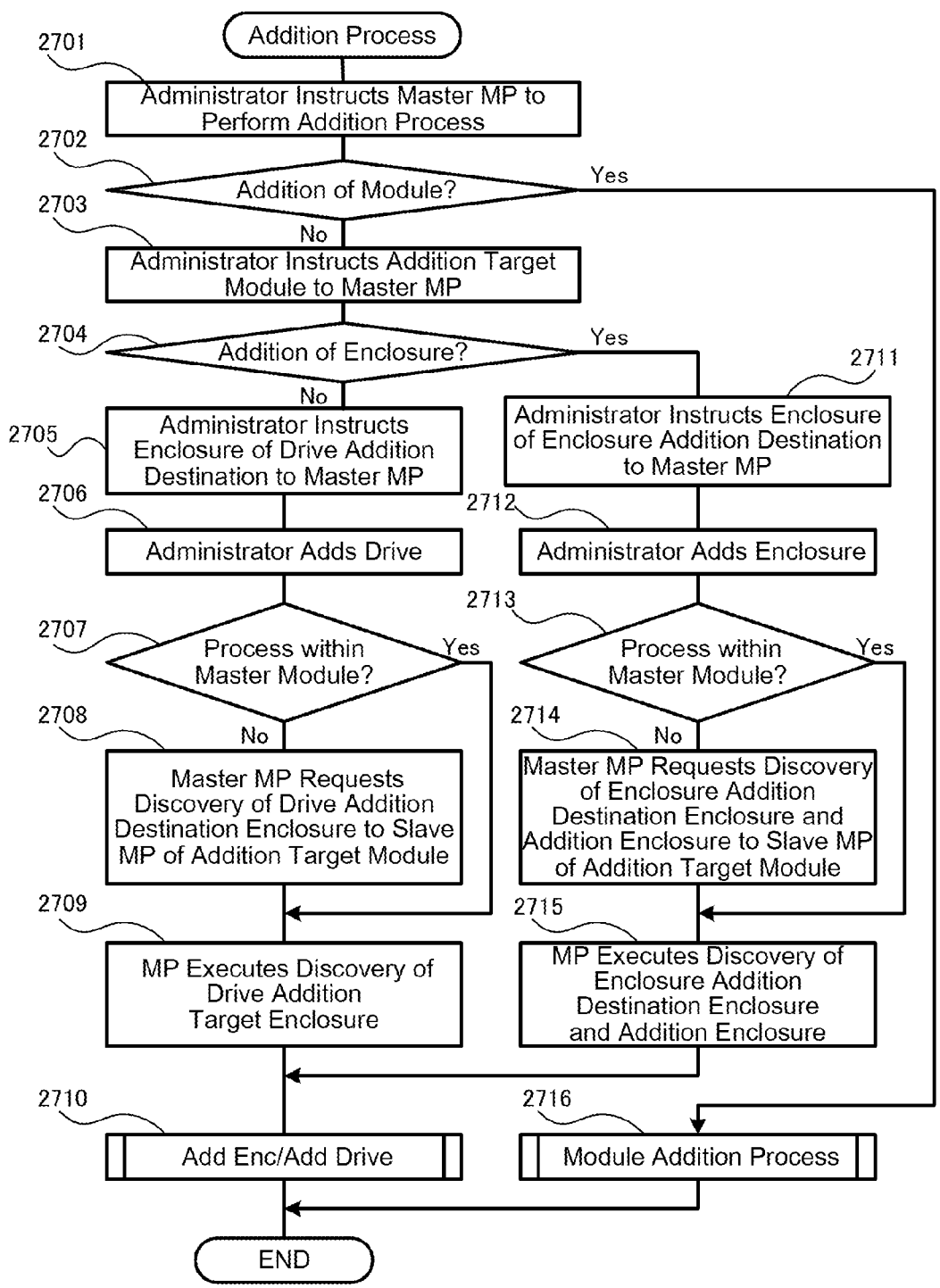
FIG. 23 is a flowchart of an addition process according to Embodiment 1.

FIG. 23 is a flowchart of an addition process according to Embodiment 1.

At first, the administrator instructs an addition process of a module or enclosure (drive enclosure mounting HDDs or SSDs) or drive to the master processor using a management terminal and the like (2701). The master processor having received the instruction determines whether the addition target is a module or not (2702).

Figure 25:
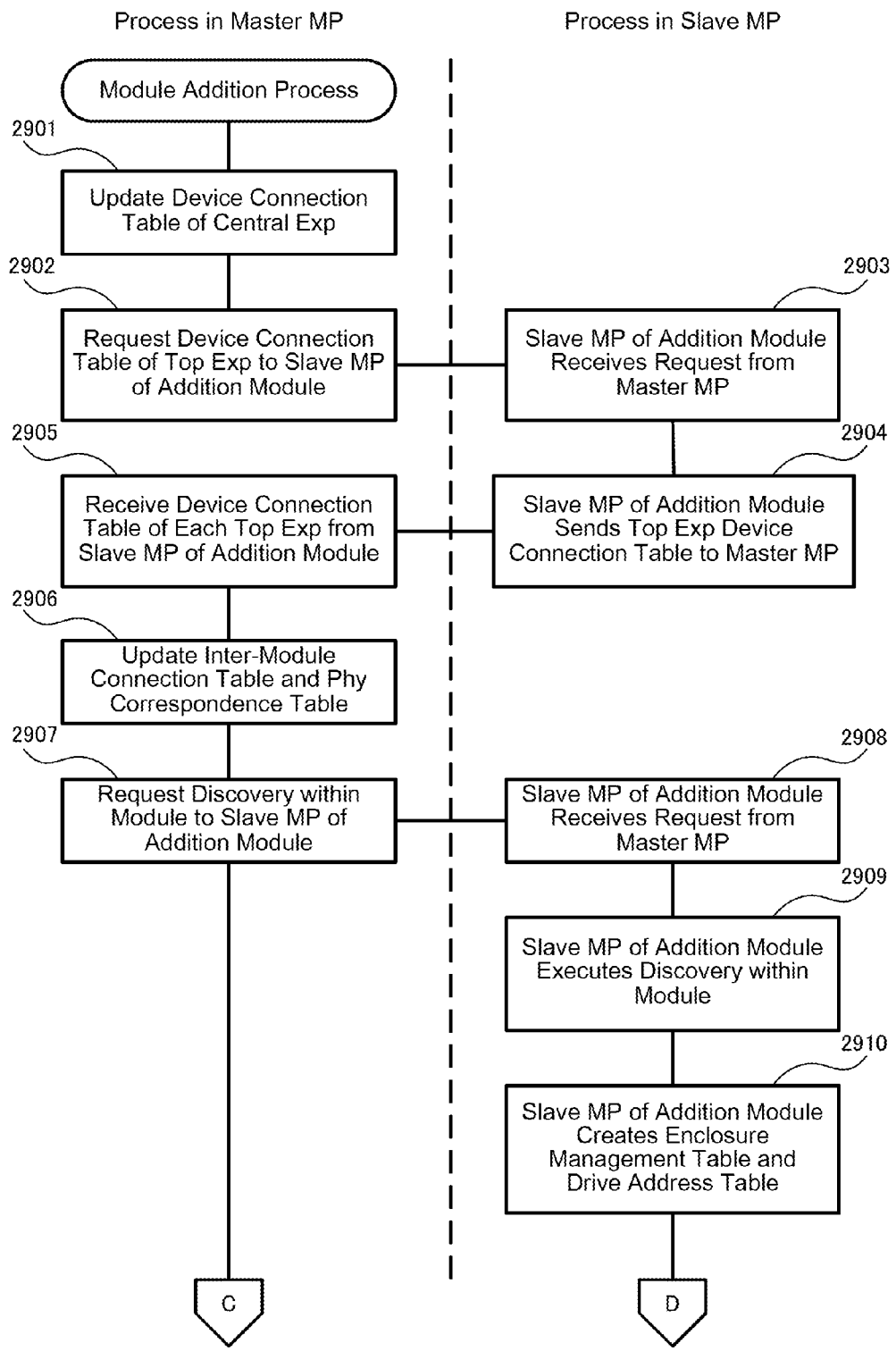
FIG. 25 is a flowchart of a module addition process according to Embodiment 1.
Figure 26:
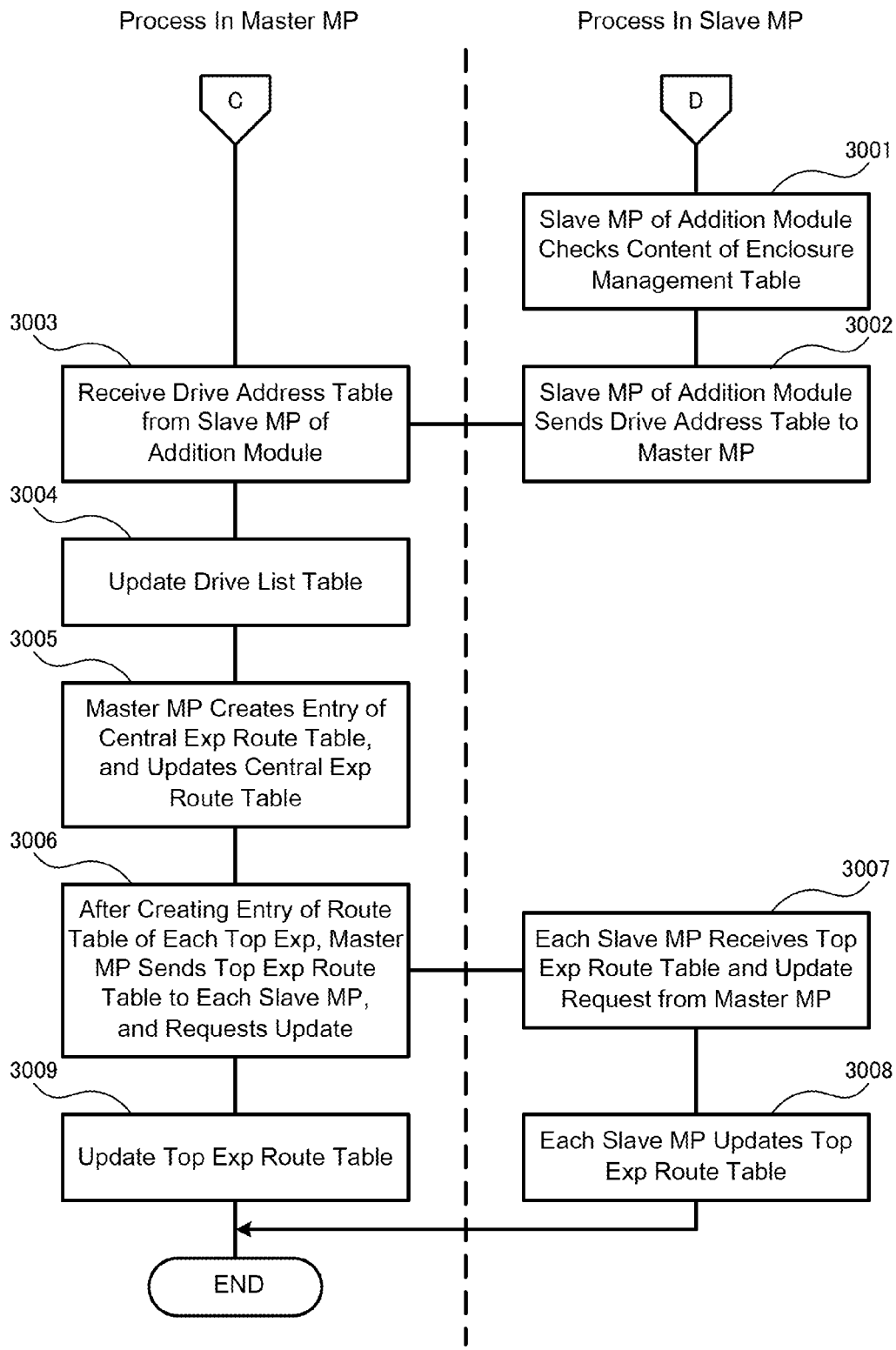
FIG. 26 is a flowchart of a module addition process according to Embodiment 1.

If the instruction of the addition process is an instruction of module addition (2702: Yes), the flow executes a module addition process of 2716. The module addition process will be described in detail later (FIGS. 25, 26).

If the instruction of the addition process is not an instruction to add a module (2702: No), it means that the instruction is for adding an enclosure or a drive, but in that case, the administrator instructs the addition destination module (number) of the enclosure or the drive to the master processor (2703).

The master processor having received the instruction determines whether the addition target is an enclosure or not (2704). If the instruction of the addition process is an enclosure addition, the flow advances to 2705, whereas if the instruction is a drive addition, the flow advances to 2711.

Steps 2705 through 2709 show the addition process of a drive. At first, the administrator uses a management terminal or the like to notify the enclosure information of the drive addition destination to the master processor (2705).

Next, the administrator adds a drive (2706). That is, a drive is installed to an enclosure of the drive addition destination.

If the addition process is a process within the master module (2707: Yes), the flow advances to 2709, and if the process is not within the master module (2707: No), the flow advances to 2708.

In 2708, the master processor requests the slave processor of the addition target module of the drive to execute a Discover process to the drive addition destination enclosure.

In 2709, the processor of the drive addition destination module (the master processor, or the slave processor having received the request of the Discover process from the master processor in 2708) executes the Discover process to the drive addition destination enclosure. Here, the processor of the drive addition destination module updates the entry in the route table for the top expander related to the routing to the enclosure expander from the top expander within that module. Further, it updates the enclosure management table.

Steps 2711 through 2715 correspond to the addition process of the enclosure. At first, the administrator notifies the information related to the enclosure to which the added enclosure is to be connected (hereafter, this is called an enclosure addition destination enclosure) to the master processor using a management terminal and the like (2711).

Next, the administrator adds an enclosure (2712). That is, the enclosure to be added is connected to the enclosure addition destination enclosure.

If the addition process is a process within the master module, the flow advances to 2715, and if the process is not within the master module, the flow advances to 2714.

In 2714, the master processor requests the slave processor of the addition target module of the enclosure to execute the Discover process of the enclosure addition destination enclosure and the enclosure to be added.

In 2715, the processor of the enclosure addition destination module (master processor or the slave processor having received the request of the Discover process from the master processor in 2714) executes the Discover process to the enclosure addition destination enclosure and the enclosure to be added. The processor of the enclosure addition destination module updates the entry in the route table for the top expander related to the routing from the top expander to the enclosure expander within the module. Further, it updates the enclosure management table.

Next, the flow advances to step 2710 which is common for the drive addition and the enclosure addition. The contents of the process of 2710 will be described with reference to FIG. 24.

Figure 24:
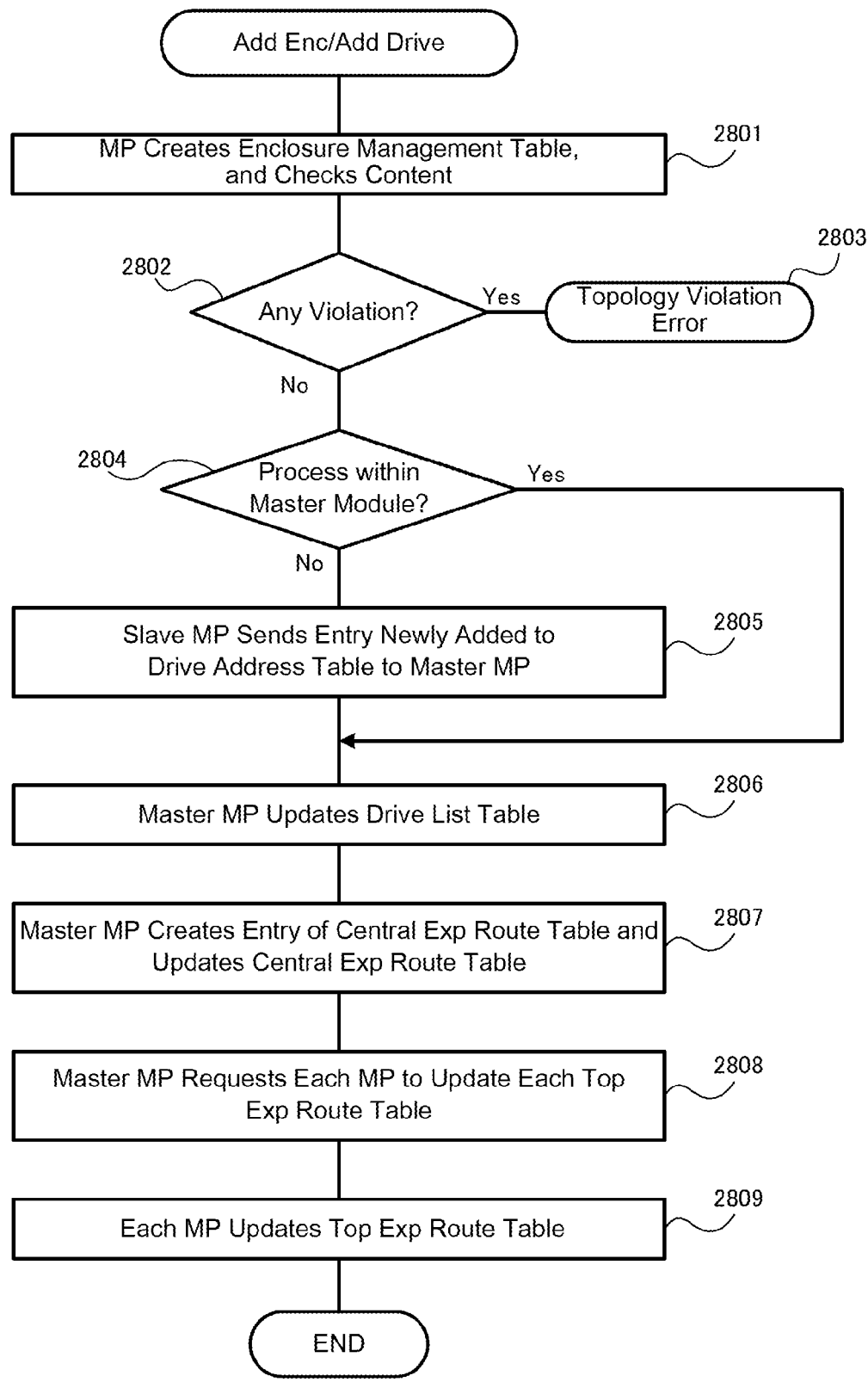
FIG. 24 is a flowchart of an enclosure or drive addition process according to Embodiment 1.

FIG. 24 is a flowchart of an enclosure or drive addition process, which is a process corresponding to step 2710 of FIG. 23.

The processor (processor of the destination of addition of the enclosure or the drive. Hereafter, unless otherwise stated, in the description of the process flow of FIG. 24, "processor" is used as a term referring to the processor of the destination of addition of enclosure or drive) updates the drive address table and the enclosure management table based on the result achieved via the Discover process performed in process 2709 or 2715 described above, and checks whether topology violation has occurred or not (2801). The check of whether topology violation has occurred or not is similar to the check performed in step 2004 and 2010 of FIG. 16.

When there is no topology violation, the processor advances the flow to 2804 (2802). When topology violation is found, the flow is discontinued due to topology violation error, and a notice is sent to the administrator of the storage subsystem 100 (2803).

Thereafter, the processor determines whether the present flow is a process performed within the master module or not (2804). That is, the processor determines whether the processor itself is a master processor or not. If the processor determines that the process is within the master module, the processor advances the flow to 2806, and if not, it advances the flow to 2805.

The procedure is advanced to 2805 when the present flow is executed by the slave processor. In that case, in step 2805, the slave processor transmits the entry newly added to the drive address table to the master processor. The processes performed thereafter (2806 through 2808) are executed in the master processor.

Next, the master processor updates the drive list table 2300 (2806). Next, the master processor creates an entry of the route table for a central expander, and updates the route table for the central expander (2807). Next, the master processor creates update information of the respective route tables for the top expanders, and requests update of the route tables for top expanders to the processors of the respective modules (2808).

Next, the processors of the respective modules update the respective route tables for top expanders (2809).

FIGS. 25 and 26 are flowcharts of the module addition process according to Embodiment 1. It is assumed that prior to execution of the present flow, both the device connection table creation flow of the top expander of FIG. 3 and the determination flow of the processor type of FIG. 6 have been both completed in the addition module.

At first, the master processor transmits a Discover request to the SMP target of the central expander, and updates the device connection table of the central expander (2901).

Next, the master processor requests the processor within the addition module (slave processor) to transmit the device connection table 800 of the top expander within the addition module (2902).

In response, the slave processor within the addition module receives the transmission request of the device connection table 800 of the top expander from the master processor (2903). Then, the slave processor within the addition module transmits a device connection table 800 of the top expander to the master processor (2904).

The master processor receives the device connection table 800 of the top expander from the slave processor of the addition module (2905).

Next, the master processor updates the inter-module connection table 1600 and the Phy correspondence table 1800 based on the received device connection table 800 of the top expander within the addition module (2906).

Next, the master processor requests the slave processor within the addition module to execute the Discover process within the addition module (2907). The slave processor receives the request to execute the Discover process within the addition module from the master processor (2908), and executes the Discover process within the slave module in response thereto (2909). Here, the slave processor sets the entries in the route table for the top expander related to the routing from the top expander to the enclosure expander. The present Discover process is similar to the Discover process executed by the prior art storage subsystem, and by executing this process, the SAS addresses of the devices (SSD, HDD and expander) connected either directly or indirectly to the respective expanders are registered to the respective route tables for expanders within the addition module.

Next, the slave processor creates an enclosure management table 2100 and a drive address table 220 of the addition module based on the Discover result (2910). Thereafter, the slave processor checks whether topology violation exists or not based on the contents of the enclosure management table (3001). The check whether topology violation exists or not is similar to the processes 2004 and 2010 of FIG. 16. Thereafter, the slave processor transmits a drive address table of the slave module to the master processor (3002).

The master processor receives a drive address table of the addition module from the slave processor within the addition module (3003), and updates the drive list table 2300 based on the received drive address table of the addition module (3004).

Next, the master processor creates an entry of the route table for central expander 2500 based on the updated drive list table 2300 and the Phy correspondence table 1800, and updates the route table for the central expander (3005). This process is similar to the process 1206 of FIG. 9.

Then, after creating the route table for top expander within the addition module, the master processor transmits the route table for the top expander within the addition module to the slave processor within the addition module, and requests update (3006).

Next, the master processor updates the route table for the top expander within the master module (3009).

The slave processor having received the update information of the route table for the top expander within the slave module from the master processor (3007) performs update based on the received update information (3008).

The master processor saves the device connection table of the top expander (800), the device connection table and the inter-module connection table of the central expander (1600), the Phy correspondence table (1800), the enclosure management table (2100), the drive address table (2200) and the drive list table (2300) in the local memory (104), for example. Further, the slave MP saves the device connection table of the top expander (800), the enclosure management table (2100) and the drive address table (2200) in the local memory (154), for example. Thereby, even when further module addition, enclosure addition or drive addition is performed, a portion of the table having information added thereto or changed by the addition is updated by difference, so that the amount of processes performed during addition can be reduced, and the process can be completed in a short time.

The above describes the addition process of the storage subsystem according to Embodiment 1.

Next, a load distribution process according to Embodiment 1 will be described.

An inter-module load distribution process where I/O processing is migrated from a module with a high load to a module with a small load can be performed in the storage subsystem 100 according to Embodiment 1. The I/O processing being the target of this load distribution process is the access to SSDs shared among modules.

Figure 27:
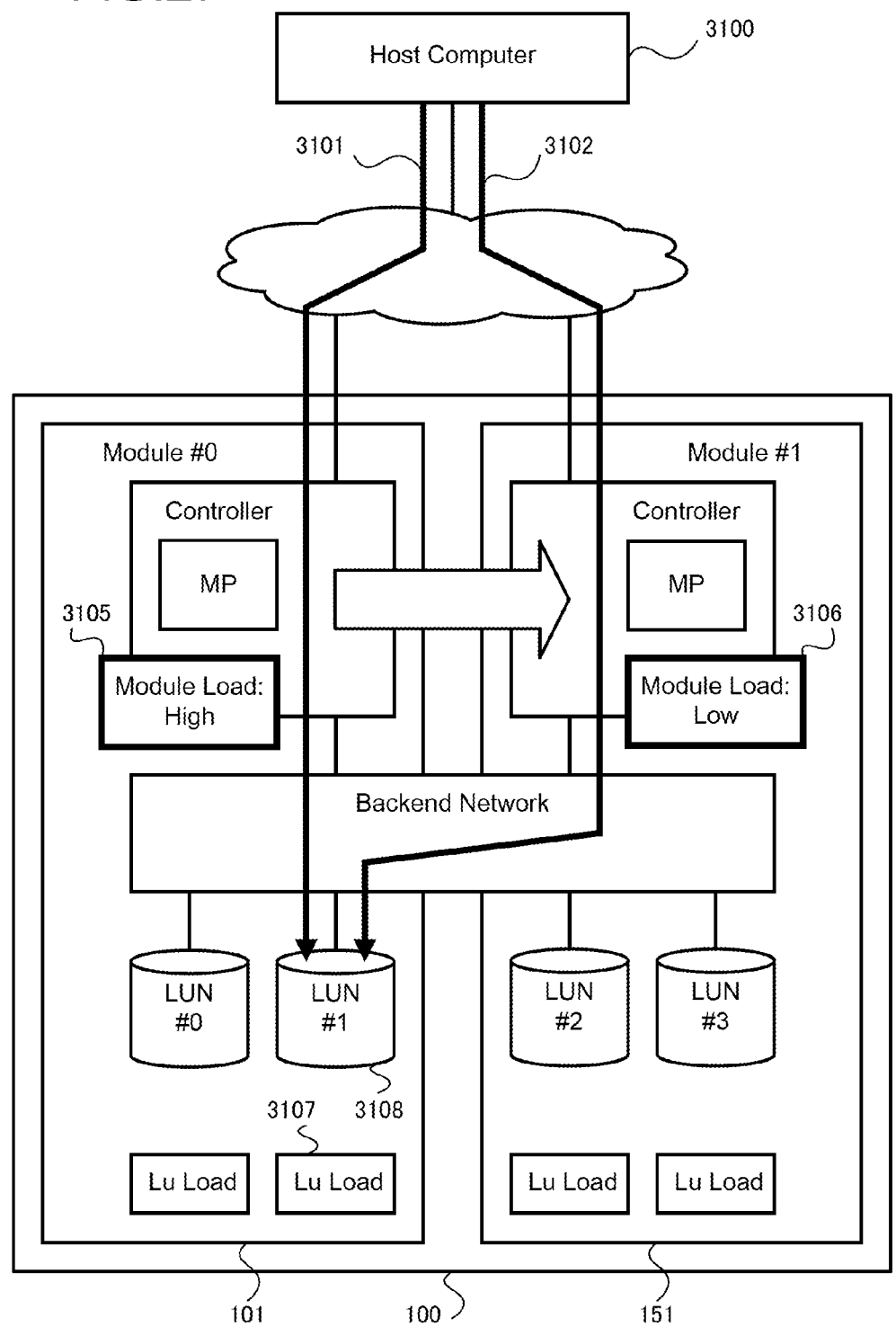
FIG. 27 is a view illustrating an outline of an inter-module load distribution process according to Embodiment 1.

FIG. 27 is a view illustrating the outline of an inter-module load distribution process according to Embodiment 1.

The term LU (Logical Unit) in the following description refers to a logical volume composed of one or multiple SSDs, and LUN (Logical Unit Number) refers to the number assigned to the logical volumes. Each LU is composed of one or multiple SSDs belonging to a module. That is, when an LU is composed of multiple SSDs, the multiple SSDs all belong to the same module.

In FIG. 27, the host computer 3100 accesses a LUN #1 (3108) by issuing a command to the module 101 of the storage subsystem 100. Further according to the storage subsystem 100, a module in charge of processing accesses from the host computer 3100 and the like (this module is called an "owner") is determined as the module 101 or module 151 per LU (or the SSD constituting the LU), wherein the owner module stores the write data from the host computer 3100 to the respective LUs (or the SSDs constituting the LU) or transmits the data read from each LU (or the SSD constituting the LU) to a host computer. The owner of each LU can be changed by an instruction from an administrator using the management terminal, or by a load distribution process described later. The respective modules (101, 151) constantly measure the load of the processor of the module and the load of the respective LUs.

Figure 28:
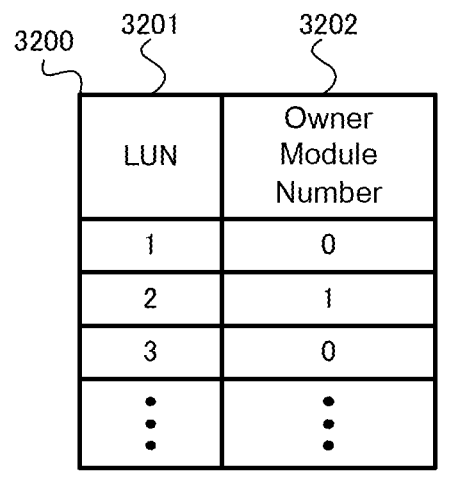

FIG. 28 illustrates a LUN mapping table 3200 managed by the respective modules in the storage subsystem according to Embodiment 1 of the present invention. As mentioned earlier, according to the storage subsystem 100 of Embodiment 1 of the present invention, the module in charge of processing accesses to the LU (which is called an "owner" hereafter) is determined for each LU, and the LUN mapping table 3200 manages the number of the module which is the owner of each LU (owner module number). The respective rows of the LUN mapping table 3200 indicate that the owner of the LU specified by LUN 3201 is the module having the module number stored in owner module number 3202. Each module retains the same LUN mapping table 3200 in the internal memory of the module, and when an owner of a certain LU is changed, the contents of the LUN mapping table of all modules are also changed.

Now, we will assume a case where the load of the processor of the module 101 exceeds a given value, and the load of module 151 is smaller than a given value. Moreover, we will assume that in the module 101, the load with respect to the LUN #1 (3108) is especially high. In that case, the module (owner) in charge of processing accesses from the host computer 3100 and the like to the LUN #1 (3108) is changed from module 101 to module 151, and change of ownership is notified to the host computer 3100, so that commands are issued to the module 151 thereafter so that access to the LUN #1 is performed thereby. By adopting the backend network configuration according to the present embodiment, sharing of SSDs among modules is made possible. Thereby, the I/O processes from the host computer 3100 to the volume (LUN #1 (3108)) composed of the relevant SSD is migrated from module 101 to module 151, and the load can be distributed among modules of the storage subsystem 100.

Figure 29:
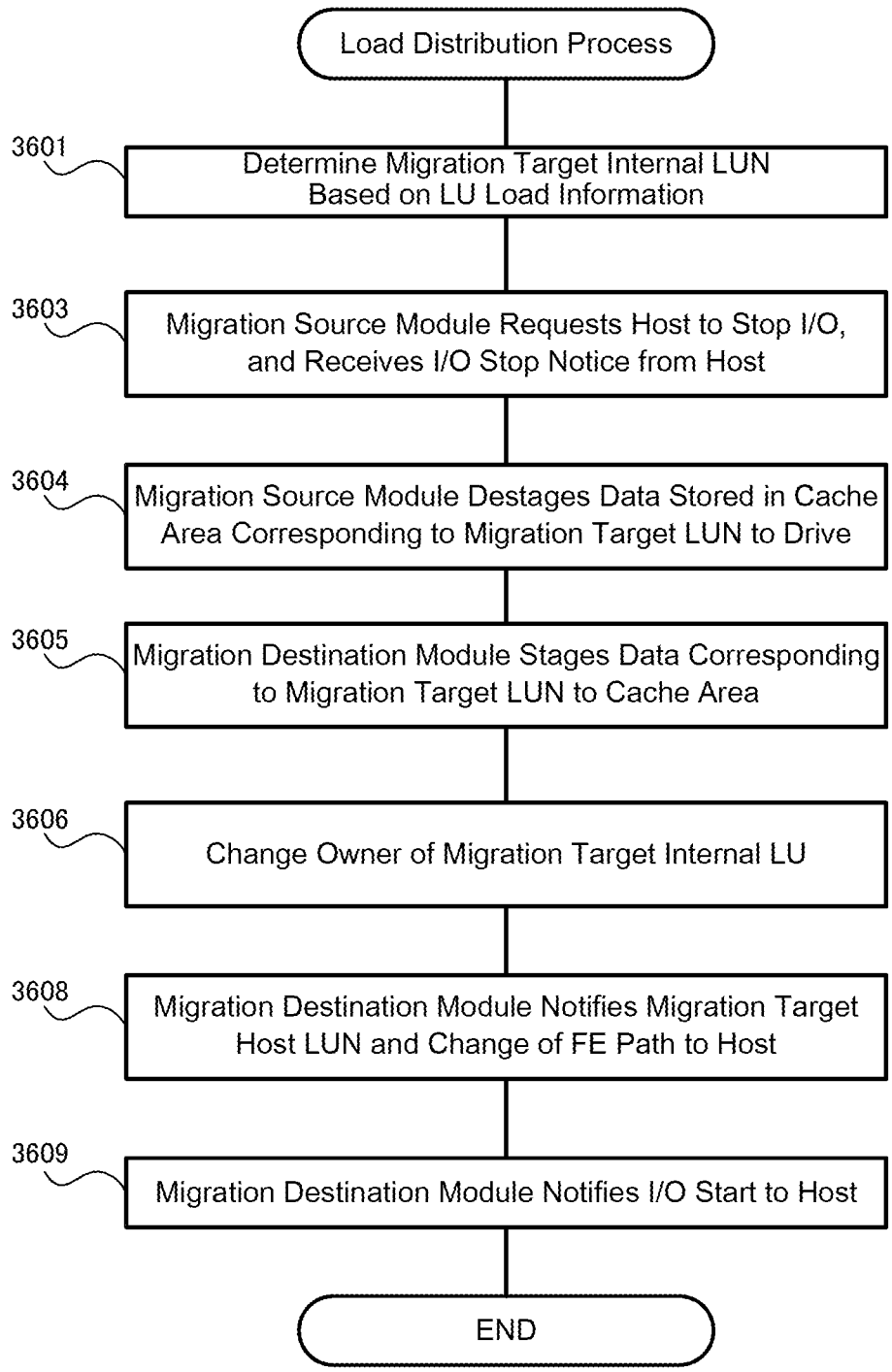
FIG. 29 is a flowchart of an inter-module load distribution process according to Embodiment 1.

FIG. 29 illustrates one example of the outline of the flow of the inter-module load distribution process according to Embodiment 1.

At first, the master processor specifies an LU having the highest LU load in the modules where the load has exceeded a given value, and designates the same as a migration target LU (3601).

Next, a processor within the migration source module requests to stop the I/O of the migration target LU to the host computer, and receives an I/O stop notice from the host computer (3603).

Next, the processor within the migration source module destages the data stored in a cache area (memory within the migration source module) corresponding to the internal LUN of the migration target to a drive (3604).

Next, the processor within the migration destination module stages the data corresponding to the internal LUN of the migration target from the drive to a cache area (memory within the migration destination module) (3605). In the present embodiment, data is transmitted via a backend network when destaging the data in the cache area or when staging the data to the cache area. The process of 3605 is not indispensable.

Next, the owner of the migration target LU is changed (3606). Specifically, the processor within the migration source module changes an owner module number 3202 of the entry storing the LUN equivalent to the LUN of the migration target LU in a LUN 3201 within the LUN mapping table 3200 to a module number of the migration destination module. The contents being changed in the LUN mapping table 3200 is also notified to the migration destination module, and the processor of the migration destination module reflects the changed contents to the LUN mapping table 3200 stored therein.

Next, the processor within the migration destination module notifies to the host computer the information designated for accessing the migration target LU in the future (for example, when the host computer 3100 and the storage subsystem 10 are connected via a Fibre Channel, the WWN of the access target port of the storage system and the LUN of the migration target LU) (3608).

Lastly, the processor within the migration destination module notifies the host computer that I/O can be resumed (3609). The notices of 3608 and 3609 can also be notified via the management terminal.

Modified Example 1

Embodiment 1 mainly explains a case where the number of top expanders within the module is 1, but the present invention is also effective even if there are multiple top expanders within the module. Modified example 1 describes a configuration of a storage subsystem especially the configuration of a backend network where each module has multiple (such as two) top expanders.

Figure 40:
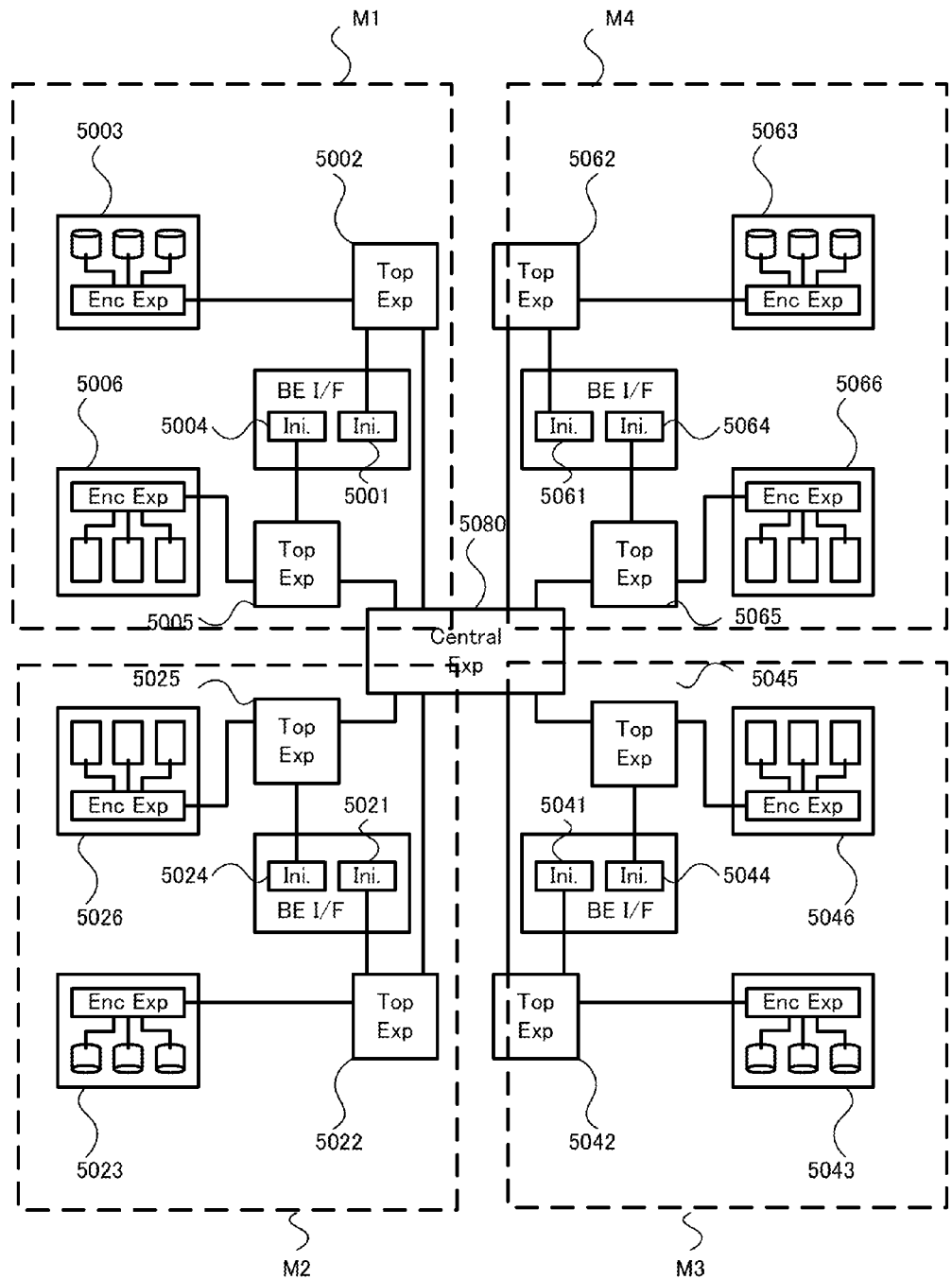
FIG. 40 is an explanatory view of a backend network topology according to Modified Example 1.

FIG. 40 is a view illustrating a topology of a backend network in a storage subsystem according to Modified Example 1. In the drawing, the components (such as processors, memories, frontend interfaces etc.) which are disposed above the backend interface of the storage subsystem are not shown.

In the configuration illustrated in FIG. 40, two top expanders exist in each module (M1, M2, M3, M4), and the respective top expanders are connected to a central expander 5080. In the configuration example illustrated in FIG. 40, only one enclosure expander is connected to each top expander (5002, 5022, 5042, 5062, 5005, 5025, 5045 and 5065), but actually, multiple enclosure expanders can be connected. According further to the configuration example of FIG. 40, there are only two top expanders included in each module, but more than two top expanders can be provided.

According to the storage subsystem of the embodiment of the present invention, there is a rule related to limitation of topology as described in Embodiment 1, that is, that the enclosure expander (5006, 5026, 5046, 5066) connecting SSDs is directly connected to the top expander (5005, 5025, 5045, 5065), and cascade connection is either not allowed, or allowed but the number of rows of cascade connection is limited (when this rule is violated, topology violation error is determined during the backend network setting process). Therefore, if the number of Phys of the top expander is small, the number of SSDs being loaded cannot be increased. In that case, a larger number of SSDs can be loaded by providing multiple top expanders.

Even according to the storage subsystem of Modified Example 1, the preprocess before setting a backend network, the backend network setting process and the addition process are equivalent to the processes described in Embodiment 1, so that explanation of processes are omitted.

Modified Example 2

Other than the configurations illustrated in FIG. 1 and FIG. 2, in a two-module configuration, the modules can be directly connected via an SAS link so as to enable the central expander to be omitted. The following description mainly describes the difference between the storage subsystem according to Modified Example 2 and Embodiment 1.

In the storage subsystem according to Modified Example 2, a central expander (140) described in FIG. 1 or 2 is omitted, and the top expander 110 is directly connected to the top expander 160 via a SAS link. The other configurations are the same as the storage subsystem of Embodiment 1, so that the drawing thereof is omitted.

Next, we will describe the preprocess before setting a backend network and the backend network setting process. Also according to the storage subsystem of Modified Example 2, processes substantially similar to the preprocess before setting a backend network and the backend network setting process described in Embodiment 1 are performed, but in the preprocess before setting a backend network according to Modified Example 2, the process for determining the processor type differs from the process described in Embodiment 1 (FIG. 6). Further according to the backend network setting process of Modified Example 2, the creation of device connection table of the central expander in step 1101 and the creation and update of the entry of the route table for the central expander of step 1206 in the backend network setting process (FIGS. 8, 9) described in Embodiment 1 are omitted. Further, according to the process for creating a Phy correspondence table of step 1106, a process that differs from the process described in Embodiment 1 will be performed.

In the process for determining the processor type in the Modified Example 2, an arbitrary determination process can be adopted as long as the process can determine one master module. For example, it is possible to adopt a determination method such as comparing the SAS addresses of the top expanders and determining the module having a smaller value as the master module.

According to the process for creating a Phy correspondence table of Modified Example 2, the "central expander" of the process for creating a Phy correspondence table according to Embodiment 1 (FIG. 13) is changed to read as the "top expander of the master module". Further, the Phy correspondence table of Modified Example 1 differs from the Phy correspondence table of FIG. 14 in that information showing the connection between the top expander of the master module and the top expander of the slave module is entered. For example, a Phy ID of Phy (254) of the top expander (160) of the slave module is entered in Phy ID (1801) of the top expander Phy, a Phy ID of Phy (204) of the top expander (110) of the master module is entered instead of the central expander in Phy ID (1802) of the central expander Phy, and a module number of the slave module is entered in the module number (1803). The above describes the differences between the preprocess before setting a backend network and a backend network setting process executed in storage subsystem 10 according to Modified Example 2 and that of Embodiment 1.

Next, we will describe the addition process. According to the configuration of the storage subsystem of Modified Example 2, that is, in the configuration where the central expander is omitted, the maximum number of modules is limited to two modules. Therefore, since a module addition process does not exist in the addition process of Modified Example 2, module addition will not be YES in step 2702 of FIG. 23. Further, compared to the addition process of Embodiment 1, only that the creation of an entry of the route table for the central expander and the update of the route table are omitted in step 2807 differs from the enclosure or drive addition process (FIG. 24). The other processes are the same.

Modified Example 3

The above description has described a configuration where multiple modules are connected via central expanders and top expanders, and the storage subsystem is composed of multiple modules, but a storage subsystem adopting a single module configuration can be considered as Modified Example 3 of the storage subsystem according to Embodiment 1. This is a configuration where only the module 101 exists and the central expander 140 within the module 101 does not exist in the configuration diagram of FIG. 1, for example. According to the storage subsystem of Modified Example 3, the preprocess before setting a backend network, the backend network setting process and the addition process are the same as the processes having omitted the processes related to the master module from the processes described in Embodiment 1.

Also according to the storage subsystem of Modified Example 3, the process to check the topology violation according to the present invention is effective. Topology violation is checked during the backend network setting process and the addition process, so as to enable reduction of the number of rows of SSD connection by having the expanders connecting SSDs connected in parallel to the top expander, and to improve the efficiency of access to the SSDs by isolating the path connecting to the high-speed storage media (SSDs) and the path connecting to the low-speed storage media (HDDs).

Modified Example 4

Next, we will describe the Modified Example 4. The elements composing the storage subsystem according to Modified Example 4 are the same as the storage subsystem according to Embodiment 1, so that the drawing thereof is omitted. The storage subsystem according to Modified Example 4 characterizes in that the top expanders are logically divided using a zoning (logical division) function of the top expander. The actual division example will be described with reference to FIG. 2.

According to the storage subsystem of Modified Example 4, in the backend network illustrated in FIG. 2, a zone composed of the Phy located at the leftmost end among the Phys 202 connected to the initiator within the top expander 110 and the Phy 203 connected to the enclosure expander having HDDs mounted thereto (hereafter, this zone is called a "HDD zone") is created, and traffic from other Phys are prevented from reaching the zone (of course, if the Phy connecting the enclosure expander having HDDs mounted thereto out of the Phys of the top expander 110 allows a configuration not restricted to Phy 203 (for example, a configuration is adopted in FIG. 2 where the leftmost Phy out of the Phys 205 connects an enclosure expander having HDDs mounted thereto), a zone including that Phy should be formed). Similarly, a zone composed of the rightmost Phy out of the Phys 252 and the Phy 253 (hereafter, this zone is called an "SSD zone") is formed within the top expander 160, and traffic from other Phys are prevented from reading the zone. Thereby, the connection between the initiator and the SSDs is completely isolated from the connection between the initiator and the HDDs, and there is a merit that communication between the initiator and the SSD is not interrupted by the communication traffic between the initiator and HDDs.

In the topology violation check according to the storage subsystem of Modified Example 4, similar to the fourth rule described in Embodiment 1, whether the expander connected (including cascade connection) to the Phy of the top expander belonging to the HDD zone is an enclosure expander to which only HDDs are connected, and whether the expander connected to the Phy of the top expander belonging to the SSD zone is an enclosure expander to which only SSDs are connected, should be checked. If the enclosure expander to which HDDs are connected adopts a configuration to be connected only to the Phy having a Subtractive attribute out of the Phys of the top expander, it is possible to check whether only HDDs are connected to the Phy having a Subtractive attribute in the top expander.

The preprocess before setting a backend network, the backend network setting process, and the addition process in the topology for connecting an SSD of the storage subsystem according to Modified Example 4 are the same as in Embodiment 1, so they will not be described in detail here.

Modified Example 5

Modified Example 4 illustrated a configuration example of using the zoning function of the top expander to completely separate the connection between initiator and SSD and the connection between initiator and HDD, but Modified Example 5 illustrates another configuration example for completely separating the connection between the initiator and the SSD and the connection between initiator and HDD.

The configuration of the storage subsystem according to Modified Example 5 is similar to the one described in Embodiment 1 except for some areas, so that it will not be illustrated. The differences between the present Example and Embodiment 1 will be described with reference to FIG. 2.

According to the storage subsystem of Modified Example 5, the Phy 206 (256) of the enclosure expander 122 (172) to which the HDDs are connected is not connected to the top expander, and is directly connected to the backend interface 107 (157) of the module. Thereby, similar to Modified Example 4, the connection between initiator and SSD and the connection between initiator and HDD can be isolated completely, and the communication between initiator and SSD will not be interfered by the communication traffic between initiator and HDD.

Embodiment 2

A storage subsystem according to Embodiment 2 of the present invention will be described with reference to FIGS. 30 through 37. The storage subsystem according to Embodiment 2 characterizes in enabling the SSDs and HDDs connected to the storage subsystem to be shared among modules through the backend network, and also enabling setting whether to share or not share a drive among modules. Further, the storage subsystem according to Embodiment 2 can have the number of HDDs connected thereto increased compared to the storage subsystem 100 of Embodiment 1. The configuration and control method of the storage subsystem according to Embodiment 2 is similar to the storage subsystem 100 of Embodiment 1, except for the control method for realizing the topology of HDD connection and the sharing of the HDD.

Figure 30:
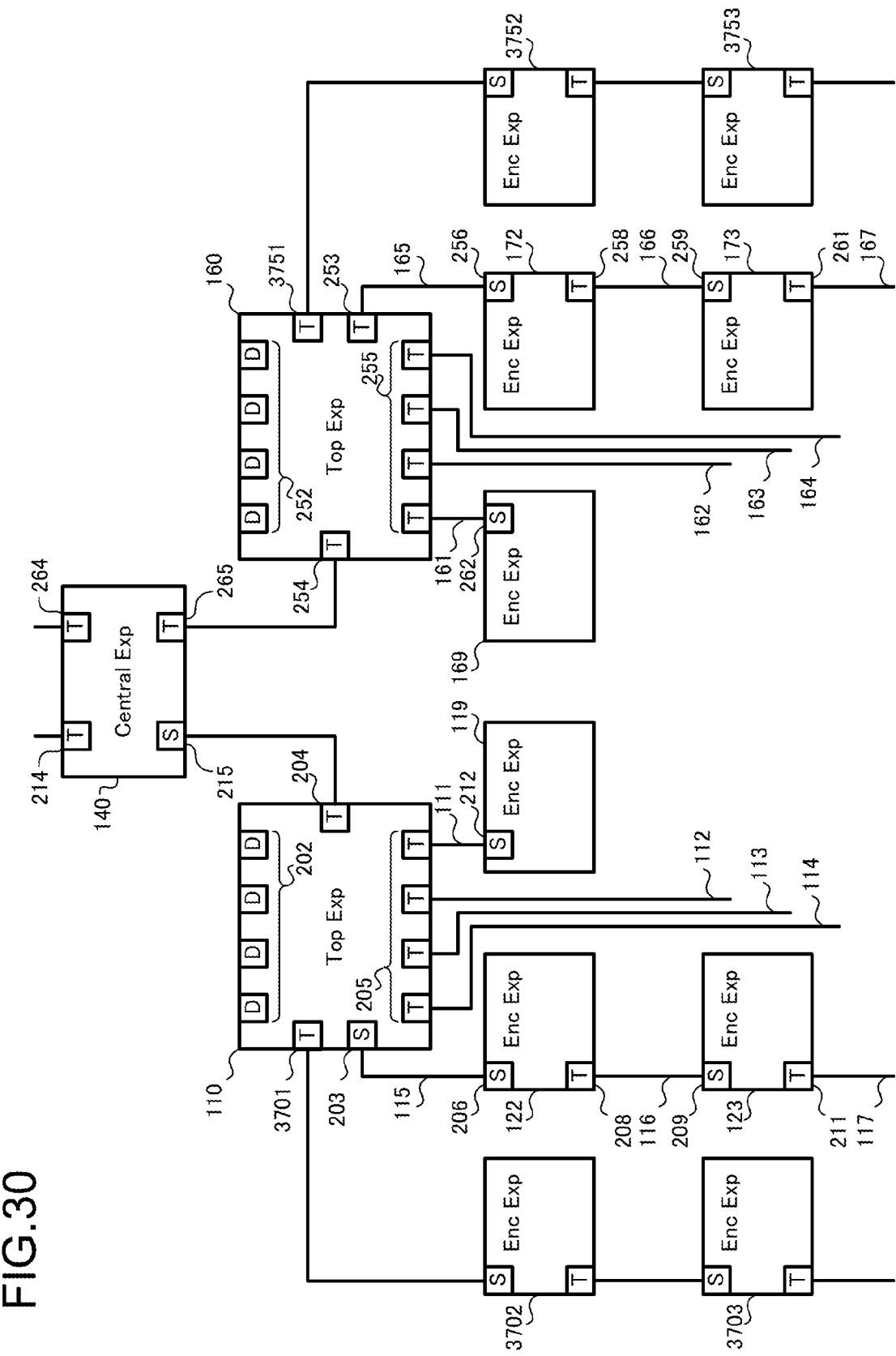
FIG. 30 is a view illustrating a routing attribute of an expander Phy of a storage subsystem according to Embodiment 2.

FIG. 30 is a view illustrating a backend topology of a storage subsystem according to Embodiment 2, and a routing attribute of the respective expander Phys.

The first difference between FIG. 30 and FIG. 2 is that enclosure expanders 3702 and 3703 for connecting HDDs are connected to the top expander 110. Further, enclosure expanders 3752 and 3753 for connecting HDDs are connected to the top expander 160. Moreover, the routing attribute of a top expander Phy 253 connecting the enclosure expander 172 via a SAS link 165 is changed to Table. Further, the routing attributes of a top expander Phy 3701 connecting the enclosure expander 3702 and a top expander Phy 3751 connecting the enclosure expander 3752 are Table. Similar to the storage subsystem 100 of Embodiment 1, the storage subsystem of Embodiment 2 also has the SAS link connecting the central expander 140 and the top expander 160 realize a Table-to-Table connection.

Next, the flow of the backend network setting process and the addition process according to the storage subsystem of Embodiment 2 of the present invention will be described, but first, the contents of a share setting table of a top expander Phy, which is information newly prepared in the storage subsystem according to Embodiment 2 of the present invention, will be described with reference to FIG. 33.

A share setting table of the top expander Phy 4000 is a table storing the information of a SAS address 4001 of the top expander, a Phy ID 4002 of the top expander Phy, a routing attribute 4003 of the relevant Phy, whether the enclosure expander is connected to the relevant Phy or not 4004, and a share flag 4005. The share setting table of the top expander Phy 4000 is created for each module, and is stored in the memory of each module. A processor of each module stores the set of information including the Phy ID 4002, the routing attribute 4003 of the Phy, and whether the enclosure expander is connected to the Phy or not 4004 in the share setting table 4000 of the top expander Phy for all the Phys of the respective top expanders included in the module. The various information (4001 through 4004) are stored to the share setting table 4000 of the top expander Phy simultaneously as the process of creating a device connection table (FIG. 3) of the top expander.

On the other hand, the share flag 4005 is not automatically set and stored by the processor 104 (154). The details will be described later, but this information is set by the administrator during the backend network setting process and the addition process. The administrator can set "1" or "0" to the share flag 4005. When the share flag is set to "1", the "sharing" of the drive within the enclosure expander connected to the corresponding top expander Phy is enabled, and when the flag is set to "0", it is set to "unshared". As described, the storage subsystem of Embodiment 2 sets whether to share or not share a drive for each top expander Phy connecting the enclosure expander. The multiple drives within the enclosure expander subjected to cascade connection from the same top expander Phy is collectively set to shared or unshared. Further according to the storage subsystem of Embodiment 2, based on the setting of the share flag 4005 of the top expander Phy share setting table 4000, the drive can be set to shared or unshared for each top expander Phy connecting the enclosure expander.

Next, by referring to FIGS. 31 and 32, the flow of the backend network setting process according to Embodiment 2 will be described. This flow is similar to the backend network setting process (FIGS. 8 and 9) of Embodiment 1, so the differences will mainly be described.

Figure 31:
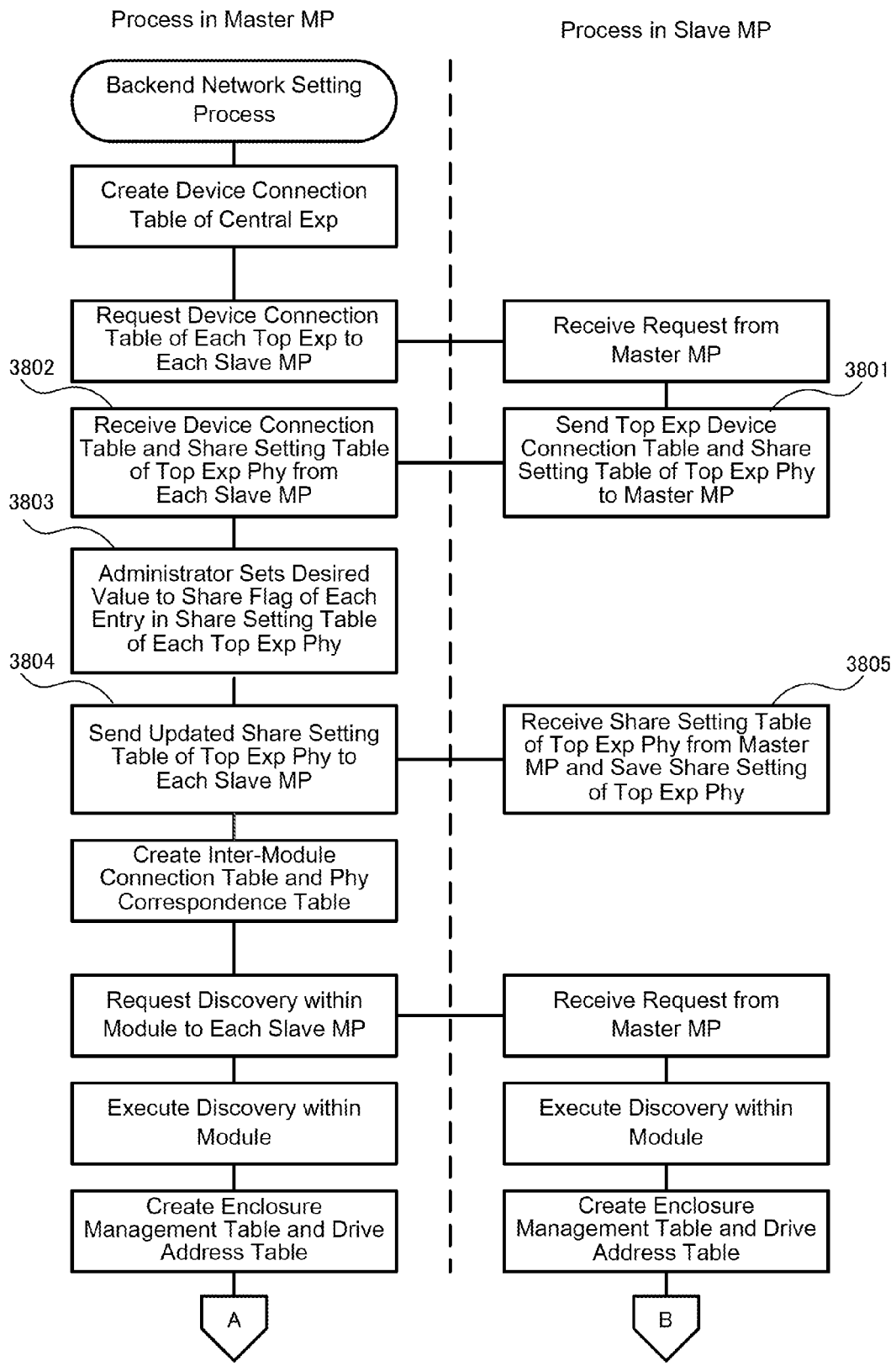
FIG. 31 is a flowchart of a backend network setting process according to Embodiment 2.

Steps 3801 through 3805 of FIG. 31 differ from steps 1104 through 1105 of FIG. 8. Steps 3801 and 3802 respectively correspond to steps 1104 and 1105 of FIG. 8. Steps 3803 through 3805 are newly added steps in the present backend network setting process.

In step 3801, the slave processor transmits the device connection table 800 of the top expander and the share setting table 4000 of the top expander Phy to the master processor (3801).

The master processor receives the device connection table 800 of the top expander and the share setting table 4000 of the top expander Phy from the slave processor (3802).

In 3803, the administrator sets a desired value to the share flag of each entry in the share setting table 4000 of each top expander Phy received from each slave processor (3803).

Next, the master processor transmits the share setting table 4000 of each top expander Phy updated by the administrator to each slave processor (3804).

Thereafter, the slave processor receives a share setting table of the top expander Phy from the master processor, and updates the contents of the share setting table 4000 of the top expander Phy stored in the memory of the slave module. Thereby, the share setting of the top expander Phy (contents of the share flag 4005) will be stored in the respective modules (3805).

The other processes of FIG. 31 are the same as in the flow of FIG. 8.

Figure 32:
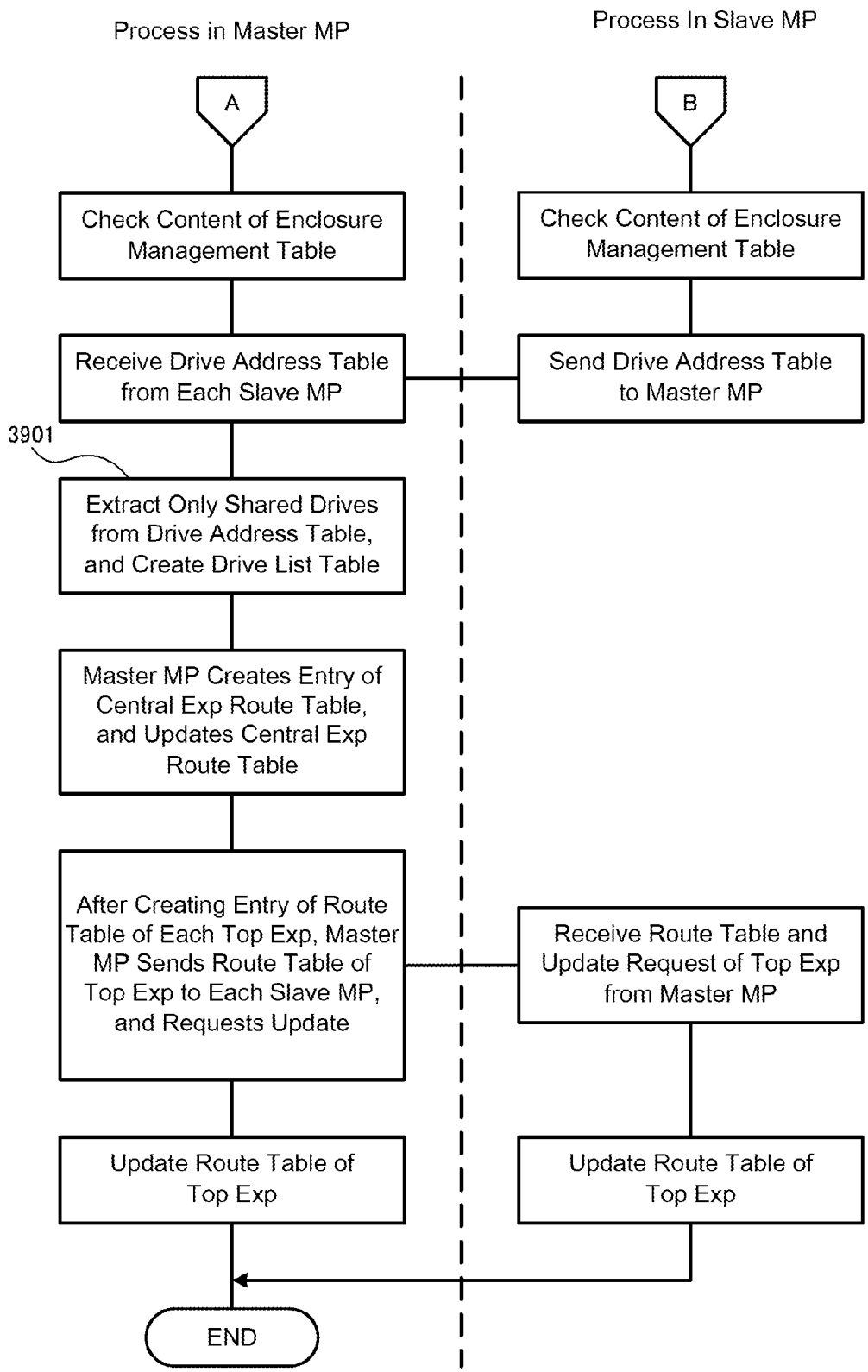
FIG. 32 is a flowchart of a backend network setting process according to Embodiment 2.

Step 3901 of FIG. 32 corresponds to step 1205 of FIG. 9, but there are some changes.

In step 3901, the master processor creates a drive list table 2300 from the drive address table 2200 of the master module and the slave module (3901). At this time, the master processor extracts the information of the drives (drives connected to the enclosure expanders connected (cascade-connected) to the top expander Phys (Phys specified by the Phy ID 4002) having the share flag 4005 set to "1" in the share setting table 4000 of the top expander Phy) set to be shared in the share setting tables 4000 of the respective top expander Phys from the drive address tables 2200 of the respective modules, and registers the same in the drive list table 2300.

The other processes in FIG. 32 are the same as those in the flow of FIG. 9.

Figure 34:
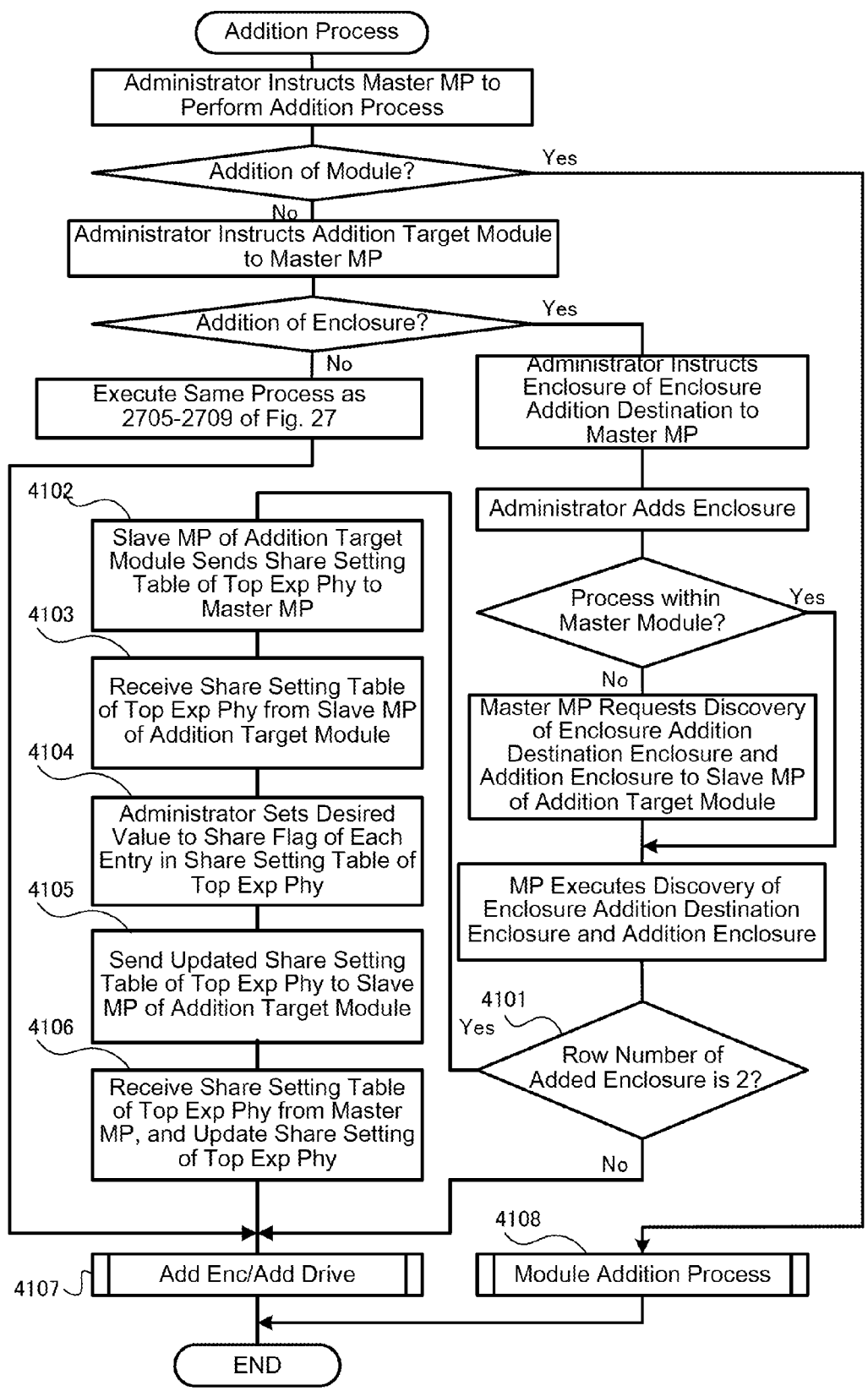
FIG. 34 is a flowchart of an addition process according to Embodiment 2.

FIG. 34 is a flowchart of the addition process according to Embodiment 2.

This flow is similar to the flowchart of the addition process according to Embodiment 1 illustrated in FIG. 23, so that only the differences will be described. Steps 4101 through 4106 of FIG. 34 are the processes newly added to the flow of FIG. 23. Steps 2701 and 2716 of FIG. 23 are respectively changed to steps 4107 and 4108 of FIG. 34.

In step 4101, the master processor checks the number of rows from the initiator of the expanded enclosure. If the expanded enclosure is directly connected to the top expander, the number of rows is 2. If the number of rows is 2, that is, if the expanded enclosure is connected to the top expander, the procedure advances to step 4102, and if not, it advances to step 4107.

In step 4102, the slave processor of the addition target module transmits the device connection table 800 of the top expander and the share setting table of the top expander Phy to the master processor (4102).

The master processor receives the device connection table 800 of the top expander and the share setting table of the top expander Phy from the slave processor of the addition target module (4103).

Next, the administrator sets up a desired value to the share flag 4005 of each entry in the share setting table of the top expander Phy received from the slave processor (4104).

Thereafter, the master processor transmits a share setting table of the top expander Phy updated by the administrator to the slave processor (4105).

Next, the slave processor of the addition target module receives the share setting table of the top expander Phy from the master processor, and updates the contents of the share setting table 4000 of the top expander Phy stored in the memory of the slave module (4106).

Figure 35:
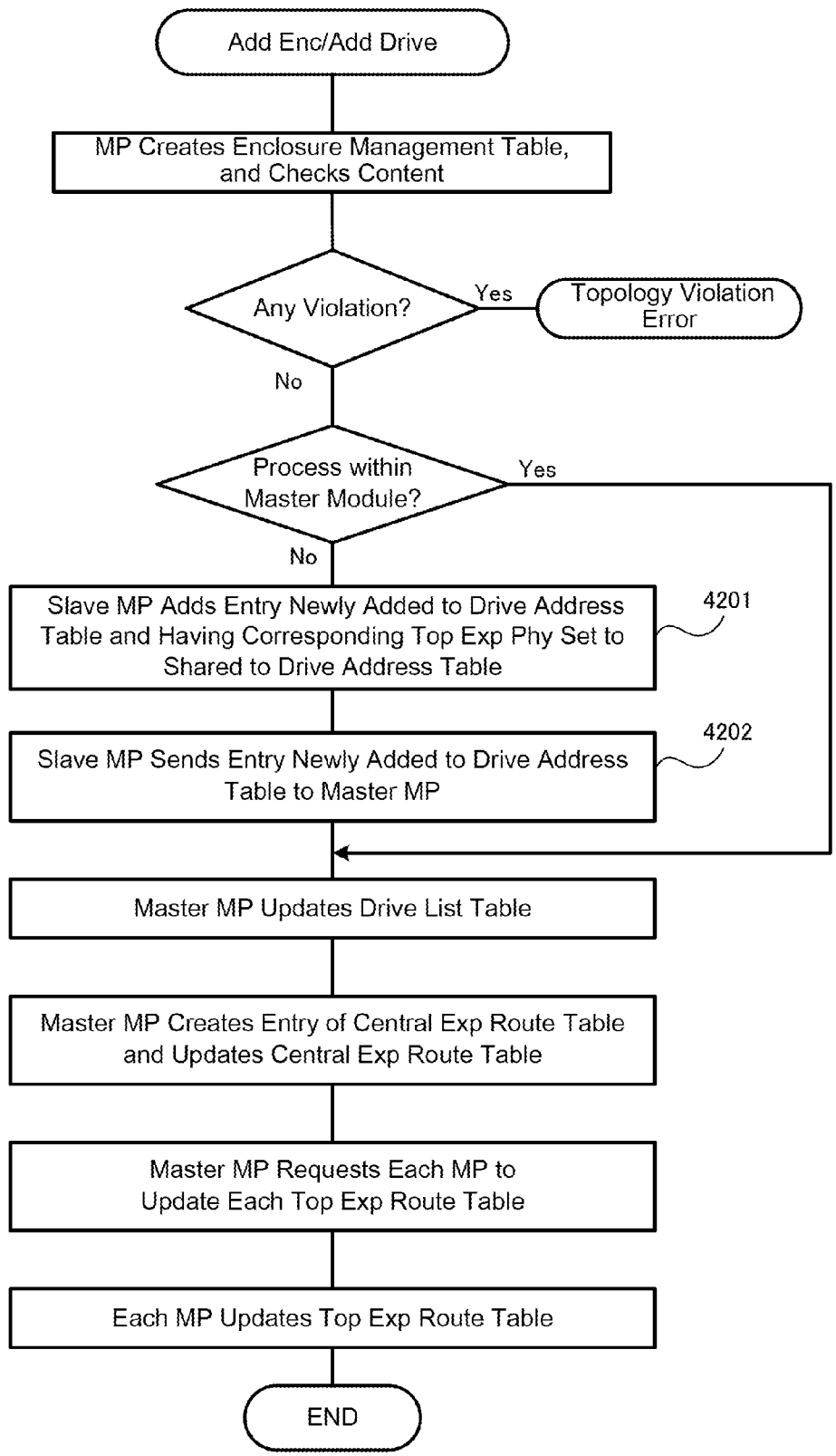
FIG. 35 is a flowchart of an enclosure or drive addition process according to Embodiment 2.

Step 4107 executes the process of FIG. 35. Step 4108 executes the processes of FIGS. 36 and 37.

The other processes of FIG. 34 are the same as the flow of FIG. 23.

FIG. 35 is a flowchart of an enclosure or drive addition process according to Embodiment 2. This flow is similar to the flowchart of the enclosure or drive addition process according to Embodiment 1 illustrated in FIG. 24, so only the differences are described. Step 4202 of FIG. 35 is the process newly added to the flow of FIG. 24. Further, step 4201 of FIG. 35 is changed from step 2805 of FIG. 24.

In step 4201, the slave processor adds an entry newly added to the drive address table and having the share setting of the corresponding top expander Phy set to "shared" to the drive address table.

Next, the slave processor transmits the entry added newly to the drive address table to the master processor (4202).

The other processes of FIG. 35 are the same as the flow of FIG. 24.

Figure 36:
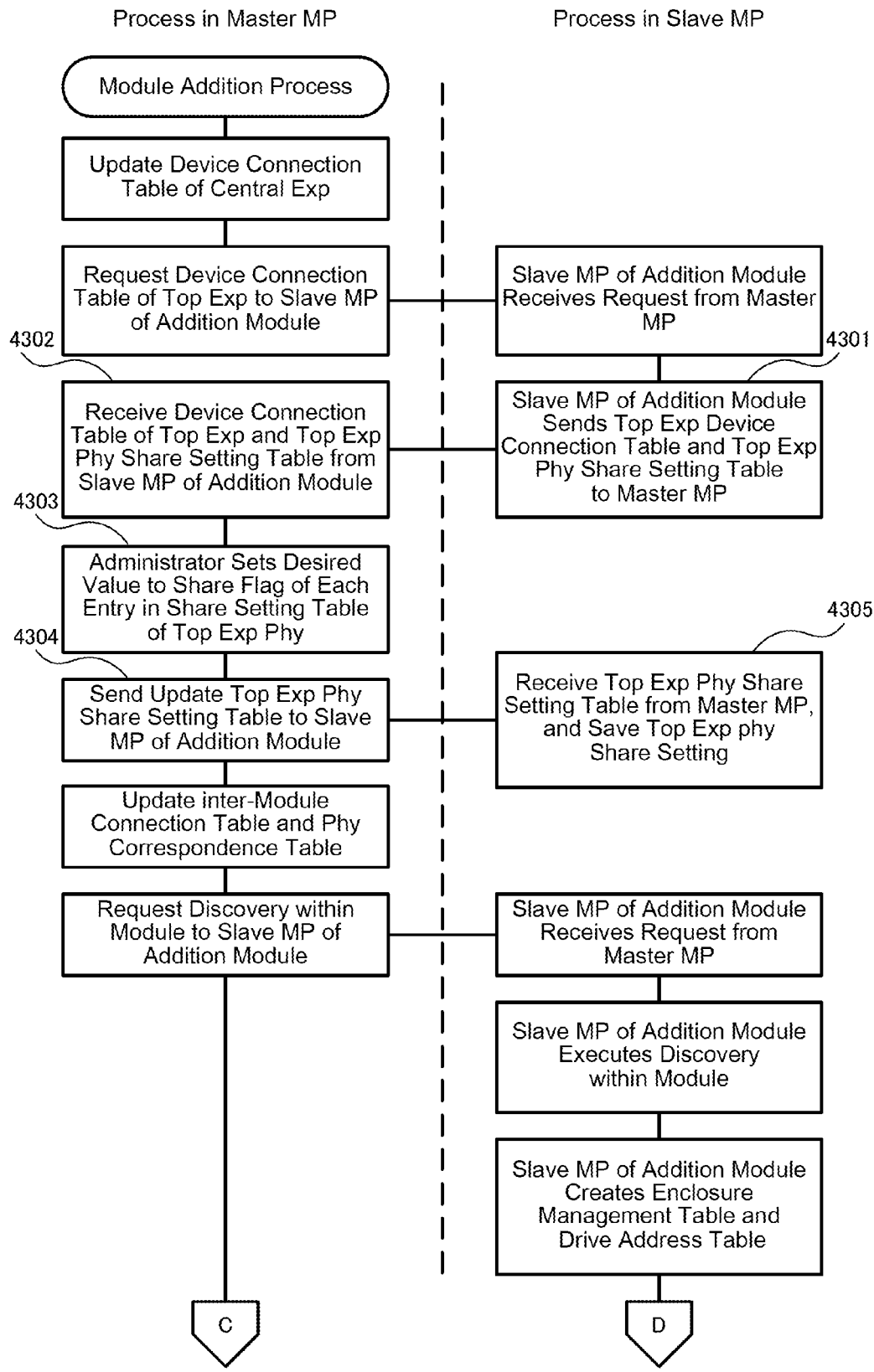
FIG. 36 is a flowchart of a module addition process according to Embodiment 2.
Figure 37:
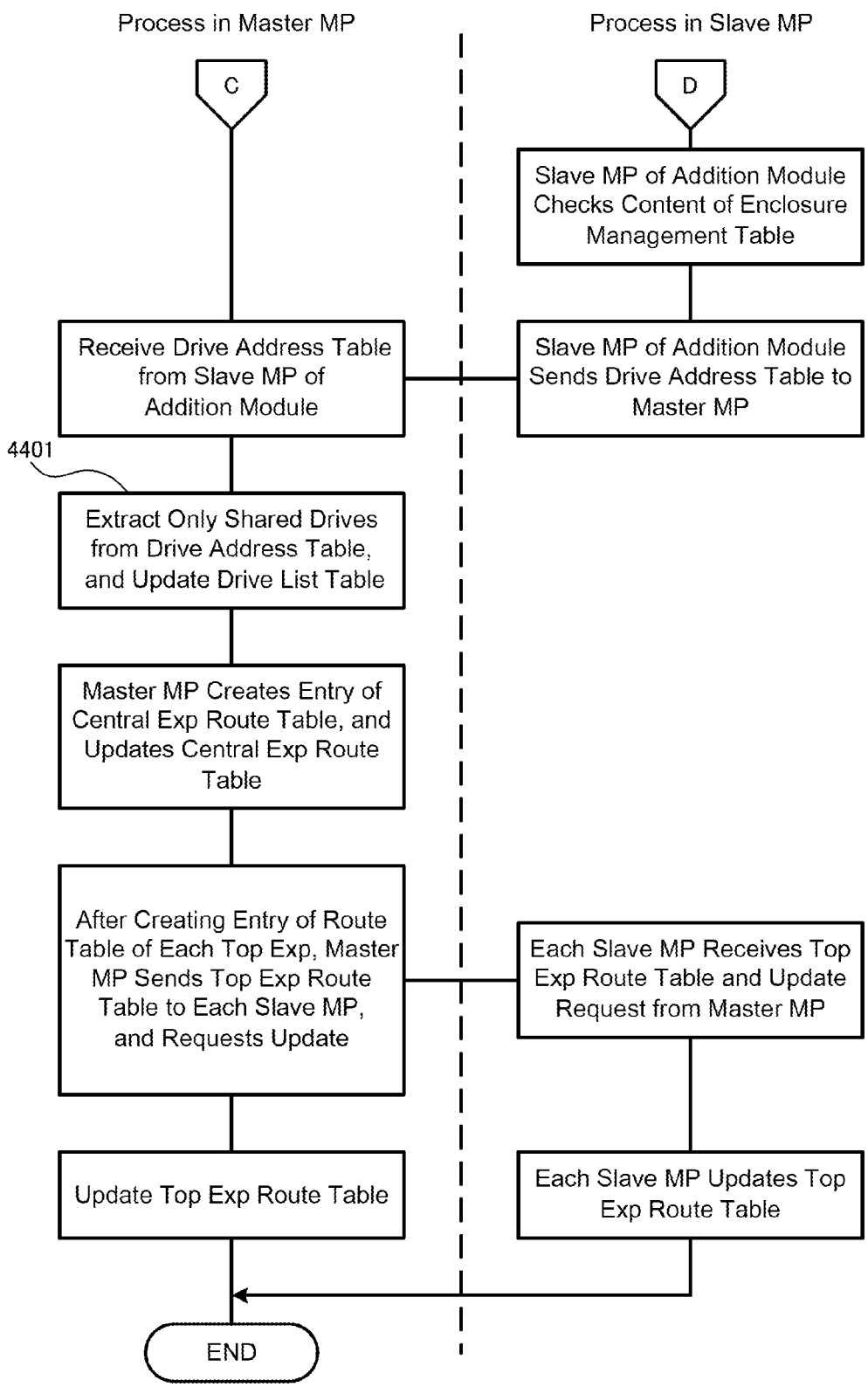
FIG. 37 is a flowchart of a module addition process according to Embodiment 2.

FIGS. 36 and 37 are flowcharts of a module addition process according to Embodiment 2. This flow is similar to the flowchart of the module addition process according to Embodiment 1 illustrated in FIGS. 25 and 26, so that only the differences will be described.

Steps 4301 through 4305 of FIG. 36 are changed from steps 2904 and 2905 of FIG. 25. Steps 4301 and 4302 respectively correspond to steps 2904 and 2905. Steps 4303 through 4305 are newly added processes in the present module addition process.

In step 4301, the slave processor of the addition target module transmits the device connection table 800 of the top expander and the share setting table of the top expander Phy to the master processor (4301).

The master processor receives the device connection table 800 of the top expander and the share setting table of the top expander Phy from the slave processor of the addition target module (4302).

Next, the administrator sets up a desired value to the share flag of each entry in the share setting table of the top expander Phy received from the slave processor (4303).

Thereafter, the master processor transmits a share setting table of the top expander Phy updated by the administrator to the slave processor (4304).

Then, the slave processor of the addition target module receives the share setting table of the top expander Phy from the master processor, and stores the share setting of the top expander Phy in each module (4305).

The other processes of FIG. 36 are the same as the flow of FIG. 25.

Step 4401 of FIG. 37 corresponds to step 3004 of FIG. 26, but there are some changes.

In step 4401, the master processor creates a drive list table 2300 from the drive address table 2200 of the addition module (4401). At this time, the master processor extracts the drives from the drive list table 2200 of the addition module set to shared in the share setting table of the top expander Phy of the addition module, and registers the same in the drive list table 2300.

The other processes of FIG. 37 are the same as the flow of FIG. 26. The above describes the addition process according to Embodiment 2 of the present invention.

As described, the storage subsystem of Embodiment 2 can have the HDDs and SSDs shared among modules. Thereby, the load of I/O processing related to SSDs and HDDs can be distributed among modules, and the performance of the storage subsystem can be enhanced. Further, by having multiple enclosure expanders having HDDs connected thereto connected via cascade connection to the top expander, the storage subsystem of Embodiment 2 can have multiple HDDs loaded thereto.

In the above description, whether to share or not share a drive is set per top expander Phy being connected, but it can also be set per drive. Such example can be realized by providing a field for setting the share flag to the drive address table, similar to the share setting table of the top expander Phy, so that whether to have the drive shared or not shared can be set for each drive, whether to share or not share a drive can be set up for each drive stated in the drive address table and before step 3901 of FIG. 39. At this time, the drives capable of being set to be shared are restricted to the drives in which sharing is set in the share setting table of each top expander Phy, so that they do not cause any conflict with the setting of the share setting table of the top expander Phy. In step 3901, the master processor extracts the drives set to be shared in the share setting table in each top expander Phy and set to be shared by the administrator per drive from the drive list table 2200 of each module, and registers the same in the drive list table 2300. The subsequent processes are the same as FIG. 39. Thereby, a drive can be set to be shared or not shared per drive, and the setting can be appropriately reflected in the route table for the central expander and in the route table for the top expanders in each module.

As described, according to the present embodiment, even when the link between externally configurable expanders are a Table-to-Table connection, a route table for the externally configurable expander can be set.

Embodiment 3

Figure 38:
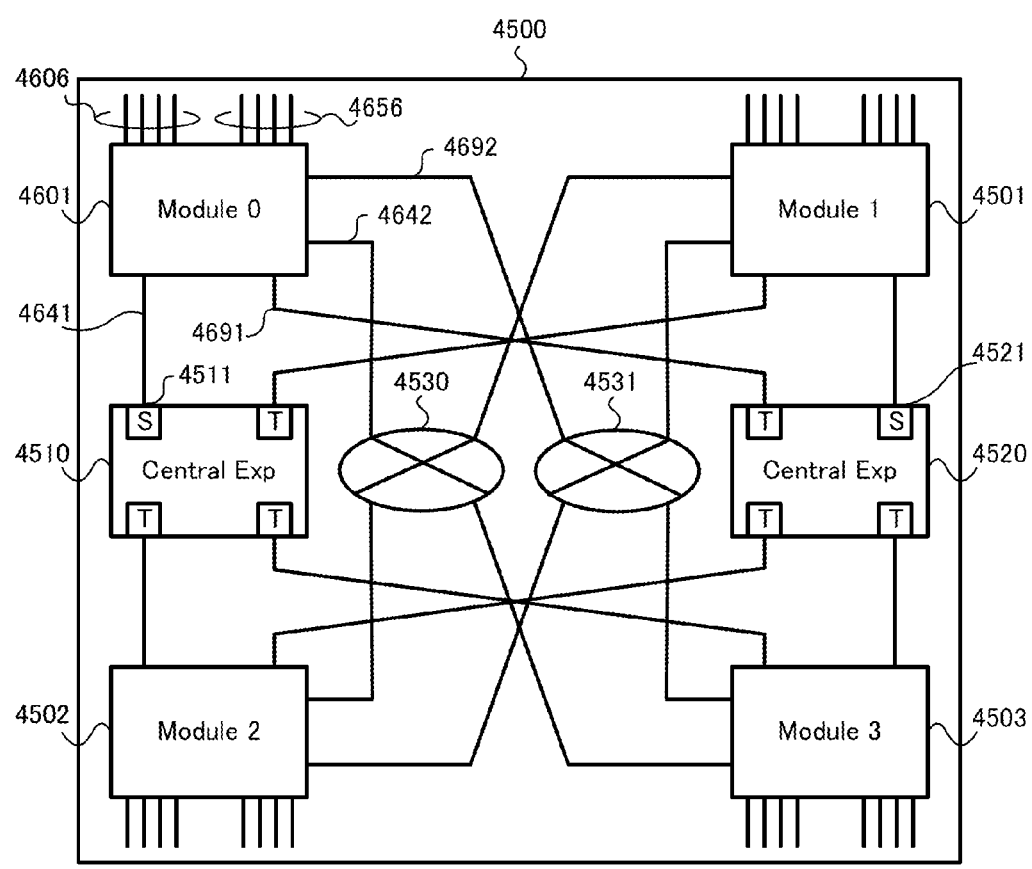
FIG. 38 is a view illustrating an inter-module connection of a storage subsystem according to Embodiment 3.
Figure 39:
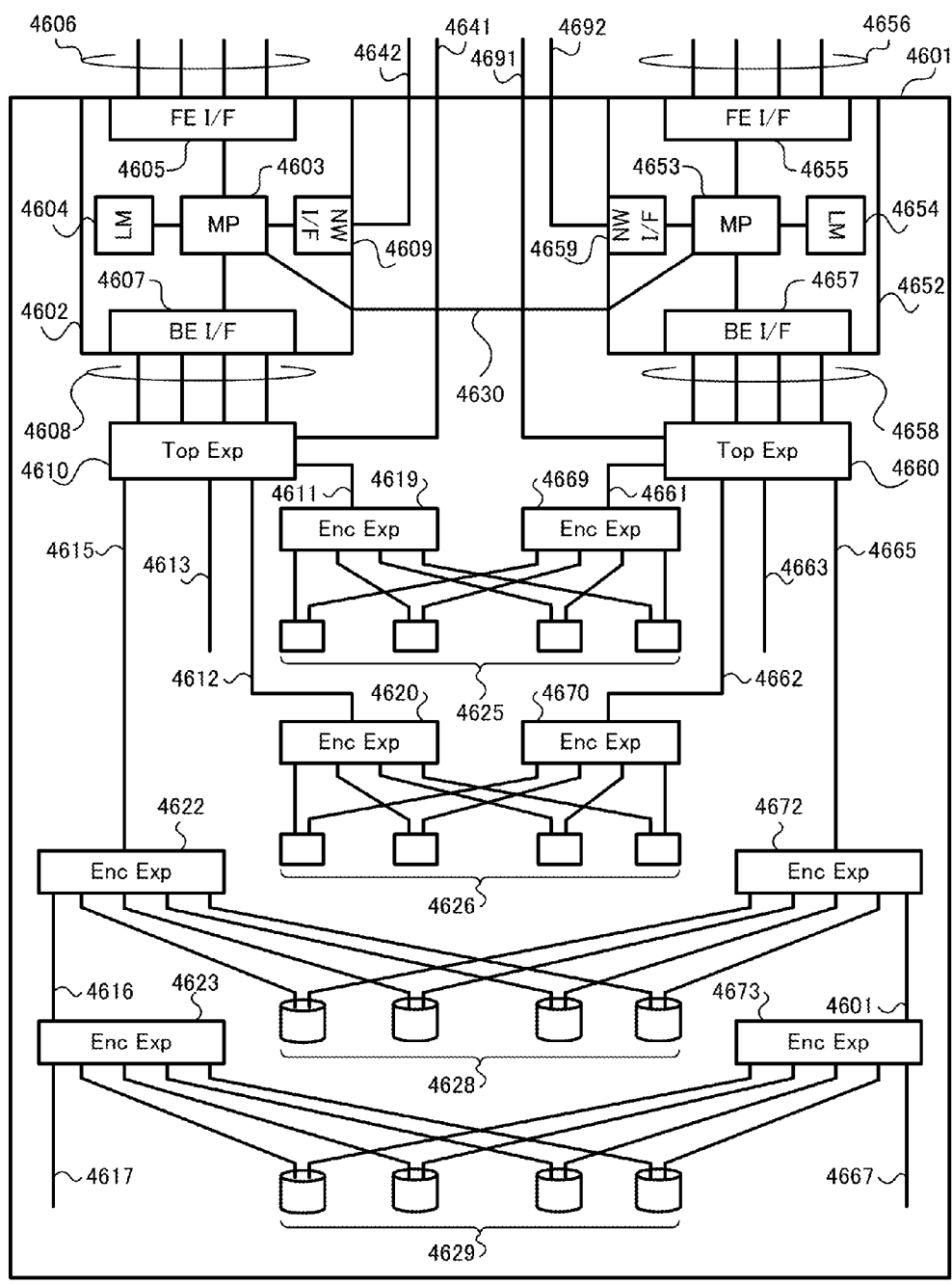
FIG. 39 is an explanatory view of a configuration within a module of a storage subsystem according to Embodiment 3.

With reference to FIGS. 38 and 39, the storage subsystem according to Embodiment 3 of the present invention will be described.

FIG. 38 is a view illustrating an inter-module connection of the storage subsystem according to Embodiment 3. Embodiment 3 characterizes in the internal configuration of each module, and that redundancy is realized in an inter-module network.

In FIG. 38, a storage subsystem 4500 is composed of four modules 4601, 4501 through 4503. The four modules are mutually connected via two inter-module networks 4530 and 4531. Further, two central expanders 4510 and 4520 cause the backend networks of the four modules to be mutually connected. Here, we will first illustrate the configuration within the module, and then return to the description of the storage subsystem 4500 illustrated in FIG. 38.

FIG. 39 is a view illustrating an internal configuration of a module according to the storage subsystem of Embodiment 3.

The module 4601 is composed of controllers 4602 and 4652, top expanders 4610 and 4660, enclosure expanders 4619, 4620, 4622, 4623, 4669, 4670, 4672 and 4673, SSDs 4625 and 4626, and HDDs 4628 and 4629.

The controller 4602 (4652) is composed of a processor 4603 (4653), a frontend interface 4605 (4655), a memory 4604 (4654), a backend interface 4607 (4657), and a network interface 4609 (4659).

The frontend interface 4605 (4655) connects to a host computer (not shown) via a channel 4606 (4656). Further, the frontend interface 4605 (4655) converts the data transfer protocol between the host computer and the controller 4602 (4652) and the data transfer protocol within the controller 4602 (4652).

The backend interface 4607 (4657) connects the controller 4602 (4652) and the top expander 4610 (4660) via a SAS link 4608 (4658). Further, the backend interface 4607 (4657) converts the data transfer protocol within the controller 4602 (4652) and the data transfer protocol between the controller 4602 (4652) and the top expander 4610 (4660). Further, the backend interface 4607 (4657) is equipped with a SAS initiator.

The network interface 4609 (4659) connects via a network channel 4642 (4692) to an inter-module network and the 4530 of FIG. 38 (4531 of FIG. 38), and communicates the control information and various tables of the storage subsystem 4500 among modules.

The memory 4604 (4654) is a main memory of the processor 4603 (4653), and stores programs (such as a storage control program) executed by the processor 4603 (4653), management tables referred to by the processor 4603 (4653), and so on. Further, the memory 4604 (4654) is also used as a cache memory of the storage subsystem 4500.

The processor 4603 (4653) controls the transfer of data between the host computer connected via the frontend interface 4605 (4655) and HDDs 4628 and 4629 or SSDs 4625 and 4626 connected via the backend interface 4607 (4657).

The processors 4603 and 4653 are connected via an inter-processor channel 4630. Thereby, the processor 4603 can access the memory 4654 and the processor 4653 can access the memory 4604 in a mutually accessible manner. The data in the cache memory of the storage subsystem is duplicated using the inter-processor channel 4630.

The HDDs 4628 and 4629 and the SSDs 4625 and 4626 are dual port drives, which can be accessed from backend networks 4607 and 4657 of two controllers 4602 and 4652.

The top expander 4610 (4660) connects via a SAS link 4641 (4692) to the central expander, which is 4510 of FIG. 38 (4520 of FIG. 38). Further, the top expander 4610 (4660) connects via a SAS link 4615 (4665) to the enclosure expander 4622 (4672). Similarly, the enclosure expander 4622 (4672) connects via a SAS link 4616 to the enclosure expander 4623 (4673). The SAS link between module 1 4501, module 2 4502, module 3 4503 and central expander 4510 realizes a Table-to-Table connection. Similarly, the SAS link between module 0 4601, module 2 4502, module 3 4503 and central expander 4520 realizes a Table-to-Table connection. The enclosure expanders 4622 and 4623 (4672 and 4673) each connect one or more HDDs 4628 and 4629. In order to expand an enclosure expander for adding HDDs to the module 4601, the enclosure expander to be expanded is connected to the SAS link 4617 (4667). As described, the expander connecting HDDs is connected in series from the top expander 4610 (4660).

The top expander 4610 (4660) connects via a SAS link 4611 (4661) to the enclosure expander 4619 (4669). Similarly, the top expander 4610 (4660) connects via a SAS link 4612 (4662) to the enclosure expander 4620 (4670). The enclosure expanders 4619 and 4620 (4669 and 4670) each connect one or more SSDs 4625 and 4626. In order to add an enclosure expander for increasing the number of SSDs in the module 4601, the enclosure expander to be added is connected to a SAS link 4613 (4663). As described, the expander for connecting SSDs is connected in series with the other expanders connecting SSDs to the top expander 4610 (4660).

We will now return to the description of FIG. 38. The storage subsystem 4500 includes two backend networks, a network that mutually connects modules by the central expander 4510, and a network that mutually connects modules by the central expander 4520.

The module 4601 connects via a SAS link 4641 to a Phy 4511 of the central expander 4510. The routing attribute of the Phy 4511 is Subtractive. Accordingly, in the backend network connecting the central expander 4510, the module 4601 becomes the master module.

On the other hand, the module 4501 connects to a Phy 4521 of the central expander 4520. The routing attribute of the Phy 4521 is Subtractive. Accordingly, in the backend network connecting the central expander 4520, the module 4501 becomes the master module.

In the storage subsystem 4500, the SAS link connecting the central expander and the respective modules realize a Table-toTable connection, except for the SAS link connected to the central expanders Phy 4511 and 4521.

That is, the master modules of the two backend networks of the storage subsystem 4500 adopt configurations where master modules differ. For example, we will assume a case where failure occurs to the module 4601 and processes such as a discover process cannot be performed by the master module 4601. The backend network including the central expander 4510 cannot perform the discover process of the inter-module connection due to master module failure. On the other hand, in the backend network including the central expander 4520, the master module 4501 is operating normally and there is no problem in performing continuous operation. By allocating different modules as master module in a backend network configuration having redundancy, the reliability of the system can be enhanced.

As mentioned above, a route table of an externally configurable expander can be set in a configuration having a redundant inter-module network, such as in the storage subsystem according to Embodiment 3.

Embodiment 4

Figure 41:
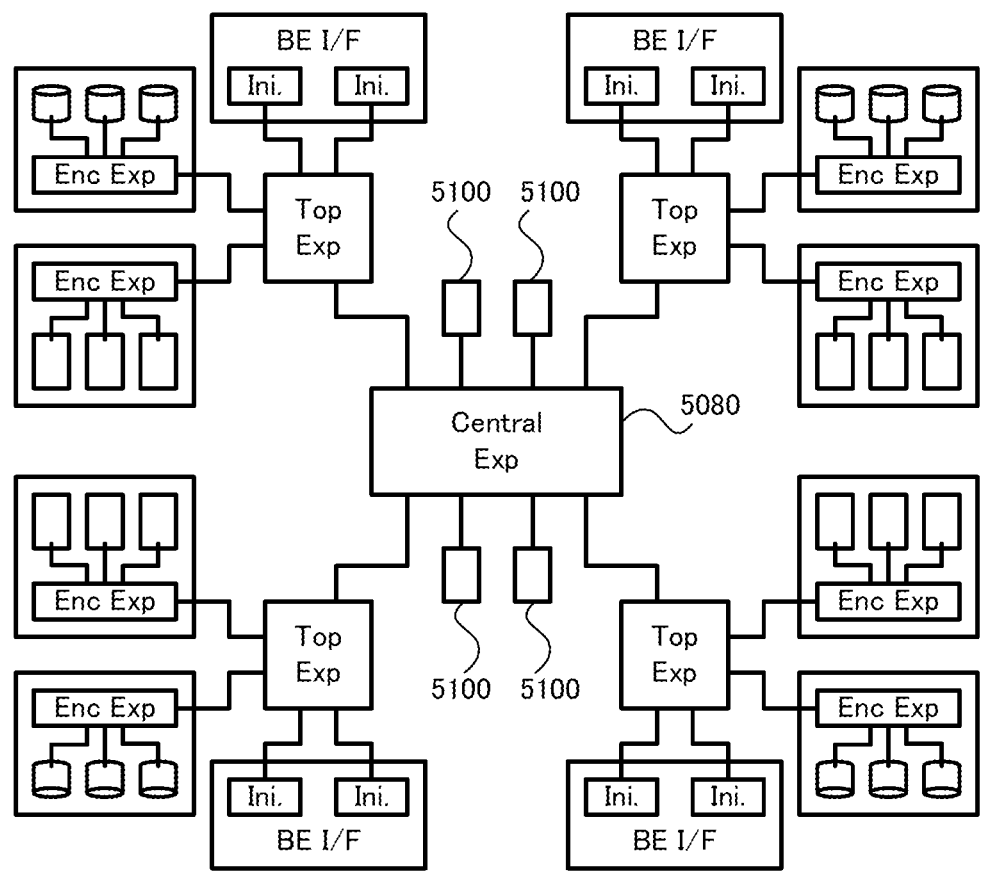
FIG. 41 is a view illustrating a backend network topology according to Embodiment 4.

FIG. 41 is a view illustrating a topology of a backend network in a storage subsystem according to Embodiment 4 of the present invention. The components disposed above the backend interface of the storage subsystem are the same as those of the storage subsystem according to Embodiment 1 and the like, so they are not illustrated.

The difference in the topology of the backend network from the storage subsystem of Embodiment 1 is that according to the storage subsystem of the present embodiment, SSDs 5100 can be connected to the central expander 5080. The SSDs 5100 connected to the central expander 5080 can be shared by the respective modules. Further, the only storage device capable of being connected to the central expander 5080 is the SSD, and HDDs are not allowed to be connected thereto.

The advantage of this configuration is that the SSDs 5100 connected to the central expander 5080 are positioned at a second row from all the initiators, so that the access latency from any initiator will be the same. According to the storage subsystem of Embodiment 4, the flow of the backend network setting process, the check of whether topology violation exists or not (SSDs are connectable to the central expander, but if HDDs are connected thereto, error is notified as topology violation), and the flow of the addition process differ from Embodiment 1, so that these differences will be described hereafter. The preprocess before setting a backend network according to the present configuration is the same as the process of Embodiment 1.

The backend network setting process according to the present configuration differs from the process illustrated in Embodiment 1 in the following points.

At first, in order to recognize the SSD connected to the central expander, in step 1109 of FIG. 8, the master module performs a Discover process of the device connected to the central expander, in addition to the Discover processing within the module. According to this process, the SSDs 5100 connected to the central expander 5080 will be recognized. The discovery of the SSDs connected to the central expander is performed by transmitting a Discover request to the SMP target 1501 of the central expander 140. At the same time, a check on whether topology violation exists or not (if an HDD is connected to the central expander, error is notified as topology violation) is performed.

Further, according to the storage subsystem of Embodiment 4, the master module has a field in the drive address table 2200 (FIG. 18) for storing a flag (2207) on whether the SSD is connected to the central expander or not, to manage whether each SSD within the subsystem is connected to the central expander or is disposed within a module. As a result of the Discover process of the device connected to the central expander, when an SSD 5100 connected to the central expander 5080 is recognized, the master module registers the information on the recognized SSD 5100 to the drive address table 2200 (FIG. 18), and sets the flag indicating whether the SSD is connected to a central expander or not (2207) to "1". At this time, no values are stored in the enclosure number 2202 storing the drive and the number of rows of expander 2203 in the drive address 2200.

Further, similar to the drive address table, the drive list table (FIG. 19) managed by the storage subsystem according to Embodiment 4 also has a field for storing a flag (2304) indicating whether the SSD is connected to a central expander or not. When creating the drive list table (step 1205 of FIG. 9), the flag 2207 is extracted from the drive address table and stored in the drive list table.

According to the present configuration, the SSDs connected to the central expander must be registered in each route table for the top expander. Therefore, a process for creating the route table for the top expander (the process illustrated in FIG. 22 performed in step 1207 of FIG. 9) is changed. Specifically, in step 2602 of FIG. 22, a process is performed by "the processor acquiring a flag (2303) in addition to the module number of the drive SAS address and the SAS address of the top expander from the drive list table".

Then, in step 2603, it is determined "whether the acquired module number and the number of the module executing this flow is the same or not, and whether the acquired top expander SAS address and the SAS address of the top expander set as the current process target is the same or not, and whether the flag (2303) is not "1" (indicating that the SSD is not connected to the central expander)" (that is, when the flag (2301) is set to 1, the processes of steps 2604 through 2606 are performed). Further according to step 2605, when the flag (2301) is not 1, the process equivalent to the process described in Embodiment 1 will be performed, but when the flag (2301) is 1, a process is performed so that "the processor acquires a Phy ID (1801) of the top expander Phy corresponding to the SAS address of the top expander being the target of creating a route table according to this flow". The other points are the same as in the process described in Embodiment 1.

Further, according to the addition process performed in the storage subsystem of Embodiment 4, in order to correspond to the addition of SSDs to the central expander, if the drive addition destination in step 2709 of FIG. 23 is the central expander, a process to perform a Discover process by the master module will be added. The other points are the same as the process illustrated in Embodiment 1.

Embodiment 5

Figure 42:
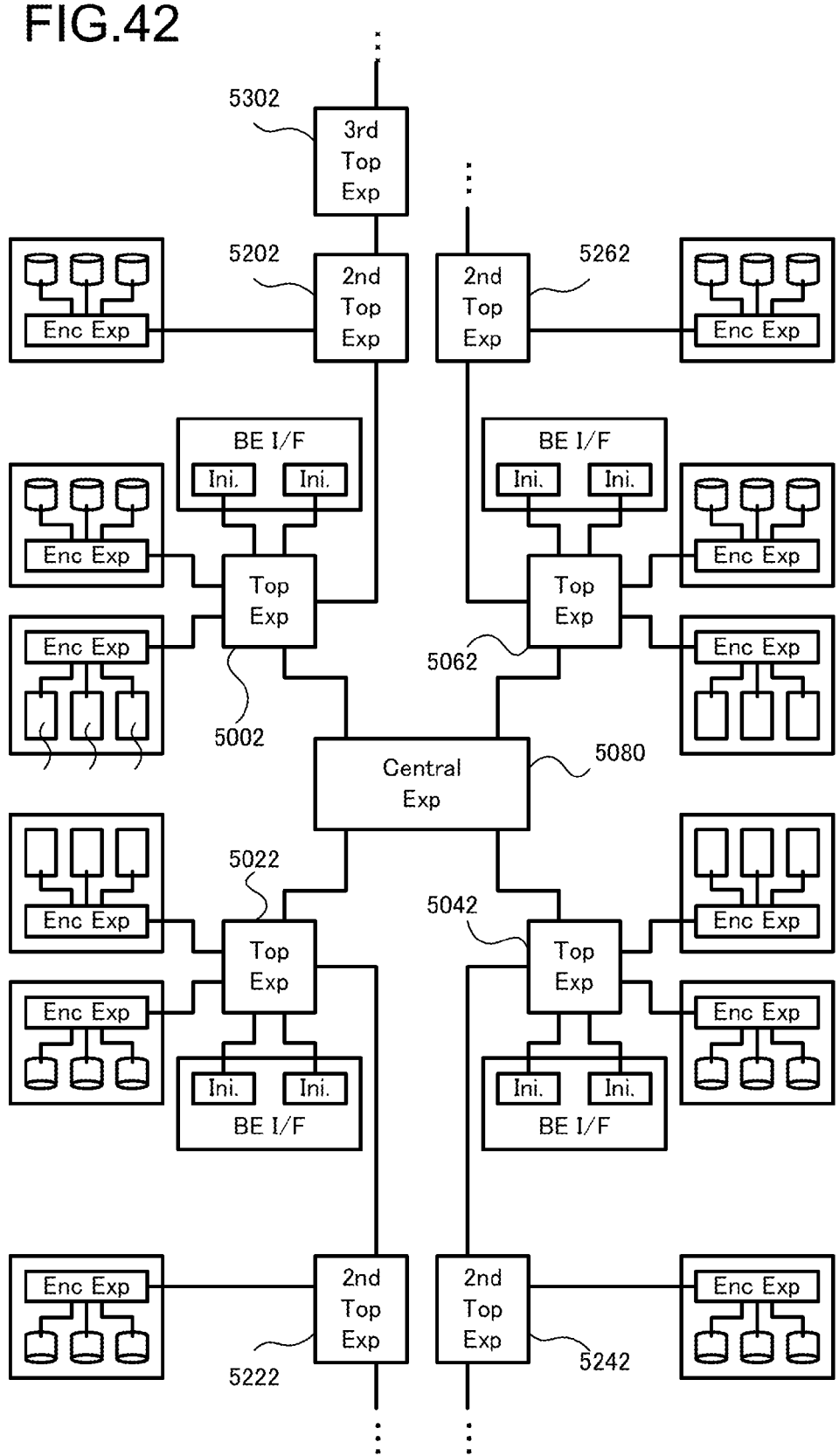
FIG. 42 is a view illustrating a backend network topology according to Embodiment 5.

FIG. 42 is a view illustrating a topology of a backend network according to a storage subsystem of Embodiment 5. The components disposed above the backend interface of the storage subsystem are the same as the storage subsystem of Embodiment 1, so they are not shown.

The difference between the present embodiment and the topology of the backend network of the storage subsystem according to Embodiment 1 is that according to the present embodiment, expanders (5202, 5222, 5242, 5262) for connecting enclosure expanders are connected via cascade connection to the top expanders (5002, 5022, 5042, 5062). Hereafter, the expanders (5202, 5222, 5242, 5262) for connecting the enclosure expander being connected in cascade connection to the top expander is referred to as a second HDD enclosure top expander (referred to as "2nd Top Exp" in the drawing), the expander connected in cascade connection thereto is referred to as a third HDD enclosure top expander 5302 (referred to as "3rd Top Exp" in the drawing. In the drawing, as an example, the third HDD enclosure top expander is connected only to the second HDD enclosure top expander 5202), and the expander connected via cascade connection thereto is referred to as a fourth HDD enclosure top expander. The expander connected in the n-th order is called an n-th HDD enclosure top expander. The second to n-th HDD enclosure top expanders are similar to a (normal) top expander in that end devices (SSDs, HDDs) are not directly connected thereto and only expanders are directly connected, so that in the present specification, such expander is referred to as an n-th HDD enclosure top expander. Further, the enclosure expander connected via cascade connection to the second to n-th HDD enclosure top expanders only connect HDDs, so that when SSDs are connected thereto, it is recognized as topology violation. The advantage of this configuration is that the topology branched from the n-th HDD enclosure top expander to many cascade topologies can be formed to the backend network, so that a large number of HDDs can be mounted thereto.

As described, according to the storage subsystem of Embodiment 5, a type of expander called an n-th HDD enclosure top expander is newly adopted. Therefore, the expander type stored in the expander type management table 700 (FIG. 4) include an "HDD enclosure top expander" in addition to the enclosure expander, the top expander and the central expander used in the previous embodiments. When an n-th HDD enclosure top expander is disposed in the storage subsystem, the administrator stores the SAS address of the relevant n-th HDD enclosure top expander and the type thereof (HDD enclosure top expander) in the expander type management table 700, similar to Embodiment 1.

According to the storage subsystem of Embodiment 5, the flow of the backend network setting process, the check of whether topology violation exists or not (the connection of SSDs is prohibited to the second to n-th HDD enclosure top expanders), and the flow of the addition process differ, so that these processes will be described below. The preprocess before setting a backend network is the same as in the process of Embodiment 1.

The backend network setting process and the addition process according to the present configuration has the following differences as the process described in Embodiment 1.

The difference is that a topology check is performed to check whether an SSD is not connected to the enclosure expanders connected to and beyond the second HDD enclosure top expander. During the enclosure management table creating process (the processes of 1110 through 1201 or 1112 through 1203 of FIGS. 8 and 9), the procedure refers to the expander type management table 700, and creates an enclosure management table and checks whether topology violation exists or not (FIG. 15) similar to Embodiment 1 of the enclosure expanders connected to the top expander. Regarding the second HDD enclosure top expander connected to the top expander, a topology check of the expander connected to and beyond the second HDD enclosure top expander (FIGS. 43 and 44) described later will be performed.

Figure 43:
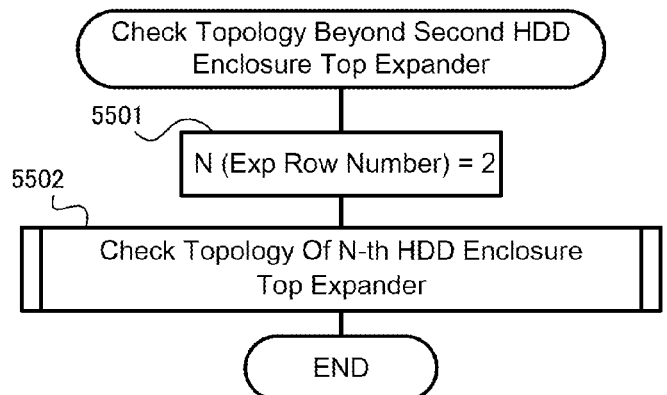
FIG. 43 is a flowchart of a topology check processing beyond the second HDD enclosure top expander.

We will now describe the flow of the topology check of the second HDD enclosure top expander and beyond (FIG. 43). The number of rows of the second HDD enclosure top expander is 2 (second row from the initiator), so that in step S501, 2 is substituted in variable n (number of rows of expander). Thereafter, in step S502, a topology check of the n-th HDD enclosure top expander will be performed in step S502 (FIG. 44).

Figure 44:
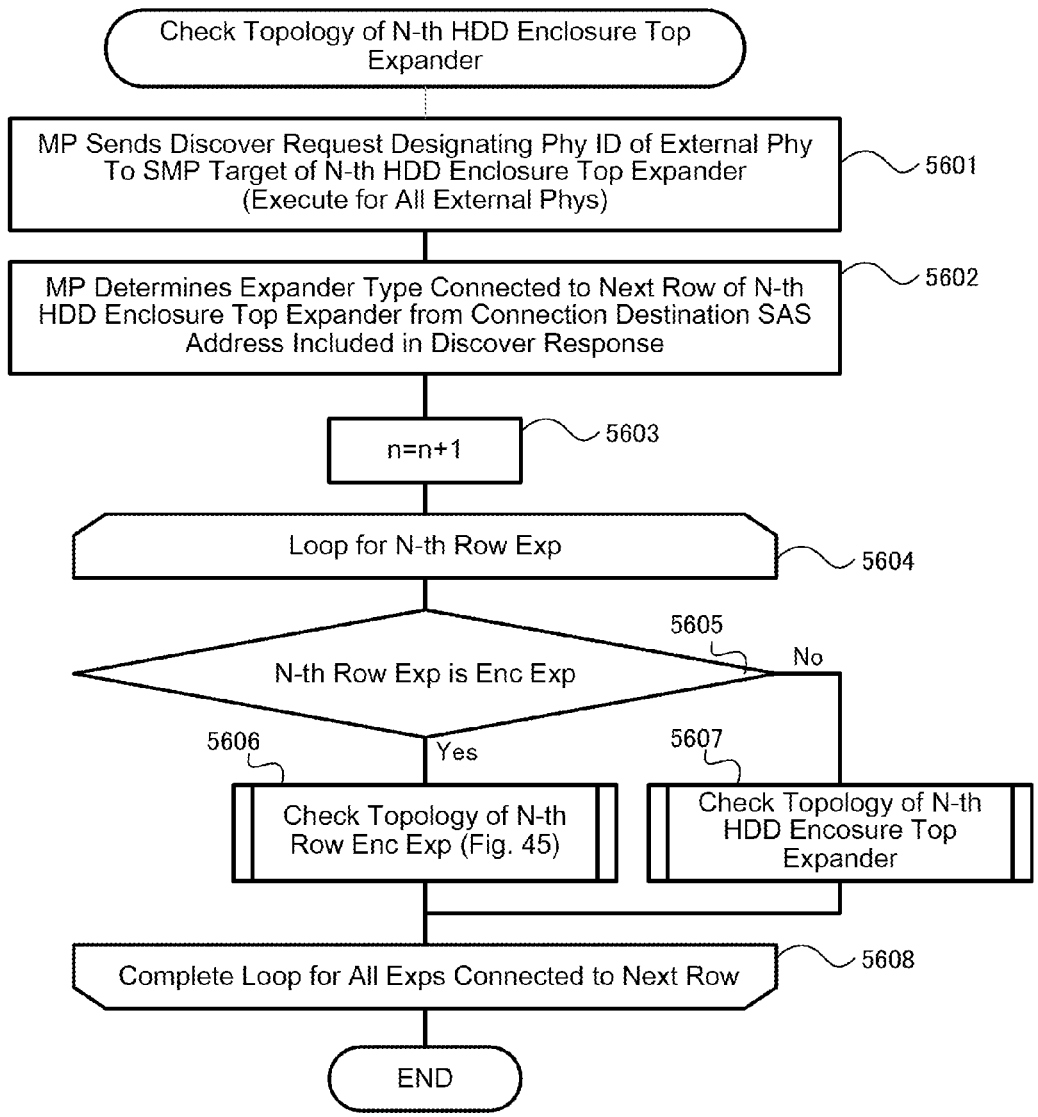
FIG. 44 is a flowchart of a topology check processing of an n-th HDD enclosure top expander.

We will now describe the flow of the topology check of the n-th HDD enclosure top expander (FIG. 44). In step S601, the processor transmits a Discover request designating the Phy ID of each external Phy to the SMP target of the n-th HDD enclosure top expander. The transmission of the Discover request is performed for all external Phys. In step S602, the processor determines the type of one or multiple expanders connected to a next row of the n-th HDD enclosure top expander based on the connection destination SAS address included in the Discover response. In step S603, the variable n is incremented. In step S604, a loop process is executed to the expander connected to the second row. In step S605, it is determined whether the type of the expander on the next row is an enclosure expander or not, and if the expander is an enclosure expander, the procedure advances to step S606. In step S606, a topology check of the enclosure expander connected to the next row (FIG. 45) is performed. In step S605, when the determination result is not an enclosure expander, in other words, when the expander is an n-th HDD enclosure top expander, the procedure advances to step S607. In step S607, a topology check of the n-th HDD enclosure top expander is performed (that is, the process of FIG. 44 is executed in a recursive manner). In step S608, when the loop process is completed for all expanders connected to the next row, the process of the flow is ended.

Figure 45:
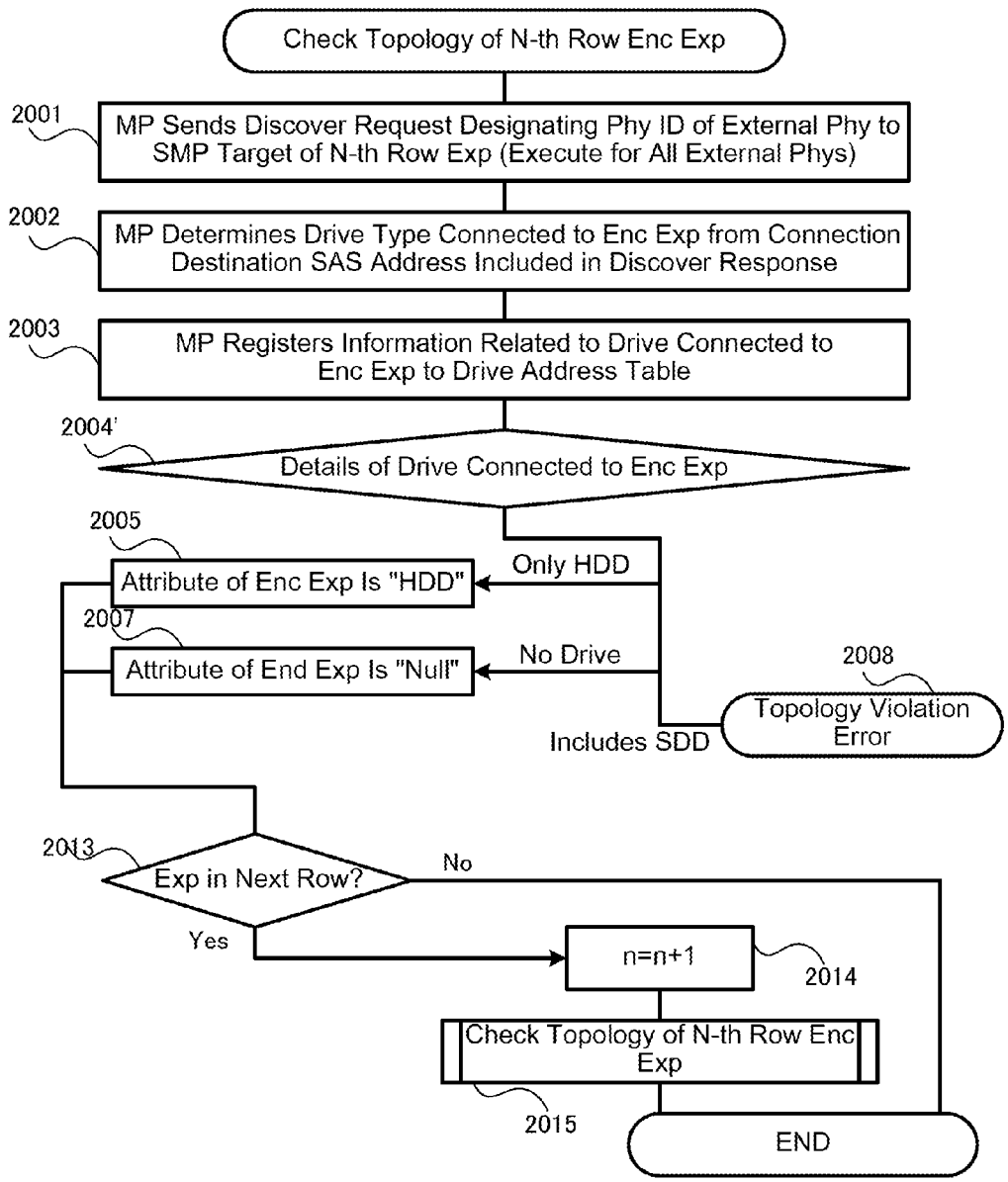
FIG. 45 is a flowchart of a topology check processing of an enclosure expander connected to a next row.

The flow of the process for checking the topology of the enclosure expanded connected to the next row will be illustrated in FIG. 45. This flow omits the steps related to the enclosure management table (2009 through 2012) from the flow (FIG. 16) for recognizing the enclosure expander connected to the next row. Further, in checking the details of the drives performed in step 2004', when an SSD is included in the enclosure expander, it is determined that topology violation exists and an error is reported. The other points are the same as the flow of FIG. 16, so they will not be described in detail.

Embodiment 6

Figure 46:
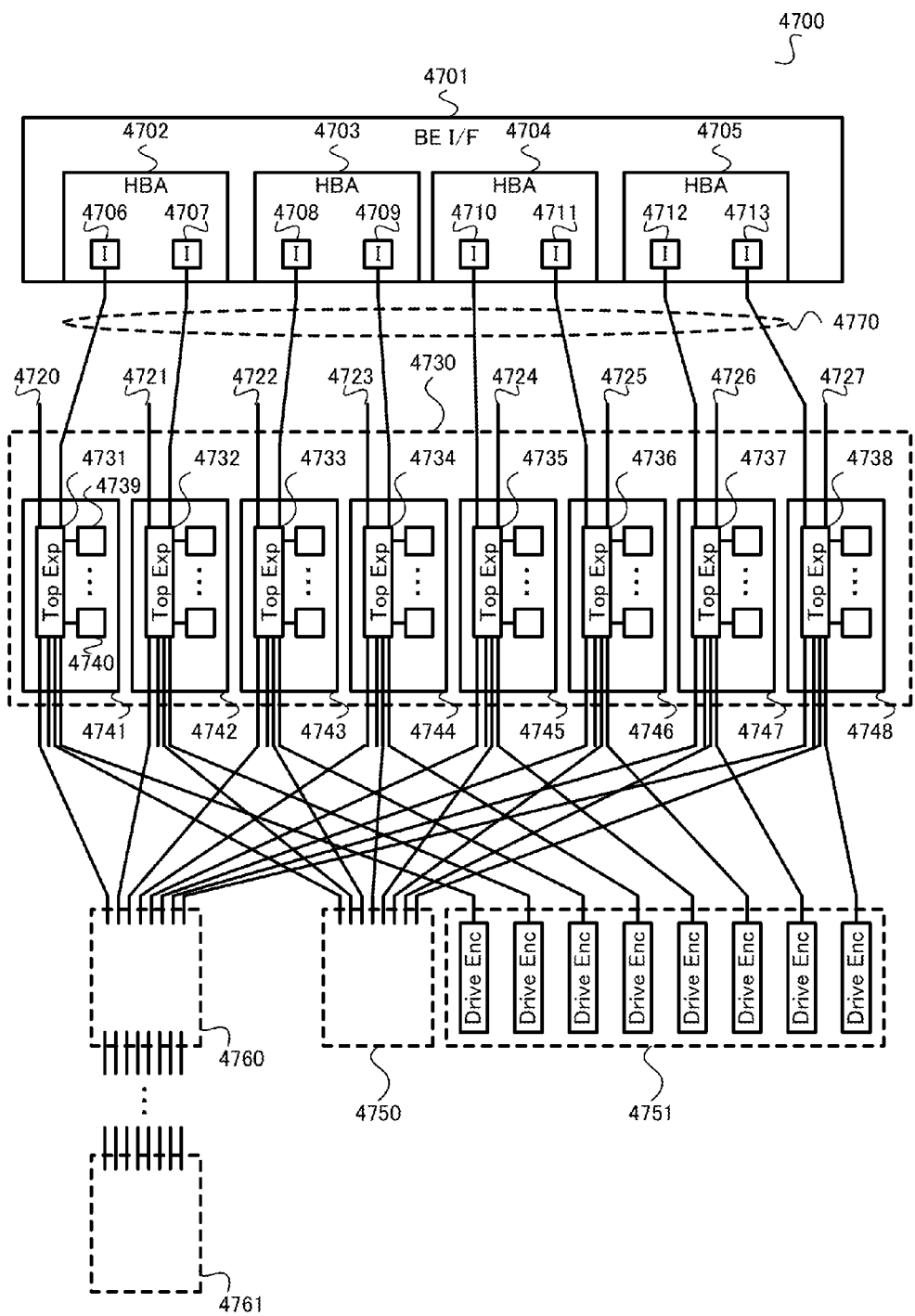
FIG. 46 is an explanatory view of a backend network topology according to Embodiment 6.

FIG. 46 is a view illustrating a topology of a backend network according to a storage subsystem of Embodiment 6. The components disposed above the backend interface of the storage subsystem are the same as the storage subsystem according to Embodiment 1, so that they are not shown. Further, the backend network described here can be applied to a configuration where the route from the initiator to the drives (storage devices) realizes redundancy, as in the storage subsystem of Embodiment 3, but in FIG. 46, only the backend network of one of the redundant configurations is illustrated.

The differences from the topology of the backend network in the storage subsystem according to Embodiment 1 is that in a backend network 4700 of the storage subsystem of the present embodiment, (1) there are multiple top expanders 4731-4738, and that (2) the top expander enclosure and the drive enclosure are integrated and SSDs are enabled to be connected to the top expander. By adopting the configuration of (1) and increasing the number of top expanders, it becomes possible to reduce the number of Phys per top expander. Further, by performing the integration of (2), the number of rows connected from the initiator to the SSDs (the number of expanders existing in the route from the initiator to the SSDs) is a minimum of one row within the module (which was two rows according to Embodiment 1) and a minimum of three rows among modules (which was four rows according to Embodiment 1), and further, the number of enclosures can be reduced to a number equal to the number of top expanders. An enclosure having integrated the top expander enclosure and the drive enclosure and enabling SSDs to be connected to the top expander is called a top drive enclosure.

A backend interface 4701 includes HBAs (Host Bus Adapters) (4702-4705) having multiple initiators, and each HBA has two initiators (4706 and 4707, 4708 and 4709, 4710 and 4711, and 4712 and 4713). In the storage subsystem according to the embodiment of the present invention, two or more drives selected from the drives (HDDs or SSDs) that can be accessed from the backend interface 4701 are used to constitute a RAID (Redundant Arrays of Inexpensive Disks) group, which is provided with a function to enable data recovery during failure of a drive and the like, wherein the backend interface 4701 is equipped with a number of initiators equal to the number (such as eight) of drives constituting the RAID group. The first row of top expander is connected in a one-to-one relationship via a SAS link (4770) with an initiator, and each SAS link (4770) is a four-wide link, for example. The SAS links 4720-4727 are connected to the central expander.

The respective top drive enclosures (4741-4748) are enabled to install only SSDs, and they are not allowed to connect HDDs. In the following, the assembly of drive enclosures installing drives capable of constituting a RAID group is called a RAID group enclosure configuration unit, wherein according to the storage subsystem of Embodiment 6, the eight top drive enclosures (4741-4748) are managed as a single RAID group enclosure configuration unit (4730). Not all the drives within the RAID group enclosure configuration unit (4730) constitute the RAID group. For example, when the administrator wishes to create a RAID group, for example, one drive is selected from each of the top drive enclosures within the RAID group enclosure configuration unit (4730), and the selected eight drives are used to constitute a 7D+1P RAID group (a RAID configuration where data is stored in given units in a dispersed manner to seven drives, a parity is created from each of the stored data, and the created parity is stored in the eighth drive). In another example, one drive is selected from each of the four top enclosures (4741-4744, or 4745-4748) to constitute a 3D+1P RAID group.

Similar to Embodiment 1, the top expander has a role to isolate the topology for connecting SSDs and the topology for connecting HDDs. The method for managing the expanders connected to the second and subsequent rows (such as the preprocessing before setting the backend network, the setting process and the addition process) is also similar to Embodiment 1. The drive directly connected to the top expander (hereinafter referred to as a "first row drive") is managed separately via a similar method as the prior art cascade topology. However, the difference from the prior art method for managing the cascade topology is that a share setting ("shared" or "unshared") is set to the first row drive, and a first row drive is registered in the drive address table in a manner similar to the second and subsequent rows. The enclosure expanders within the RAID group enclosure configuration units 4750 and 4751 composed of enclosures connected to the second row and the enclosure expanders connected therefrom in a cascade connection are restricted to enclosure expanders connecting SSDs. Similar to Embodiment 1, there is a restriction in the number of rows connected to the enclosure expanders connecting SSDs.

The enclosure expanders within the RAID group enclosure configuration unit 4760 and the enclosure expanders connected therefrom (such as the enclosure expanders within the RAID group enclosure configuration unit 4761) is determined to be the enclosure expanders connecting only HDDs. The enclosure expanders within the RAID group enclosure configuration unit connected beyond the RAID group enclosure configuration unit 4760 are connected by cascade connection. The method for configuring the RAID groups constituting the RAID group enclosure configuration units (4750, 4751, 4760, 4761) are the same as RAID group enclosure configuration unit (4730).

Regarding the number of rows, the enclosure expander connecting SSDs starts from the first row, wherein on the first row are placed the expanders within the RAID group enclosure configuration unit (4730), on the second row are placed the expanders within the RAID group enclosure configuration units (4750, 4751), on the third row are placed the RAID group enclosure configuration units connected beyond the second row, and so on. The enclosure expanders connecting HDDs are started from the second row, wherein on the second row are placed the expanders within the RAID group enclosure configuration unit (4760), on the third row are placed the expanders within the RAID group enclosure configuration units connected beyond the second row, and so on. In order to simplify the drawing of the RAID group enclosure configuration units 4750, 4751, 4752, 4760 and 4761, the drive enclosures and drives are not shown in the drawing.

Figure 47:
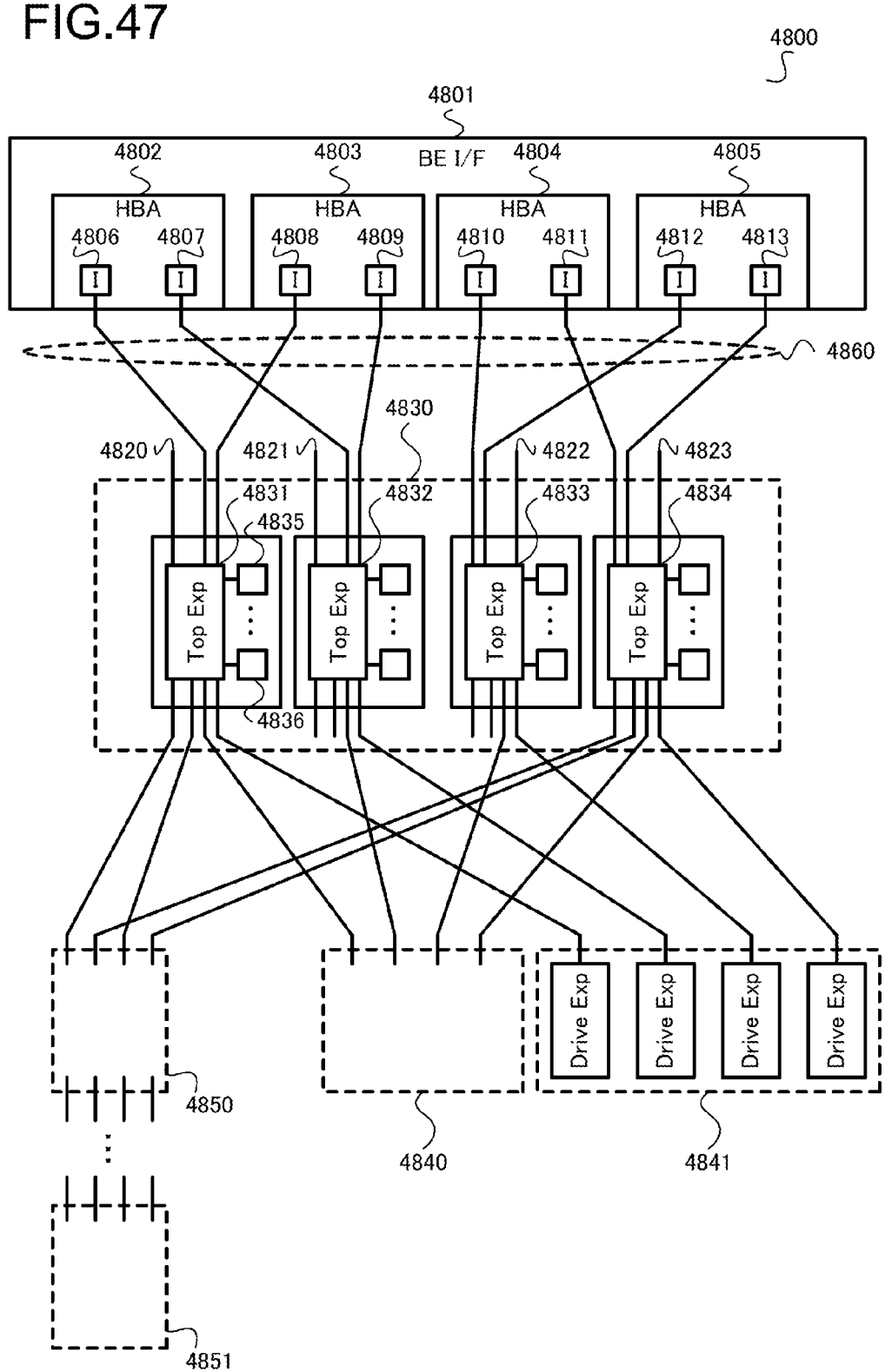
FIG. 47 is an explanatory view of a backend network topology according to Embodiment 6.

FIG. 47 illustrates another embodiment of Embodiment 6. The difference from the topology of the backend network according to the storage subsystem of FIG. 46 is that in a backend network 4800 in the storage subsystem of FIG. 47, the number of top expanders (4831-4834) is smaller than the number of initiators 4806-4813. In the example of FIG. 47, the top expanders on the first row are connected via SAS links (4860) to two initiators, and the number of top expanders is half the number of initiators. However, a network bandwidth equivalent to FIG. 46 can be realized by forming the respective SAS links (4860) using eight wide links, which is double that of FIG. 46. The connection relationship between the top expanders and initiators is not restricted to the configuration illustrated in FIG. 47, and the top expanders on the first row can be connected via SAS links to more than two initiators.

The differences between the example of FIG. 46 where the number of top expanders is 8 and the example of FIG. 47 where the number of top expanders is 4 are, (1) in the example of FIG. 46, the number of top expanders on the first row is greater than that of FIG. 47, and the number of Phys required for the top expander can be suppressed to a small value, and (2) in the example of FIG. 47, the number of Phys required in the top expanders on the first row is greater than that of FIG. 46, but the number of drive enclosures within the RAID group enclosure configuration unit can be reduced to half (from 8 to 4). The subsequent descriptions are the same as in FIG. 46.

A backend interface 4801 has multiple HBAs (4802-4805) with multiple initiators, and each HBA has two initiators (4806 and 4807, 4808 and 4809, 4810 and 4811, 4812 and 4813). Two initiators are connected via SAS links 4860 to a top expander on the first row. The SAS links 4820-4823 are connected to the central expander.

Only SSDs are allowed to be installed to the respective top drive enclosures of the RAID group enclosure configuration unit 4830, and HDDs are not allowed to be connected thereto. The four top drive enclosures (4830-4834) constitute the RAID group enclosure configuration unit (4830). Two drives are selected from the respective top drive enclosures, and a 7D+1P RAID group is configured. 3D+1P RAID group can be configured by selecting one drive from each of the top enclosures (4831-4834). That the top expander has a role to isolate the topology connecting the SSDs and the topology connecting the HDDs is, as described in FIG. 46, similar to Embodiment 1. The method for managing the second row and subsequent rows (such as the preprocess before setting a backend network, the setting process and the addition process) is the same as Embodiment 1, and the drives on the first row connected to the top expander are managed separately (according to the management method as described in FIG. 46). The enclosure expanders within the second row RAID group enclosure configuration units 4840 and 4841 and the enclosure expanders connected beyond these enclosure expanders are restricted to enclosure expanders connecting SSDs. Similar to Embodiment 1, there is a limit in the number of rows of the enclosure expanders connecting SSDs.

The RAID group enclosure configuration units connected beyond the RAID group enclosure configuration unit 4850 are connected via cascade connection. The enclosure expanders within the RAID group enclosure configuration unit 4850 and the enclosure expanders (4851) connected beyond the same are restricted to enclosure expanders connecting HDDs. The method for configuring the RAID group from RAID group enclosure configuration units (4840, 4841, 4850, 4851) is similar to that of the RAID group enclosure configuration unit (4830).

Regarding the number of rows, the enclosure expander connecting SSDs starts from the first row, wherein on the first row are placed the expanders within the RAID group enclosure configuration unit (4830), on the second row are placed the expanders within the RAID group enclosure configuration units (4840, 4841), on the third row are placed the RAID group enclosure configuration units connected beyond the second row, and so on. The enclosure expanders connecting HDDs are started from the second row, wherein on the second row are placed the expanders within the RAID group enclosure configuration unit (4850), on the third row are placed the expanders within the RAID group enclosure configuration units connected beyond the second row, and so on. In order to simplify the drawing of the RAID group enclosure configuration units 4840, 4841, 4850 and 4851, the drive enclosures and drives are not shown in the drawing.

The topology of the backend networks (FIGS. 46 and 47) of the storage subsystem according to Embodiment 6 is similar to the topology of Embodiments 1 and 2, except that drives (SSDs) are connected to the top expanders. Therefore, the preprocess before setting a backend network, the backend network setting process and the addition process according to the storage subsystem of Embodiment 6 are the same processes as the processes of Embodiments 1 and 2. Further, as described in Embodiment 2, it is possible to prepare a field for setting a share flag to the share setting table or the drive address table of the top expander Phy, and to have the administrator determine whether the drive is to be shared or unshared, so as to set the drives placed in the top drive enclosure to be shared or unshared.

A check similar to that described in Embodiment 1 (first to fourth rules) should be performed as the topology violation check performed in the backend network setting process or other processes. The configuration of the storage subsystem of Embodiment 6 is restricted to a configuration where only SSDs are installed to the enclosure expanders within the RAID group enclosure configuration units 4750 and 4751 and to the enclosure expanders connected beyond these units in cascade connection, and only HDDs are loaded to the enclosure expanders within the RAID group enclosure configuration unit 4760 and to the enclosure expanders connected beyond this unit (such as the enclosure expanders within the RAID group enclosure configuration unit 4761), so that it should be subjected to the above-described topology violation check.

Specifically, a means is provided to the storage subsystem for enabling the administrator to set the information on the type of the enclosure expander capable of being connected (such as the enclosure expander connecting HDDs or the enclosure expander connecting SSDs) for each Phy (or port) of the top expander, and during the topology violation check performed in the backend network setting process or other processes, whether an appropriate enclosure expander is connected or not should be checked based on the set information. For example, regarding the respective Phys (or ports) of the top expander to which the enclosure expanders within the RAID group enclosure configuration units 4750 and 4751 are connected, by setting the information notifying that enclosure expanders loading only SSDs can be connected thereto, it is possible to check whether or not only SSDs are loaded to the enclosure expanders within the RAID group enclosure configuration units 4750 and 4751 and the enclosure expanders connected beyond the units in cascade connection.

As described above, according to the storage subsystem of the present invention, the storage subsystem where storage devices having different access performances, which are HDDs and SSDs, are loaded in a mixture is equipped with a function for checking topology violation when initializing a backend network or when performing addition, and by eliminating as much as possible the topology where the communication path of HDDs and the communication path of SSDs are shared, it becomes possible to have the performance of SSDs exerted sufficiently. Further, since the present storage subsystem has a backend network capable of having the SSDs accessed in a shared manner from multiple storage controllers, it becomes possible to enhance the storage performance through inter-module load distribution. Further, during the load distribution process, the I/O processing can be migrated among modules without moving the data in the SSD.

According further to the present embodiment, even when the link between the externally configurable expanders is a Table-to-Table connection, the route table of the externally configurable expander can be set.

As a result, according to the storage subsystem to which the present invention is applied, users performing large-scale data processing such as analysis of big data can speedily respond to and access the large-scale data, according to which the data processing performance of the storage subsystem can be enhanced.

The preferred embodiments of the present invention have been described, but these embodiments are mere examples for illustrating the present invention, and are not intended to restrict the scope of the present invention to the embodiments illustrated above. For example, the modified example described above can be combined with Embodiment 2. One modified example can be combined with another modified example. The configuration of the storage subsystem of the embodiments are not restricted to the above-described configuration. For example, a configuration can be adopted where multiple CPUs are disposed within a controller.

REFERENCE SIGNS LIST

100, 4500: Storage subsystem
101, 151, 4601, 4501, 4502, 4503: Module
102, 152: Controller
103, 153, 4603, 4653: Processor
104, 154, 4604, 4654: Memory
105, 155, 4605, 4655: Frontend interface
106, 156, 4606, 4656: Host channel
107, 157, 4607, 4657: Backend interface
108, 158, 4608, 4658: SAS link
109, 159, 4609, 4659: Network interface
110, 160, 4610, 4660: Top expander
140, 4510, 4520: Central expander
141, 142, 4641, 4691: SAS link
143, 4530, 4531: Inter-module network
111-118, 161-168: SAS link
119-124, 169-174: Enclosure expander
3701, 3751: Phy
3702, 3703, 3752, 3753: Enclosure expander
4619, 4620, 4622, 4623: Enclosure expander
4669, 4670, 4672, 4673: Enclosure expander
125-127, 175-177, 4625, 4626: SSD
128-130, 178-180, 4628, 4629: HDD
4642, 4692: Network channel
201, 251, 1001, 1051: Initiator
202-215, 252-265, 4511, 4521: Phy
1004, 1054, 1501: SMP target
4630: Inter-processor channel

The invention claimed is:

1. A storage subsystem comprising multiple storage devices and one or more storage controllers connected via a backend network;
wherein the storage controller has multiple initiators for issuing commands to the multiple storage devices;
the backend network is a network composed of multiple switches disposed between the initiator and the multiple storage devices, and a transmission line connected between the initiator and the multiple switches;
during an initialization process of the backend network, the storage controller:
acquires information of the storage devices connected to each of the multiple switches or the information of the switches;
determines, based on the acquired information of the storage devices connected to each of the multiple switches or the information of the switches, whether a topology of the backend network violates one or more rules determined in advance;
notifies an error if violation of the rule is determined;
wherein
the multiple storage devices include one or more of a first type of storage device, and one or more of a second type of storage device having a higher access performance than the first type of storage device;
wherein one of said one or more rules is that each switch does not have both the first type of storage device and the second type of storage device connected thereto; and
in the determination process, the storage controller notifies an error when a switch having both the first type of storage device and the second type of storage device connected thereto exists;
wherein
the backend network has a top expander, which is a switch for connecting the initiator and a switch connecting the first or the second type of storage device;
one of said one or more rules is that a number of switches connected to the top expander and having only the first type of storage device connected thereto is equal to or smaller than a number set in advance; and in the determination process, the storage controller notifies an error when a number of switches connected to the top expander and having only the first type of storage device connected thereto exceeds the number set in advance.

2. The storage subsystem according to claim 1, wherein the number set in advance is a value smaller than a number of switches capable of being connected to the top expander and having only the second type of storage device connected thereto.

3. The storage subsystem according to claim 1, wherein the backend network is a network for connecting a device in compliance with SAS (Serial Attached SCSI) standards;
the top expander has multiple ports for connecting the switches, wherein one of the multiple ports has a Phy with a Subtractive routing attribute;
one of said one or more rules is that a switch having only the first type of storage device connected thereto is connected only to the port having the Phy with the Subtractive routing attribute; and
in the determination process, the storage controller notifies an error when the switch having only the first type of storage device connected thereto is connected to a port of the top expander not having the Phy with the Subtractive routing attribute.

4. The storage subsystem according to claim 1, wherein one of said one or more rules is that a number of rows of connection of the switch having only the second type of storage device connected thereto from the top expander is equal to or smaller than a given value set in advance; and
in the determination process, the storage controller notifies an error when the number of rows of connection from the top expander of the switch having only the second type of storage device connected thereto is not equal to or smaller than the given value.

5. The storage subsystem according to claim 4, wherein one of said one or more rules is that a different switch having the storage device connected thereto is not connected to the switch having the second type of storage device connected thereto; and
in the determination process, the storage controller notifies an error when the different switch having the storage device connected thereto is connected to the switch having the second type of storage device connected thereto.

6. The storage subsystem according to claim 1, wherein
the storage subsystem comprises a first storage controller, a second storage controller, and a network connecting the first and second storage controllers;
the backend network is equipped with a first top expander for connecting a first initiator provided to the first storage controller and a switch connecting the storage device, and a second top expander for connecting a second initiator provided to the second storage controller and a switch connecting the storage device;
the first storage controller is capable of accessing a storage device connected to the switch connecting the storage device, which is connected via the backend network to the second top expander; and
the second storage controller is capable of accessing a storage device connected to the switch connecting the storage device, which is connected via the backend network to the first top expander.

7. The storage subsystem according to claim 6, wherein the backend network has a central expander for connecting the first top expander and the second top expander.

8. The storage subsystem according to claim 6, wherein in the initialization process of the backend network,
the first storage controller:
acquires, via the network, an address information of a storage device connected to the switch connecting the storage device, which is connected from the second storage controller to the second top expander;
registers the acquired address information of the storage device to a route table of the first top expander;
acquires, via the first top expander, an address information of the storage device connected to the switch connecting the storage device, which is connected to the first top expander, creates a content to be registered to a route table of the second top expander, and transmits the created content via the network to the second storage controller; and
the second storage controller stores the content received from the first storage controller to the route table of the second top expander.

9. The storage subsystem according to claim 8, wherein the multiple storage devices include one or more of a first type of storage device, and one or more of a second type of storage device having a higher access performance than the first type of storage device; and
in the initialization process of the backend network, the first storage controller does not register an address information of the first type of storage device to the route table of the first and second top expanders.

10. The storage subsystem according to claim 6, wherein the first and second storage controllers are connected to a host computer;
a controller in charge of processing an access to the storage device is determined for each storage device in the storage subsystem; and
when a load of the first storage controller exceeds a given value, the processing of access to one of the multiple storage devices that the first storage controller was in charge of is changed so that the second storage controller will be in charge of the processing.

11. The storage subsystem according to claim 8, wherein when the storage device is added to the storage subsystem, the first storage controller acquires an address information of the added storage device via the backend network; and
causes the address information of the added storage device to be registered in the route table of the first and second top expanders.

\* \* \* \* \*